(12) United States Patent
Shum

(10) Patent No.: US 9,420,644 B1
(45) Date of Patent: Aug. 16, 2016

(54) LED LIGHTING

(71) Applicant: Frank Shum, Sunnyvale, CA (US)

(72) Inventor: Frank Shum, Sunnyvale, CA (US)

(*) Notice: Subject to any disclaimer, the term of this patent is extended or adjusted under 35 U.S.C. 154(b) by 0 days.

(21) Appl. No.: 14/952,079

(22) Filed: Nov. 25, 2015

Related U.S. Application Data

(60) Provisional application No. 62/141,010, filed on Mar. 31, 2015.

(51) Int. Cl.
H05B 37/02 (2006.01)
H05B 33/08 (2006.01)
F21V 23/00 (2015.01)
F21K 99/00 (2016.01)
F21V 23/06 (2006.01)

(52) U.S. Cl.
CPC .......... *H05B 33/0812* (2013.01); *F21K 9/1355* (2013.01); *F21V 23/004* (2013.01); *F21V 23/06* (2013.01); *H05B 33/0824* (2013.01); *H05B 33/0845* (2013.01)

(58) Field of Classification Search
CPC .......... H05B 33/0815; H05B 33/0812; H05B 33/0842; H05B 33/0824; H05B 37/02; H05B 33/22; H05B 39/06; H05B 41/2821; H05B 33/0827; H05B 37/032; H05B 33/0845; F21K 9/1355; F21K 9/10; F21K 9/1375; F21V 23/06; F21V 23/007; F21V 23/008; F21V 23/009; F21V 23/023
See application file for complete search history.

(56) References Cited

U.S. PATENT DOCUMENTS

| 6,013,988 | A | 1/2000 | Bucks et al. |
|---|---|---|---|
| 6,250,774 | B1 | 6/2001 | Begemann et al. |
| 6,561,690 | B2 | 5/2003 | Balestriero et al. |
| 7,038,399 | B2 | 5/2006 | Lys et al. |
| 7,262,559 | B2 | 8/2007 | Tripathi et al. |
| 7,348,604 | B2 | 3/2008 | Matheson |
| 7,352,138 | B2 | 4/2008 | Lys et al. |
| 8,558,249 | B1 * | 10/2013 | Shum .................. H01L 25/0753 257/100 |
| 8,770,800 | B1 * | 7/2014 | Yriberri ................ F21V 7/0025 362/297 |
| 8,796,955 | B2 | 8/2014 | Grajcar |
| 8,878,102 | B2 * | 11/2014 | Juarez .................... H01R 33/22 219/209 |

(Continued)

OTHER PUBLICATIONS

Patterson, James, Efficient Method for Interfacing TRIAC dimmers and LEDs, [online]. Jun. 23, 2011 [retrieved on Oct. 17, 2015], Retrieved from: http://www.edn.com/.

(Continued)

*Primary Examiner* — Vibol Tan
(74) *Attorney, Agent, or Firm* — Craige Thompson; Thompson Patent Law

(57) ABSTRACT

Apparatus and associated methods relate to a diversion driver module that dynamically adds a diversion current to an LED current so that the summed current maintains a predetermined minimum holding current requirement of a phase-controlled dimmer supply. In an illustrative example, the diversion current may be a function of input AC line voltage and/or firing angle of the phase-controlled dimmer supply. The phase controlled device may include, for example, a triac. The triac may supply adjustable pulse-width current to dim the LED according to a phase control signal. The diversion driver module may include one or more heat dissipating components disposed in thermal communication with the lamp base. Some driver modules may be sufficiently compact and energy efficient to provide smooth dim-to-black performance while operating within acceptable temperature limits for reliable operation while contained in the base of a standard form factor lamp, such as an E12 full-glass lamp.

22 Claims, 58 Drawing Sheets

(56) References Cited

U.S. PATENT DOCUMENTS

| | | | | |
|---|---|---|---|---|
| 8,970,115 | B2* | 3/2015 | Myers | H05B 37/038 |
| | | | | 315/122 |
| 9,119,254 | B2* | 8/2015 | Lee | H05B 33/0815 |
| 9,125,956 | B2* | 9/2015 | Juarez | H05B 3/26 |
| 9,271,345 | B2* | 2/2016 | Welten | H05B 33/0815 |
| 2010/0213870 | A1 | 8/2010 | Koolen | |
| 2011/0068704 | A1 | 3/2011 | McKinney | |
| 2011/0248640 | A1 | 10/2011 | Welten | |
| 2015/0359059 | A1* | 12/2015 | Barnetson | H05B 33/0845 |
| | | | | 315/186 |

OTHER PUBLICATIONS

Jun, Pan, SCR (Silicon-Controlled Rectifier) Dimming Technology in LED Lighting, [online]. May 17, 2011 [retrieved on Oct. 17, 2015], Retrieved from: www.solomon-systech.com.

Gostron Electronics Co., LTD, Linkage SM2311E, [online]. 2010-2015, [retrieved on Jun. 9, 2015] Retrieved from: www.linkage66.com.

Biery, E. and Poplawski, M., Are we there yet?, Trade Show and Conference Agenda, Apr. 2013, p. 19 and 29, LightFair International, Philadelphia, PA.

On Semiconductor, Thyristor Theory and Design Considerations Handbook, Nov. 2006, SCILLC, Phoenix, AZ.

Thornton, Tom, Improve phase-cut dimming performance in LED luminaires, LEDs Magagine, Nov./Dec. 2013, vol. 10, Issue 12, PennWell Corporation, Tulsa, OK.

IESNA, Lighting Handbook, 2000, 9th Edition, Chapter 27, pp. 881-901, Illuminating Engineering Society of North America, New York, NY.

Wikipedia, Weber-Fechner law, [online]. 2015, [retrieved on Oct. 17, 2015] Retrieved from: https://en.wikipedia.org/wiki/Weber-Fechner_law.

telescopeoptics.net, 13.8 Eye Intensity Response, Contrast Sensitivity, [online]. Jul. 6, 2006, [retrieved on Oct. 17, 2015], Retrieved from: http://www.telescope-optics.net/.

Littelfuse, Inc., Cartridge and Axial Lead Fuses, Jan. 12, 2009, Littelfuse, Chicago, IL.

EPCOS AG, SIOV metal oxide varistors, Dec. 2011, Munich, Germany.

Dow Corning, Sylgard 160 A & B Silicone Elastomer, 1993, Dow Corning Corporation, Midland, MI.

U.S. Department of Energy, Solid-State Lighting Technology Fact Sheet: Flicker, Mar. 2013, U.S. Department of Energy, Washington, DC.

Assist, Flicker Parameters for Reducing Stroboscopic Effects from Solid-state Lighting Systems, May 2012, vol. 11, Issue 1, Lighting Research Center, Troy, NY.

EPA, Energy Star Lamps V1.0 Specification Stakeholder Discussion on Dimming: A History, Oct. 2012, US EPA, Washington, DC.

IEC, Amendment 6, International Standard, 2009, International Electrotechnical Commission, Geneva, Switzerland.

NEMA, Nomenclature for Glass Bulbs Intended for Use with Electric Lamps, American National Standard, C79.1, 2002, National Electrical Manufacturers Association, Englewood, CO.

IEC, Maximum lamp outlines for incandescent lamps, International Standard Edition 2.5, 2005, International Electrotechnical Commission, Geneva, Switzerland.

ANSI/UL, Self-Ballasted Lamps and Lamp Adapters, UL 1993 Standard of Safety, Dec. 4, 2012, Underwriters Laboratories, Inc., New York, NY.

ANSI/UL, Light Emitting Diode (LED) Equipment for Use in Lighting Products, UL 8750 Standard for Safety, Sep. 15, 2015, Underwriters Laboratories, Inc., New York, NY.

NEMA, For electrical lamp bases—Specifications for Bases (Caps) for Electric Lamps, American National Standard C81.61, 2009, ANSLG, New York, NY.

Energy Star, Program Requirements for Integral LED Lamps—Partner Commitments, Eligibility Criteria Version 1.4, 2011, EPA, Washington, DC.

Gostron Electronics Co., LTD, Linkage SM2311E, [online]. 2010-2015, [retrieved on Sep. 24, 2015], Retrieved from www.linkage66.com.

\* cited by examiner

Table 7.4
Spacing on printed wiring boards and for board mounted components

| Locations | Maximum voltage between parts, Vrms (Vpeak=1.4 Vrms) [through air/over surface distance] | | | | | |
|---|---|---|---|---|---|---|
| | 0 – 50 | 51 – 150 | 151 – 300 | 301 – 450 | 451 – 600 | |
| | Dimensions in millimeters (inches) | | | | | |
| Parts poted or subsequently coated | –/0.188 (–/0.007) | –/0.38 (–/0.012) | –/0.7 (–/0.028) | –/0.8 (–/0.030) | –/0.8 (–/0.030) | |
| For Dry and Damp Locations: Live parts reliably opsitioned AND insulator CTI ≥ 600 (PLC = 0); example: lead wires of a transistor or diode to its mounting | 0.2/0.6 (0.008/0.025) | 0.5/0.8 (0.020/0.030) | 1.5/1.5 (0.060/0.060) | 2.25/2.25 (0.090/0.090) | 3.0/3.0 (0.120/0.120) | |
| For Dry and Damp Locations: Live parts reliably opsitioned AND insulator CTI < 600 (PLC = 3 or 4); example: adjacent foils on printed wiring board or lead wires of a transistor or diode to its mounting | 0.2/1.2 (0.008/0.045) | 0.5/1.6 (0.020/0.065) | 1.5/3.0 (0.060/0.120) | 2.25/4.5 (0.090/0.175) | 3.0/6.1 (0.120/0.250) | |
| For Wet Locations: Live parts reliably positioned AND insulator CTI ≥ 600 (PLC = 0); example: lead wires of a transistor or diode to its mounting | 0.2/1.5 (0.008/0.060) | 0.5/2.0 (0.020/0.080) | 1.5/3.7 (0.060/0.145) | 2.25/5.6 (0.090/0.220) | 3.0/7.5 (0.120/0.300) | |

FIG. 24B

# LED LIGHTING

CROSS-REFERENCE TO RELATED APPLICATIONS

This application claims the benefit of U.S. Provisional Application Ser. No. 62/141,010, titled "LED Lighting," filed by Shum, on Mar. 31, 2015. This application incorporates the entire contents of the foregoing application herein by reference.

TECHNICAL FIELD

Various embodiments relate generally to dimmable LED (light emitting diode) lighting sources, and some embodiments relate particularly to highly efficient compensated LED driver systems retrofittable to operate with existing phase-controllable sources that require a minimum holding current to maintain forward current conduction during dimming.

BACKGROUND

A significant portion of established, conventional lighting systems that convert electrical energy to light using incandescent or fluorescent technologies. These two well-established technologies offer well known trade-offs. Many buildings and structures have existing (e.g., legacy) lighting systems. Some of these systems may have dimming systems installed that supply controllable electrical stimulation to lamp sockets, for example, so that adjustment of the electrical stimulation produces a corresponding adjustable light output level.

Two trade-offs between incandescent and fluorescent technologies may be found in their energy efficiency and dimmability. Their comparative strengths may be considered to arise out of the physics of their respective illumination mechanisms.

With regard to energy efficiency, incandescent lamps may be considered to dissipate significant heat energy in the process of emitting light. Incandescent lamps emit light by dissipating heat in a resistive filament, thus making that filament so hot that it glows. Much of the electrical energy supplied to an incandescent lamp is converted to (waste) heat rather than light. In contrast, a fluorescent lamp emits light when a sufficient voltage applied between electrodes excites a gaseous medium. In general, fluorescent lamps produce more light per unit of electrical input than a comparable incandescent. Specifically, fluorescent lamps may typically produce more visible spectrum lumens per watt than a comparable incandescent.

Another trade-off between these two technologies may be found in their dimmability. In terms of voltage and current, an incandescent lamp dims well. The light output is a generally smooth function of the electrical power dissipation in the incandescent filament. By smoothly controlling the electrical power input, the light output can be smoothly controlled over its entire operating range. In contrast, a fluorescent lamp may generally be considered a non-linear system, for example, because it may require a substantial voltage to excite the gases between electrodes at opposite ends of a tube. Because the impedance in the tube may change significantly during operation, smooth dimming of a fluorescent lamp generally calls for relatively large, complex ballast electronics in order to maintain the gas excitation and voltage conditions required to operate the lamp over a wide dynamic range.

More recently, LED lamp technology has started to become an attractive new alternative because it can offer higher energy efficiency than incandescent, and it can do so without the complex controls required to maintain gas excitation within a fluorescent lamp. Some LED lamps are starting to come on the market with the form factor of certain legacy incandescent lamps. However, retrofitting LED lamps into legacy incandescent dimming systems has presented some unexpected performance challenges that remain unresolved.

SUMMARY

Apparatus and associated methods relate to a diversion driver module that dynamically adds a diversion current to an LED current so that the summed current maintains a predetermined minimum holding current requirement of a phase-controlled dimmer supply. In an illustrative example, the diversion current may be a function of input AC line voltage and/or firing angle of the phase-controlled dimmer supply. The phase controlled device may include, for example, a triac. The triac may supply adjustable pulse-width current to dim the LED according to a phase control signal. The diversion driver module may include one or more heat dissipating components disposed in thermal communication with the lamp base. Some driver modules may be sufficiently compact and energy efficient to provide smooth dimming performance while operating within acceptable temperature limits for reliable operation while contained in the base of a standard form factor lamp, such as an E12 based full-glass candle lamp.

The driver module may be sufficiently compact and energy efficient to smoothly dim to very low levels, for example, less than 10%, less than 1% or even less than 0.1%, while operating within acceptable temperature limits for reliable operation and while contained in the base of a standard form factor lamp, such as an E12 full glass lamp, for example. In some examples, a thermally conductive material may provide a thermally conductive path from the heat generating components to the lamp base such that heat generated by the heat generating components can flow out of the base to a socket that is in direct electrical, mechanical and thermal contact with the lamp base while the socket supplies electrical excitation to electrical terminals of the base.

Various embodiments may achieve one or more advantages. For example, some embodiments may advantageously enable a fully dimmable LED lamp that can be retrofit into a large population of pre-existing dimming systems in well-established lamp form factors. Various implementations may uniquely fulfill a growing, unmet market demand for a phase-control compatible LED driver with smooth dim-to-black capability, smooth dimming, all invisibly integrated into the base of an LED lamp that can be retrofit in existing dimming systems using well-established lamp form factors. For retrofit applications, various embodiments may substantially eliminate a need for rewiring or installation of external drivers or new dimming systems by providing a high efficient dimmable driver integrated into the base of a standard form factor lamp, for example. As such, various embodiments may substantially eliminate risks associated with poor dimmability performance using legacy phase-controlled dimmer sources, and may further reduce cost and construction time by eliminating the need to rewire or install new fixtures because the retrofittable lamp embodiments may simply replace prior lamps and use their pre-existing legacy wiring and dimming systems and infrastructure. Various embodiments may advantageously address, in a holistic and synergistic fashion, electrical, mechanical and thermal design to optimize electrical, optical and mechanical performance measures of electronic drivers for LED lighting.

By way of example and not limitation, certain advantages may, in some embodiments, include: (i) high compatibility (e.g., drop in lamp replacement) to leverage legacy infrastructure without reconstruction to install new infrastructure; (ii) minimizing the efficiency penalty for dimmable drivers when used without dimmers; (iii) unprecedented ability to enable smooth dimming to less than 10%, less than 1% or less than 0.1% (which may be referred to herein as "dim to black"); (iv) extremely space efficient where, in one illustrative example, the driver fits into standard E12 lamp base and enables integration of the driver inside a full glass dimmable candle lamp, (v) enhanced thermal design to allow for high power density driver electronics; (vi) reduced cost to manufacture, including simplifications to facilitate inserting thermally conductive material into the base; (vii) substantially reduced sensitivity to ringing associated with reactive energy in, for example, inductance and/or capacitance of legacy infrastructure wiring; (viii) reduce the flicker index or flicker percentage by judicious implementation of capacitors and resistor without affecting dimming performance. Some embodiments may eliminate the need for switched mode power supplies, thus eliminating the bulky magnetic inductors and capacitive filter components typically required by switched mode power supplies, and permitting reduced driver packaging volume and improve dimming compatibility. In various embodiments, the reduced volume package for the driver may be sufficiently compact and energy efficient to dynamically provide smooth dim-to-black performance while operating within acceptable temperature limits and while contained in the cavity of a standard form factor lamp base.

Various embodiments may advantageously improve performance (e.g., efficiency) for certain systems that require a relatively low level of power to be supplied continuously, whether or not in the presence of a dimmer. For example, occupancy sensors require a small amount of power from the supply to maintain sensor operation, regardless of dimming level or even if a dimmer is present. Some embodiments may provide sufficient power to maintain operation at low dimming levels for lighting control circuits, for example, without the need for complex or costly auxiliary power supplies that require additional components, installation, and packaging volume.

Some embodiment show the LED controller using multiple linear regulators and switches to connect LED segments to match the AC line voltage and improve efficiency. Such arrangement may include sequentially adding and subtracting segments in series. Other arrangements may include switching LED segments in either series or parallel connections.

Various embodiments include an adjustment where the LED current is a function of the input AC line voltage and/or firing angle of the phase-controlled dimmer supply. This can result in improved dimming, more consistent with incandescent as well bringing the light output to very low level at high dimmer firing angles, nears its end of travel where typical dimmer instability and inconsistencies occurs leading to objectionable light flickering, shimmering or other objectionable characteristics.

Various embodiments may include an adjustment where the bleeder current is a function of the input AC line voltage and/or firing angle of the phase-controlled dimmer supply and/or LED current. This can result in improved efficiency by supplying the minimum holding current at the appropriate levels when necessary.

Other embodiment may also add assembly into tight form factors such as E12 lamps base, reduction of flicker, and improved thermals.

The details of various embodiments are set forth in the accompanying drawings and the description below. Other features and advantages will be apparent from the description and drawings, and from the claims.

BRIEF DESCRIPTION OF THE DRAWINGS

FIGS. 24A-32 depict perspective, cross-section, and tabular views to explain and illustrate exemplary packaging of diversion current modules of FIGS. 6-23B within a standard form factor lamp base.

Like reference symbols in the various drawings indicate like elements.

DETAILED DESCRIPTION OF ILLUSTRATIVE EMBODIMENTS

Figure 1:
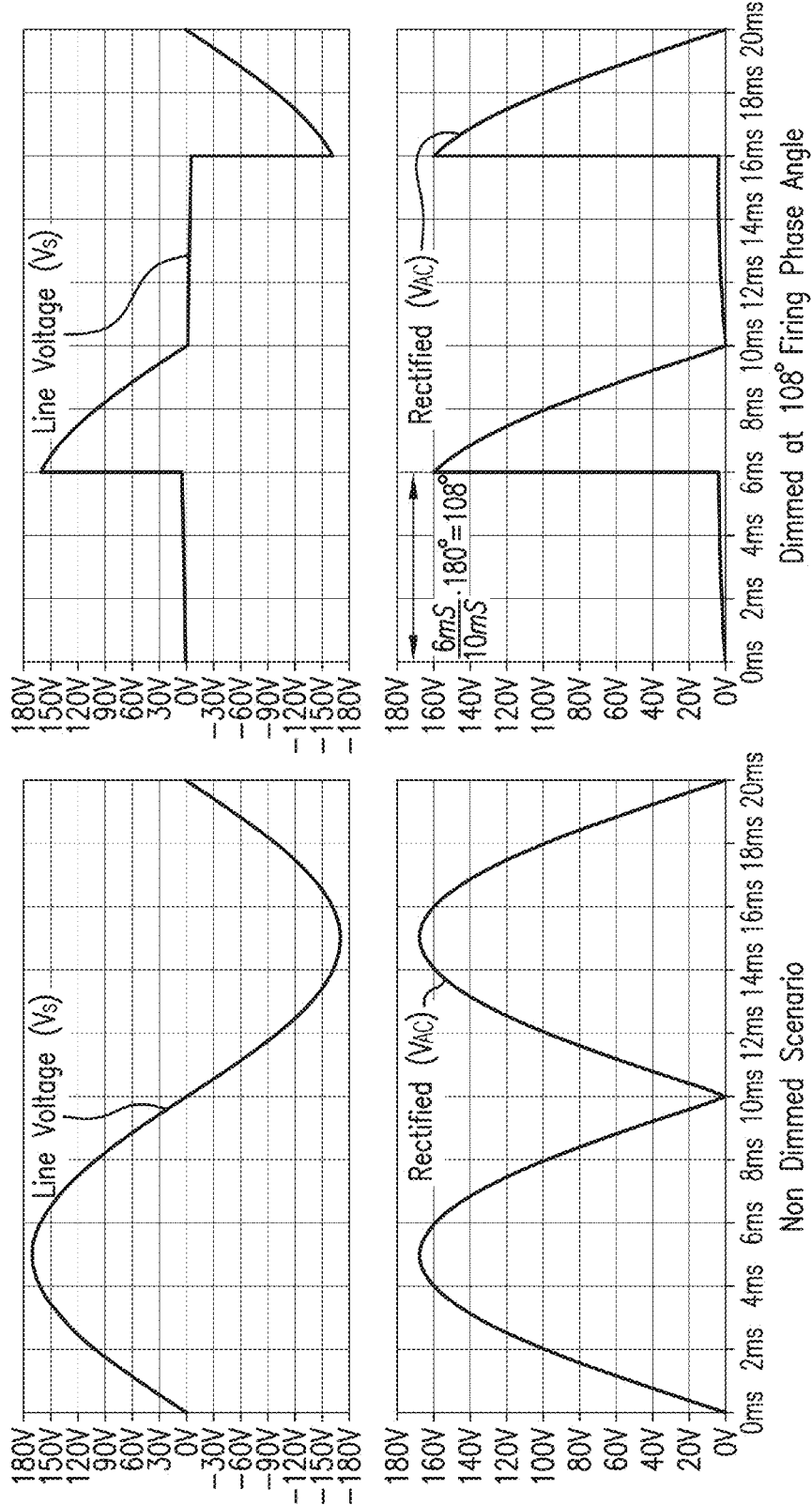
FIGS. 1-5 depict circuit schematics and corresponding waveform and performance plots to explain issues pertaining to LED dimming using prior art approaches.

The field of LED lighting has made tremendous progress with no area left untouched, from the replacement of simple incandescent filament lamp to the replacement of high output HID street light fixtures. Compatibility with existing infrastructure, however remains a challenge. In particular, compatibility with legacy dimmers has been the bane of lighting engineers. Even significant in house testing by manufacturers has not been a reliable guarantee of compatibility in the field. It is a significant undertaking to test the numerous, poorly documented and unpredictable legacy infrastructure of dimmer, wiring, and load combinations. This is particularly problematic for LED retrofit lamps where cost and space pressures limit the capabilities for the electronic driver. For the lighting specifier, the compatibility risk manifests as a major cost and time liability, frequent construction delays, and even reputational risk. In many cases, the compatibility risk has ruled out the use of low cost LED retrofit lamps when otherwise it would have been suitable. Rather, expensive integral LED fixtures are specified to be paired with specific dimmers systems, resulting in orders of magnitude higher cost.

To aid understanding, this document is organized as follows. First, with reference to FIGS. 1-5, a survey of prior art teachings establishes a foundation for subsequent discussion of novel solutions. Second, novel deep dimming LED driver designs configured to optimize efficiency while maintaining a source device holding current are introduced with reference to FIGS. 6-23B. Then, leveraging those highly efficient deep dimming technologies, the discussion turns, with reference to FIGS. 24-32, to integrally packaging such deep dimming LED drivers into the bases of widely used lamp form factors. Next, with reference to FIGS. 33-39, the discussion turns to exemplary embodiments that introduce color temperature shifting as of function of dimming. Specifically, at low dimming levels, for example, various embodiments may dim an LED lamp in response to a phase-controlled device (e.g., SCR, triac, thyristor) for which the hold-up current may be maintained by an embodiment of a deep dimming driver. Finally, with reference to FIGS. 40-42, further explanatory discussion is presented to introduce methods to improve service life of lamps that include imperfectly matched parallel strings of LEDs.

Deep Dimming LED Driver Designs

In a first application, the circuit is applied to a full clear glass decorative filament lamp to replace incandescent lamps. Decorative lamps are highly suitable for such technology as this application generally requires excellent dimmability while requiring a very space efficient driver to fit only into the lamp base. Such technology is also applicable across all LED lamp types and other LED application, such as, for example, fixtures, displays, instrumentations, or standalone LED drivers. It is also anticipated that simply by frosting or coating the glass with a diffusive material, the clear glass decorative lamps is converted with the same look and feel of the traditional frosted incandescent lamps.

Although various embodiments described herein relate to dimmers, other embodiments may make the LED driver highly compatible with other devices that need hold up current. Such devices may include, by way of example and not limitation, occupancy sensors, electronic transformers such as 12V for MR16, and fluorescent ballasts such as for T8, T12, T5, CFL, PLT or HID ballasts, for example.

FIGS. 1-5 depict circuit schematics and corresponding waveform and performance plots to explain issues pertaining to LED dimming using prior art approaches.

Prior Art LED Dimmability Issues

By way of example and not limitation, some root causes for LED driver incompatibility with legacy dimming infrastructure may include: (1) insufficient hold up current needed to turn on the triac and keep it stable; (2) traditional LED drivers have reactive non-linear reactive loads; (3) high variability in firing angle and dimmer range; (4) minimum LED dimmed level is insufficient and do not match minimum incandescent levels; and; (5) asymmetry in the positive and negative firing of the dimmer as one polarity of the cycle is on for a longer time period than the other polarity, resulting in visible difference in the light output called "shimmer" occurring at the line frequency, for example 60 Hz in North America.

(1) Insufficient Hold Up Current

Leading edge dimmer are popular as they are low cost. They are constructed with a phase-controlled rectifier component, such as a triac for example, that requires a minimum hold up current to maintain forward conduction. Although various examples referred to herein discuss triacs, persons of ordinary skill in the art may or may not recognize equivalent components that can function as phase-controlled rectifiers with a holding current requirement. In various examples, a triac may have a minimum holding current requirement between about 5 mA up to about 60 mA, such as between about 10 and about 40 mA, for example. In some examples, about 25 to 50 mA of minimum holding current, $I_H$, may be required to maintain the triac in a forward conduction, or active state. Triac dimmers were designed for high wattage incandescent resistive loads where providing sufficient holdup current was not an issue. In contrast, the very benefit of LED is energy efficiency resulting in significantly lower power draw and thus lower current draw. Some LED drivers may not reliably provide the holdup current, especially in dimmed conditions.

Figure 2:
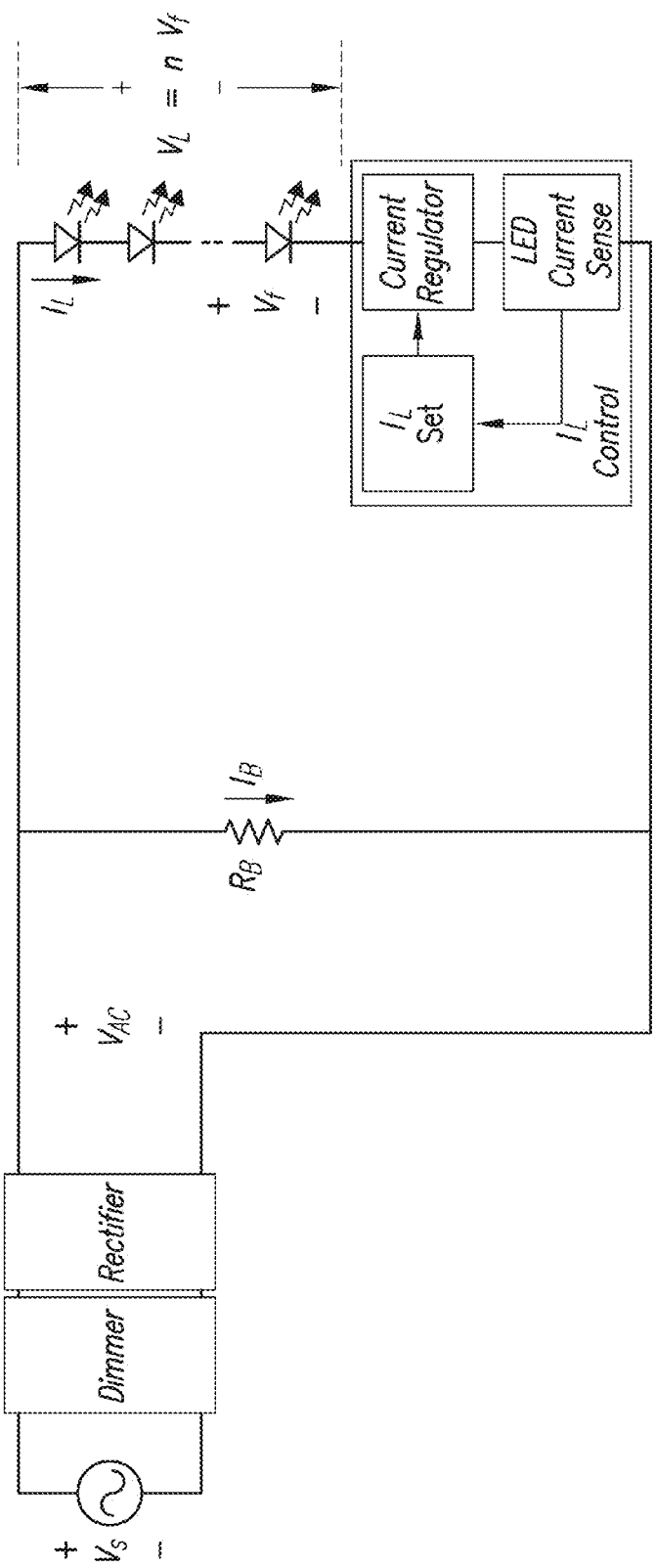

In one prior art solution, illustrated in FIG. 2, a simple resistor is used to provide an unregulated bleeder current. However such an implementation is highly energy inefficient. In order to meet a 30 mA minimum hold up current at a line voltage of $V_{AC}$=60V, the driver drops to and average efficiency of 26%. The majority of the power is consumed by the bleeder resistor circuit ($R_B$, $I_B$). Even if this efficiency was acceptable, there is a significant heat generated which is often difficult to dissipate. As consequence, LED drivers are often implemented with significantly less than required holding currents thus making their dimmer compatibility very poor.

(2) Traditional LED Drivers have Reactive "Nonlinear" Loads.

Reactive loads can cause ringing between the dimmer and the LED driver. The ringing is problematic in that the average current sourced by the LED driver, $I_D$, may be well above the required hold current, $I_H$. However the ringing causes the driver current, $I_D$, to momentary to drop below $I_H$. This will shut off the dimmer thus shutting off the current completely. This series of catastrophic feedback events makes the LED driver highly incompatible with dimmers. Further, it is difficult to provide a reliable solution for reactive loads due to uncontrolled and unknown variety of dimmers used and it is interaction with the unknown installation wiring and variable quantity and types of loads on the dimmer circuit. There are have been numerous instances where manufacturers claim compatibility with a single lamp under laboratory conditions, however fail in the real world. The simple case of using multiple lamps interacting across an unknown wiring system with a single dimmer means the reactive loads are highly variable, unpredictable and untestable.

Switching mode drivers, have high frequency switching components that requires input capacitive and inductive elements to filter out the generated noise, thus reactive loads are inherent and difficult to avoid in such implementations.

(3) High Variability in Firing Angle, Asymmetries and Dimmer Range.

Many traditional LED driver electronics rely on the line voltage to determine dimming level. However, dimmer minimum firing angle is variable form dimmer to dimmer. In addition to normal line variation, a fixed voltage does not correlate well to the minimal firing angle of the dimmer. Even within a single dimmer, the firing angle variability is dependent on the holdup current. Generally the higher the holdup current the higher consistency in firing angle.

Jitter in Line voltage causes flicker especially at high dimmer levels. Small changes in phase angle result in relative large brightness variations which are noticeable as "shimmers" or "flicker". The last part of the dimmer travel is highly inconsistent, due to asymmetries in firing angles, hysteresis, small fluctuation such as jitter, temperature, etc.

(4) Minimum Dimming Level

The eye response to light is generally quadratic. Typically, 1% light is perceived by the eye as about 10% light level. Most dimmable LED driver provide linear light output as function of dimmer phase angle, meaning 99% of the dimmer firing angle only results in a 10% perceived dimming level. Thus dimming does not seem smooth. A significant range of dimming level, 0 to 10%, is substantially compressed into the last part of the dimmer travel.

(5) Asymmetry in the Positive and Negative Firing of the Dimmer

Another issue is the dimmer does not symmetrically fire with the same duty cycle on the positive and negative cycle of the Line Voltage. In instances where the duty cycle controls the light intensities, the differences between the positive and negative cycles may result in a visible intensity variations at the line voltage, for example 60 Hz in North American utility grids, which may be referred to herein as "shimmer." Typically the difference between the positive and negative cycles is a constant time delta in the duty cycle. The effect of this is not visually noticeable until dimming is about 20-30%, where the constant time delta may represent a substantial percentage of the average duty cycle.

Definition of Dimmer Firing Phase Angle

This document will interchangeably use the terms "Angle", "Phase Angle", "Phase", "Phase cut angle" and "Firing Angle" to mean the cyclic timing in the line voltage cycle when the dimmer activates. In leading edge dimmers, this is when the dimmer turns on (e.g., the triac starts conducting current). Consider as in FIG. 1, a line voltage frequency of 50 Hz, the sinusoidal voltage waveform, $V_S$, repeats every 10 mS. The phase angle range is defined from 0 to 20 mS or equivalent of 0° to 360°. Since the line is rectified in the driver, $V_{AC}$, the cycle is repeated every 10 mS so we can just consider 0° to 180°. Although in reality there are asymmetries between 0° to 180°, versus 180° to 360°, this will be considered later. In FIG. 1, the line voltage, $V_S$, and the rectified, $V_{AC}$, waveforms are shown for a non-dimmed and a dimmed scenario at 108° (6 mS/10 mS·180°=108°). The function of the dimmer is to vary this firing angle within 0° to 180° to provide the appropriate level of dimming. In the reality, the actual range of dimmer is generally much more limited, for example, it may be typically be in a range from 40° to 140°.

Figure 3:
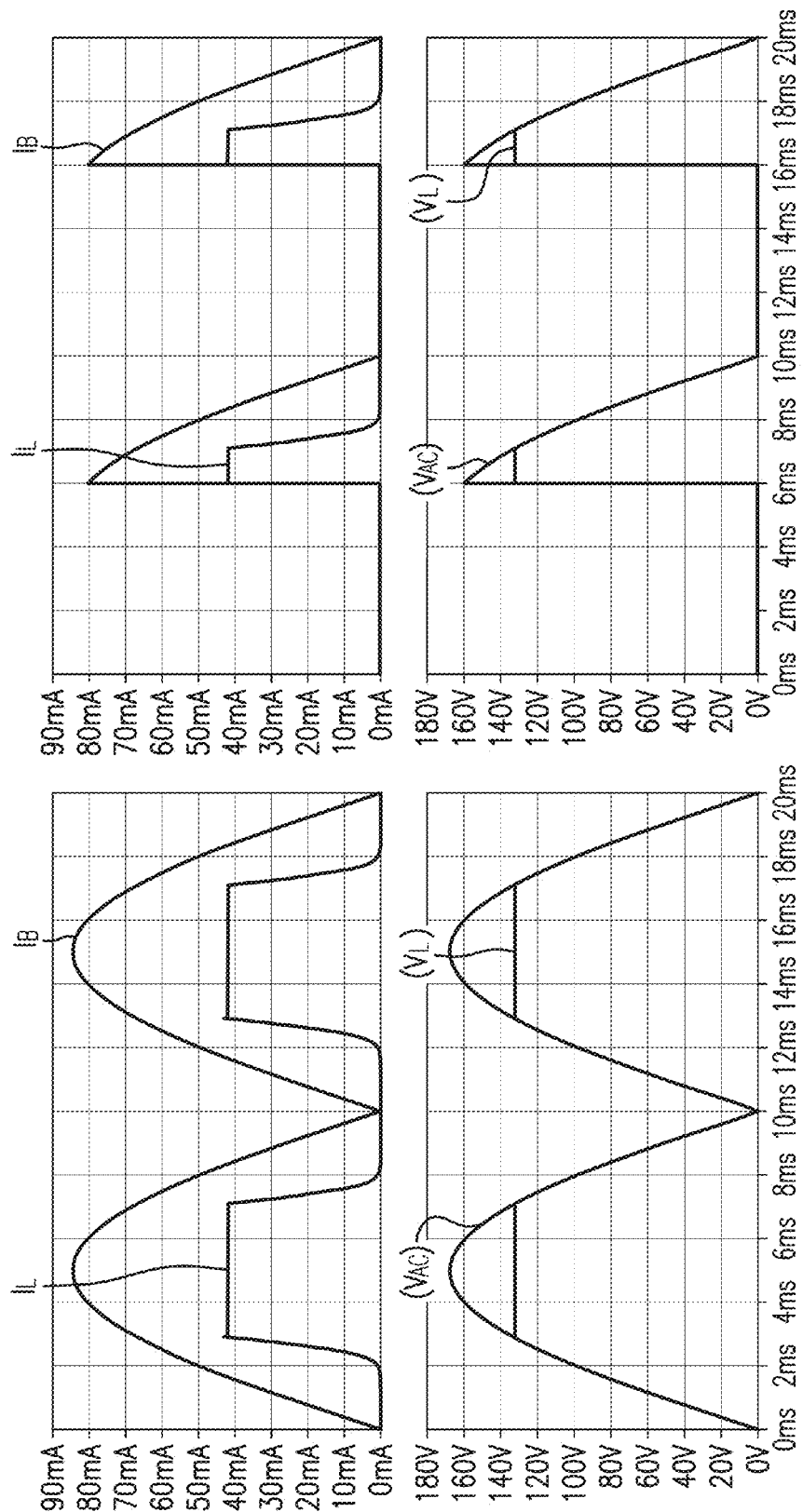

Example 1 of Prior Art Implementation of FIGS. 2-3

FIG. 2 shows a prior art implementation using a simple resistor $R_B$ to provide diversion current. However the diversion current is not constant and varies with the rectified AC line voltage $V_{AC}$. The resulting current voltage waveforms are shown in FIG. 3.

To facilitate discussion and aid understanding, the following terms as used herein are described:

$V_S$ Input AC line voltage. Some common input voltage include 100 VAC, 110 VAC, 120 VAC, 230 VAC, 240 VAC, 277 VAC, 12 VAC, 24 VAC, 8 VAC, etc. For the examples in this document, $V_S$=120 VAC @ 50 Hz. Although 50 Hz is used to simplify some exemplary calculations, the principles may be applied to other utility line voltages and frequencies, such as 60 Hz in North America.

$V_{AC}$ Rectified line voltage $V_S$.

$R_B$, $I_B$ Resistor and current for the bleeder circuit. For example, to set $I_B$ to 30 mA when $V_{AC}$=60V, this requires $R_B$=2000Ω.

n, $V_f$ n is the number of individual LEDs each with an individual forward voltage of $V_f$. The number and types of LEDs is intended to be very general. For various examples in this document, n=40 with $V_f$=3.35V. $V_L$ is the total forward of the LED string, in this case $V_L$=n·$V_f$.

Rectifier Can be half or full bridge. For the example in this document, a full bridge will be considered.

$I_L$ Control The LED current control may be part of the current regulation in the LED string. Example includes high frequency switch mode drivers such as buck, boost, and flyback. Other example of could include linear control topologies.

Linear control topologies may be referred in the most general term where there is at least one linear control to maintain a predetermined but not necessary fixed LED current control point. There may be multiple linear controllers that switch in and out to LED segments to match the AC line voltage. There are also switching circuits in combination with one or more linear controllers that switch the LEDs segments from series or parallel to match the line voltage. For this document, the example used for LED current control will be a linear regulator. But it is anticipated any of the LED controllers mentioned are possible. In particular for this example, the current set point $I_L$, is set at a predetermined but not necessarily constant set point, that is achieved when the line voltage is greater than the forward voltage of the LEDs, $V_{AC}$>$V_L$.

$I_L$, $V_L$ Current and Voltage across LED String. For the examples in this document, $V_L$=135V and the current is controlled to an average $I_L$=20 mA.

Dimmer: Leading edge such as Triac, trailing edge, electronic low voltage, etc. By way of illustration and not limitation, various examples used in this document may generally refer to implementations in which the dimmer will be a leading edge Triac dimmer. Persons of ordinary skill in the art may recognize how the teachings contained herein may be adapted in some particulars, such as with respect to certain specific components such as, for example, the phase controlled triac, may be substituted with equivalent components. As applicable, other control strategies In this example where $R_B$=2000Ω, the bleeder current, $I_B$, is sinusoidal. We achieved $I_B$=30 mA of bleeder current when voltage $V_{AC}$=60V. However as the line voltage continues to increase to $V_{AC}$=180V, it leads to a significant increase in bleeder current by 3× to $I_B$=90 mA. The efficiency of the circuit is 26%.

Figure 4:
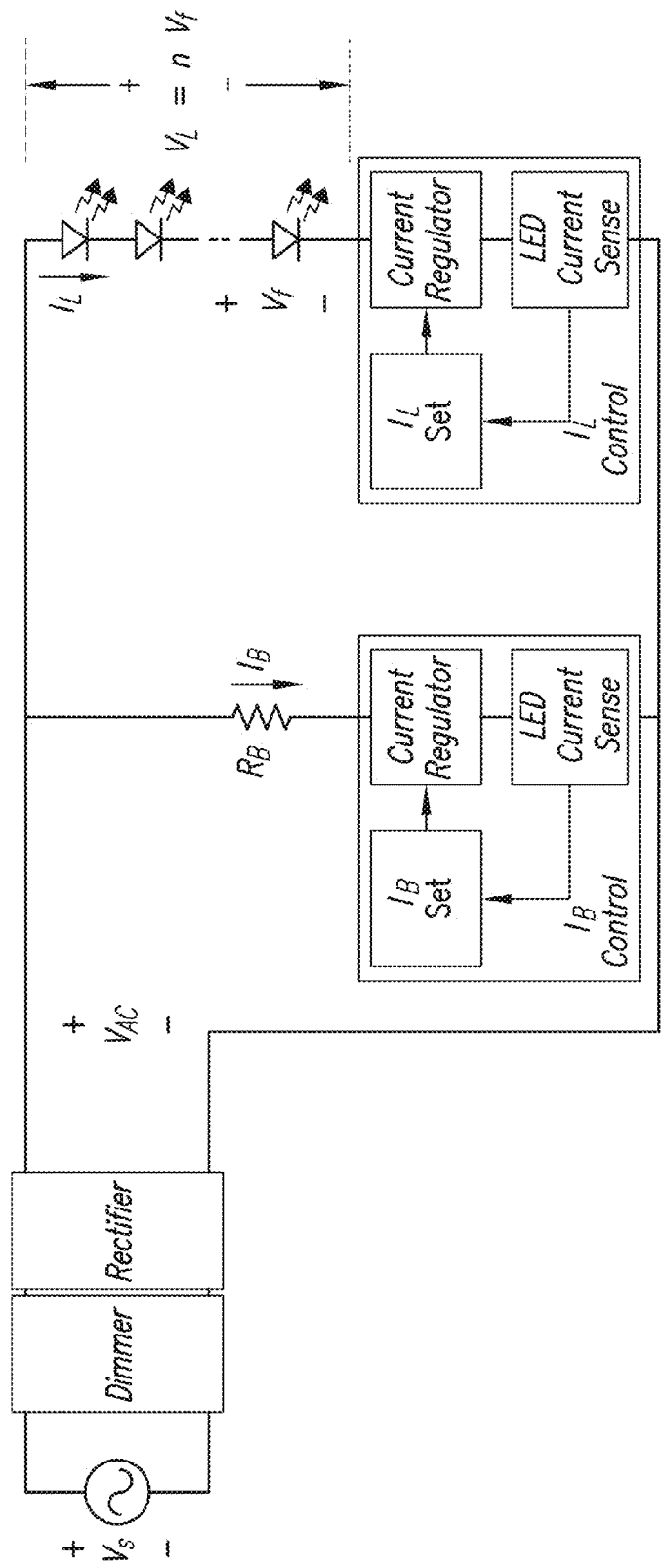
Figure 5:
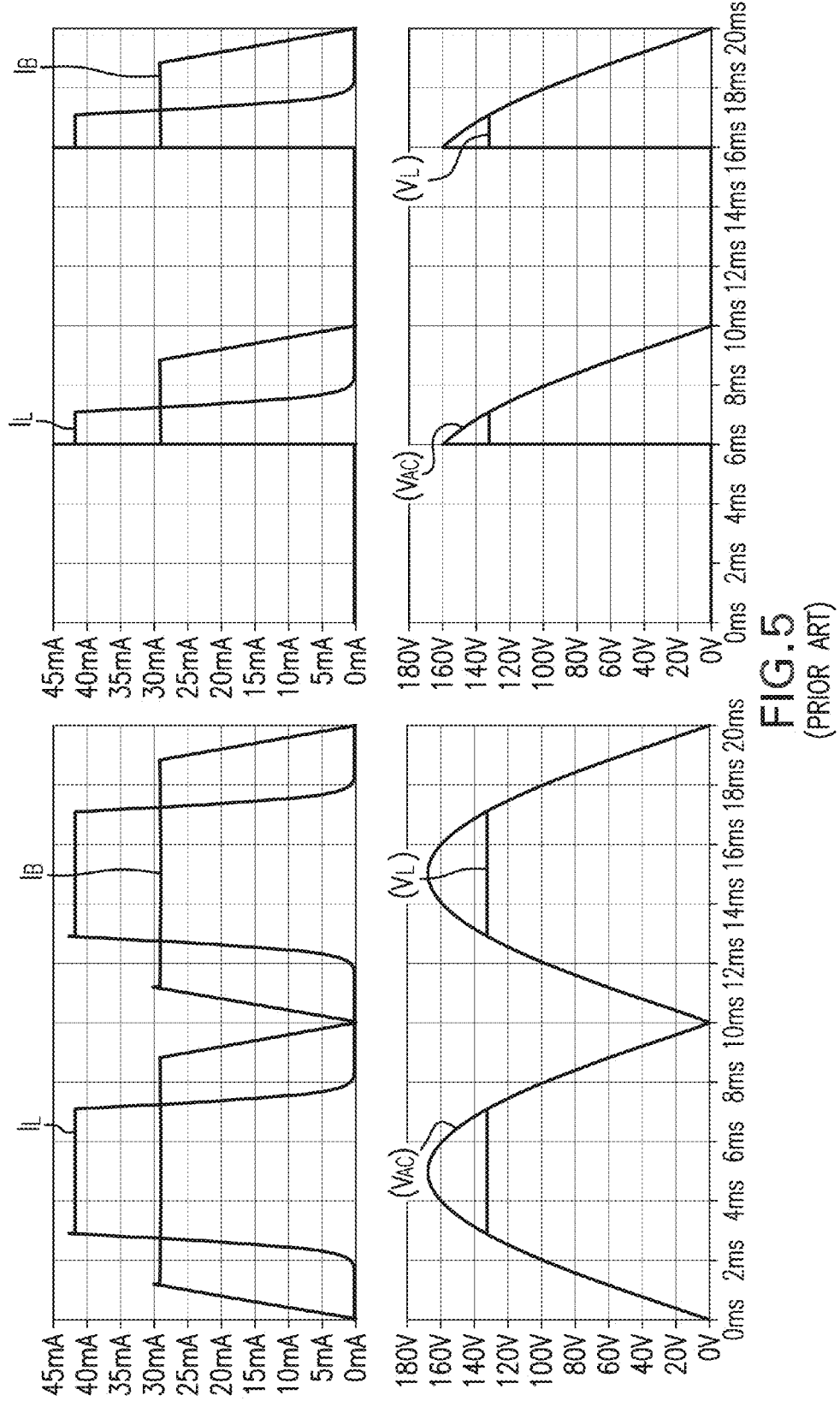

Example 2 of Prior Art Implementation of FIGS. 4-5

FIG. 4 shows a prior art improved implementation using a current regulator and a resistor $R_B$ in the diversion current path. Efficiency is improved since the bleeder current $I_B$ is fixed after $V_{AC}$ reaches a certain value. The resulting current voltage waveforms are shown in FIG. 5.

In this example, bleeder circuit current is regulated to a constant value of $I_B$=30 mA, once $V_{AC}$>$I_B$·$R_B$ or $V_{AC}$>60V.

One implementation of such $I_B$ regulation circuit would be a linear regulator. The efficiency of such a circuit increases from 21% to 42%.

The table below shows examples of the maximum required triac hold up currents for a population of commercially available triacs, whether they are used in a lamp dimming system or not, from the Mouser Online website. As can be seen, small hold up currents, e.g., $I_H$<5 mA, which is good for efficiency, but results in poor compatibility of less than 5%. The holdup current of $I_H$>12 mA is desired for some minimum level compatibility. From actual testing, $I_H$>15 mA may be, for some implementations, a minimum practical selection in order to provide some reasonable compatibility with approximately 34% of legacy triacs. A bleeder current control circuit configured to maintain $I_H$>15 mA in a lamp can be expected to generate significant heat that needs to be thermally managed.

| Max Triac Holding Current (mA) | % of All Triacs |
| --- | --- |
| 1.5 | 0% |
| 2 | 0% |
| 3 | 0% |
| 5 | 5% |
| 6 | 5% |
| 7 | 8% |
| 8 | 8% |
| 10 | 22% |
| 12 | 23% |
| 15 | 34% |
| 20 | 40% |
| 25 | 44% |
| 30 | 50% |
| 31 | 50% |
| 35 | 63% |
| 40 | 65% |
| 45 | 66% |
| 50 | 82% |
| 60 | 88% |
| 70 | 91% |
| 75 | 94% |
| 80 | 95% |
| 100 | 99% |
| 120 | 100% |
| 150 | 100% |

Embodiments that Improve LED Dimmability

FIGS. 6-23B depict various circuit schematics and corresponding waveform and performance plots for exemplary diversion current modules that dynamically add a diversion current to an LED current so that the summed current maintains a predetermined minimum holding current requirement of a phase-controlled dimmer supply. In particular, these embodiments described herein next address improvements in performance, reliability, and/or efficiency for LED lamps dimmed by a phase-controlled source.

Accordingly, in various embodiments, the dimmer hold up current, $I_H$, may be varied rather than constant. For example, $I_H$ may be controlled in predetermined manner to maximize compatibility and efficiency. By way of example and not limitation, such control may include varying holding current in a predetermined manner as a function of dimmer firing phase angle, line voltage, phase of the line voltage and/or moderating the current as function of the LED current. In some embodiments, the LED current, $I_L$, may be controlled in a nonlinear manner according to the dimmer firing phase angle with a phase offset to provide smooth and deep dimming. LED current may be also be controlled as a function of line voltage, either alone or in combination with phase offset control, as function of the dimmer firing phase angle.

Varying Bleeder Current with Dimmer Firing Phase Angle

FIGS. 6-9 depict plots that illustrate exemplary performance improvements that can be gained from varying bleeder current as a function of firing angle.

Figure 6:
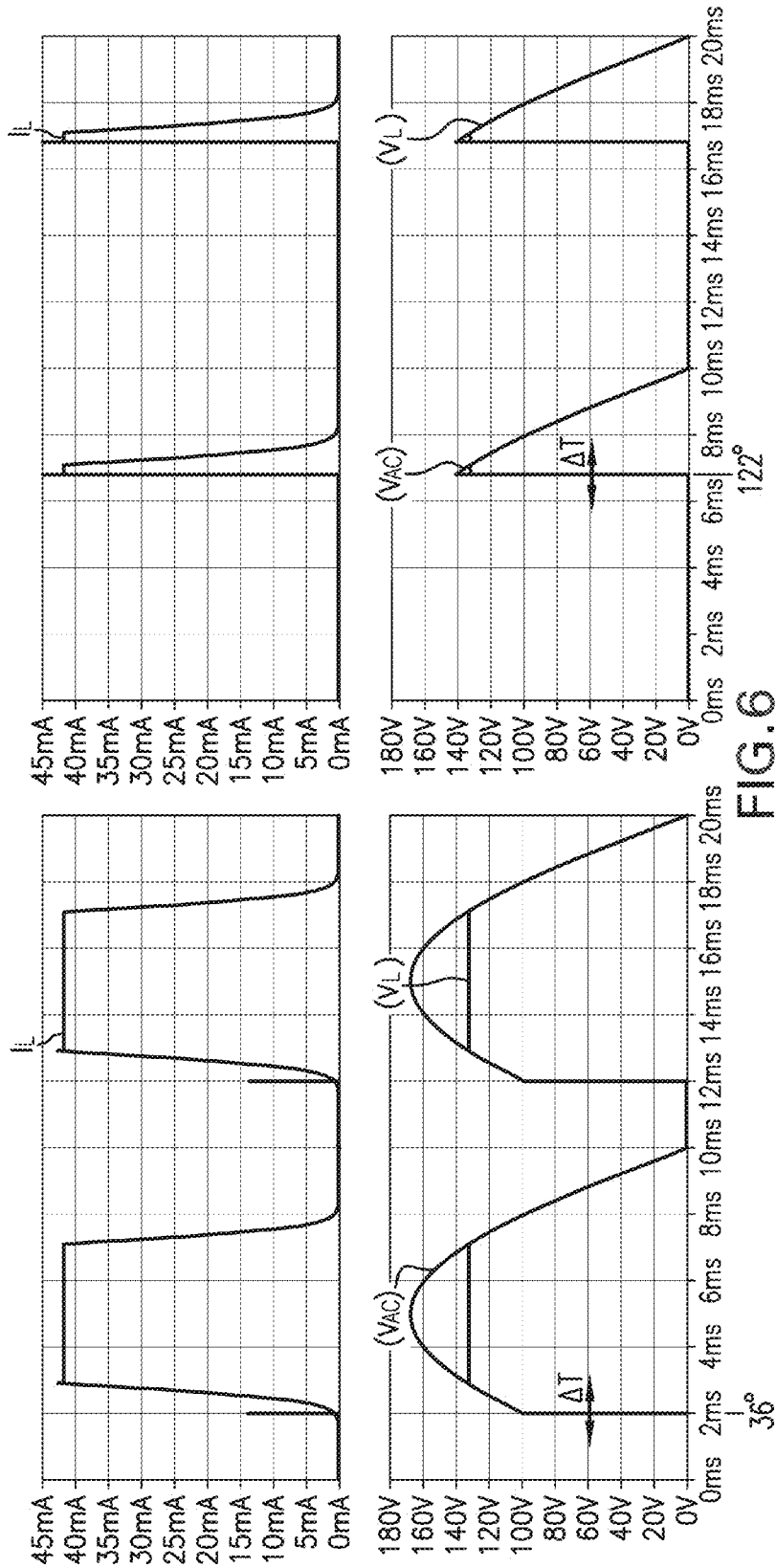
FIGS. 6-9 depict plots that illustrate exemplary performance improvements that can be gained from varying bleeder current as a function of firing angle.

According to some embodiments, bleeder current need not be constant across the dimmer range. At the minimum dimming position or low firing angles, the current is relatively less sensitive to changes, or jitters, in firing angle. In the example of FIG. 6, the LED average current, $I_L$, is substantially insensitive to firing angle jitter in the first 40° before the LED turns on. However, at higher dimmer setting or large firing angles, small jitters in firing angle exhibit a substantially larger impact on average LED current $I_L$.

Figure 7:
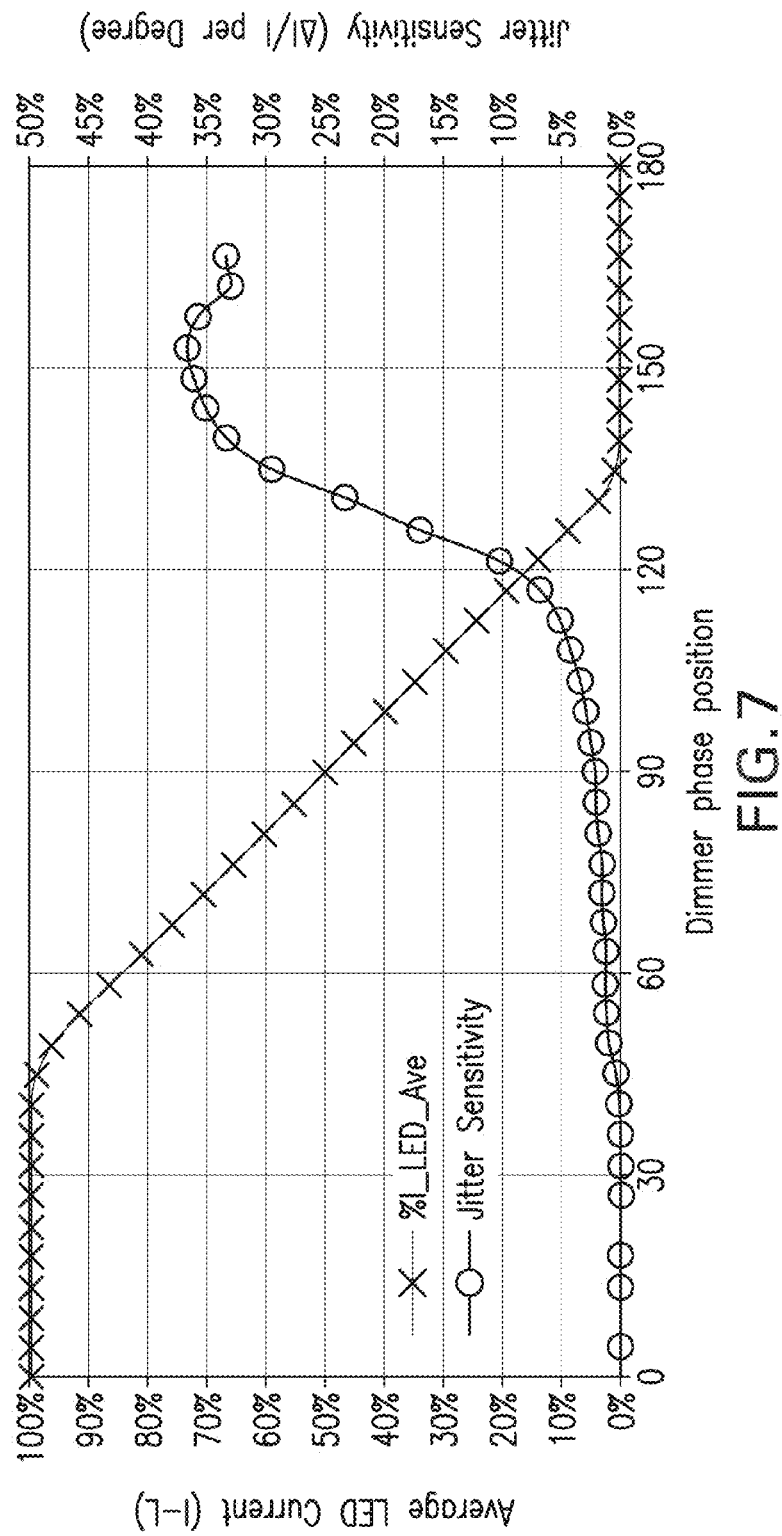

FIG. 7 illustrates a plot of a calculation of the jitter sensitivity as defined as ($\Delta I_L/I_L$/Degree), where $I_L$ is the average LED current. Form the graph, the LED turns on fully Degree between 40°, "LED Turn on", and 140°, "LED turn off". When the dimmer is firing between these angles, it creates a linear decrease in the average LED current as shown as "% I_LED_Ave" in FIG. 7.

Between 40° to 90°, the average current sensitivity or "jitter sensitivity" in FIG. 7 is less than 5% per degree jitter. Between 120° to 140°, jitter sensitivity increases to more than 20% per degree.

As a result, more jitter is allowable for low phase angle and therefore less bleeder current is necessary. However, for high phase angles, there is high sensitivity to jitter and higher hold up current is necessary.

Figure 8:
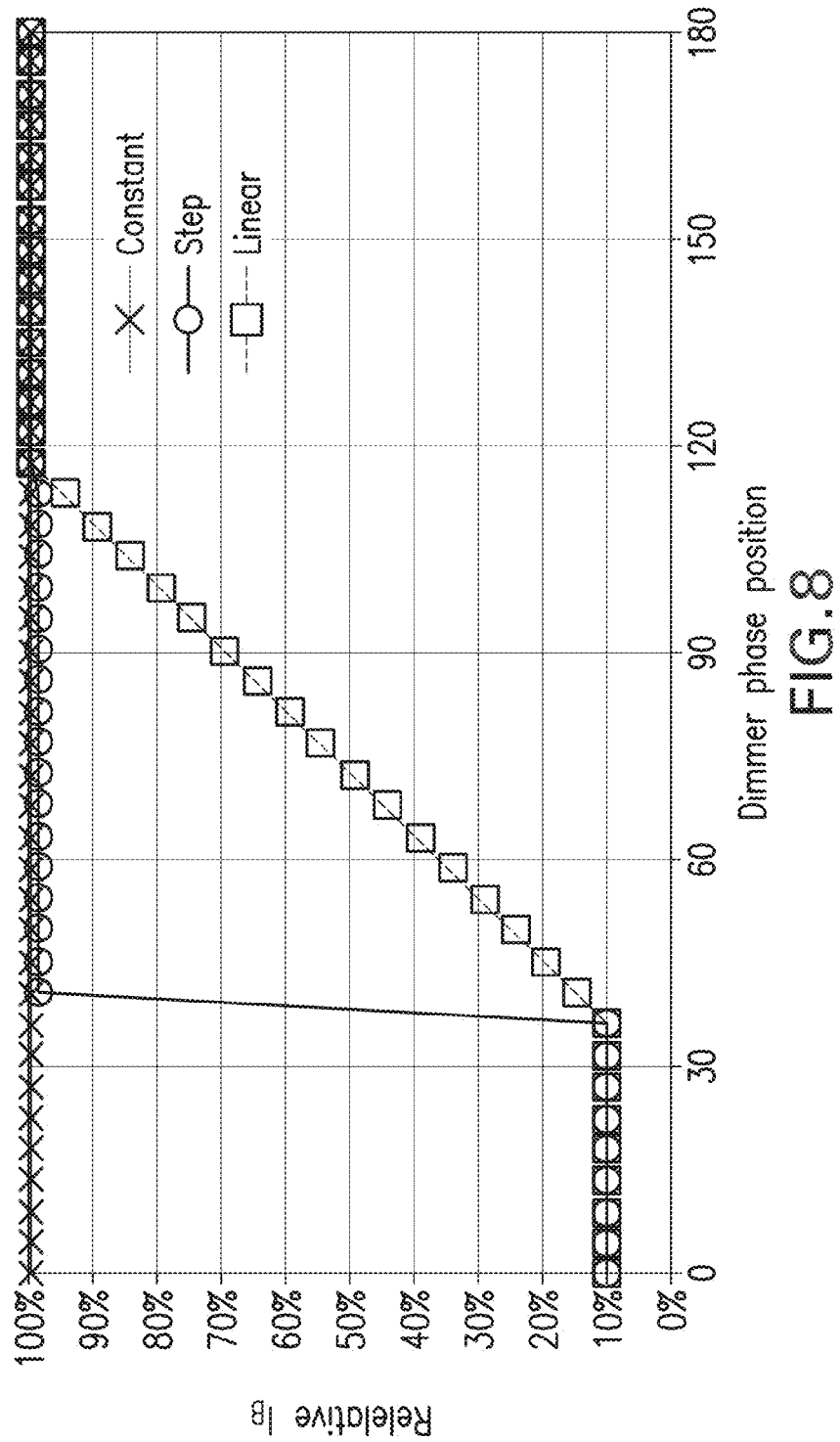

Numerous control schemes are possible to regulate hold up current as a function of phase angle. Two exemplary control schemes, "Step" and "Linear" are shown in FIG. 8, where the bleeder current is larger with higher dimmer firing angle. One is a simple step function, "Step", the other a linear function, "Linear". In both schemes, a minimum relative hold current of 10% of maximum is used up to a phase angle of 40°. In other implementations, it may be possible to set the hold current to be at or near 0% or very little hold up current at or near a phase angle of 0°. This is equivalent to having no dimmer in the circuit. Of course this is advantageous to maximize efficiency when no dimmer is present. However a small relative amount of current is typically needed by the dimmer or other control circuits in the system such as occupancy sensors. The prior art, "Constant", is also shown for comparison, where the holdup current is constant regardless of angle.

Figure 9:
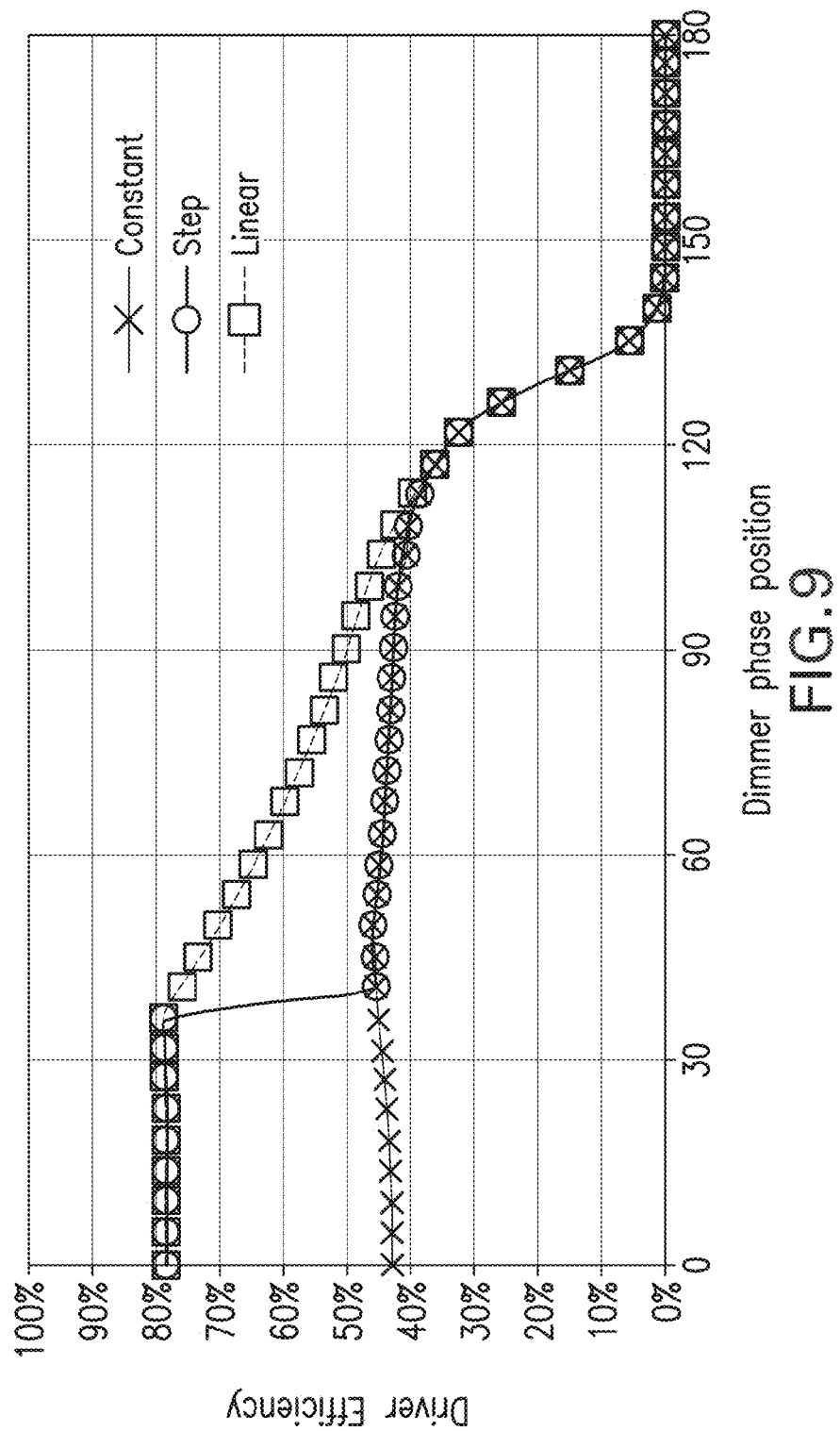
Figure 10:
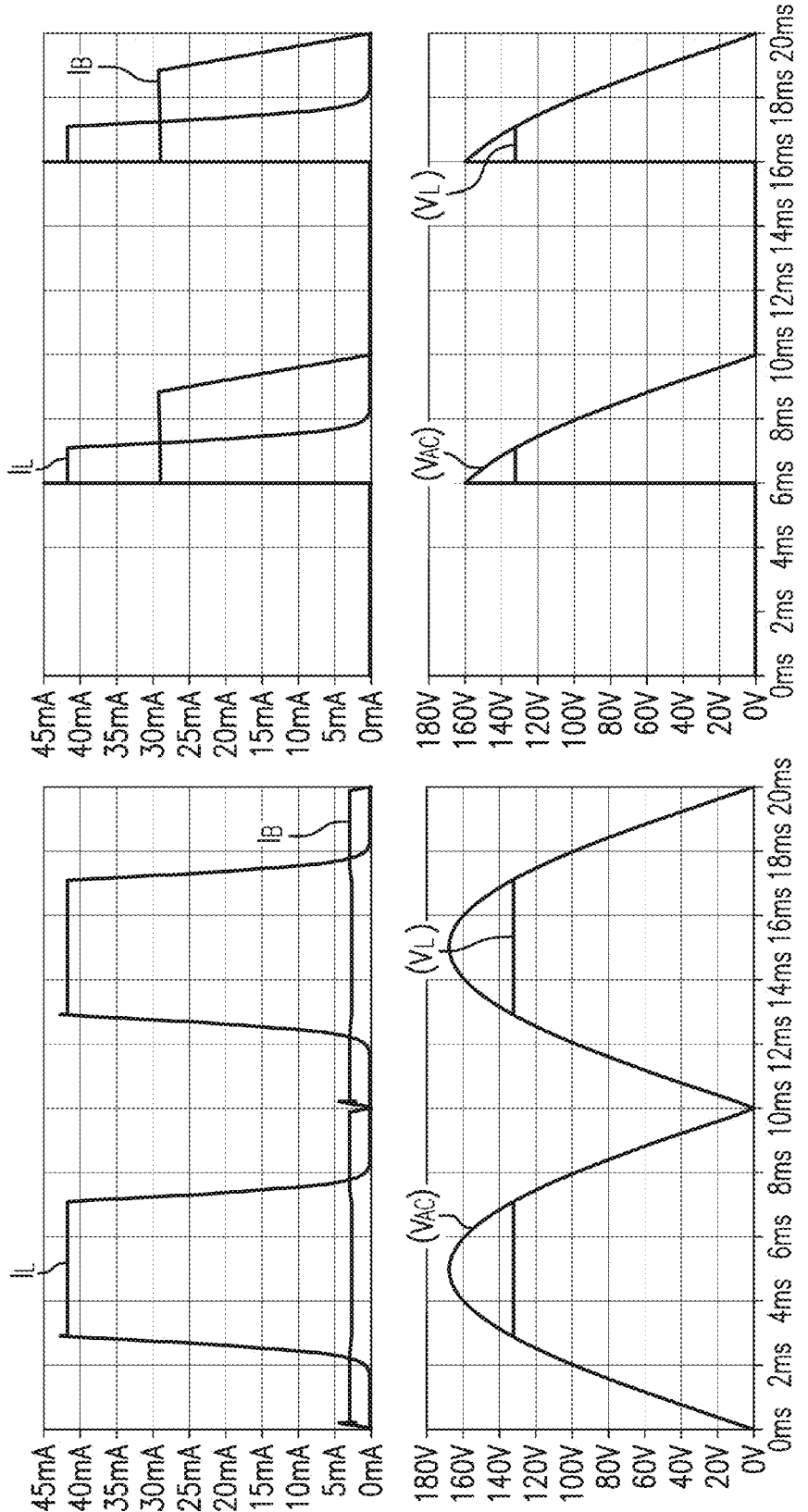
FIGS. 10-15 depict circuit schematics and corresponding waveform and performance plots for exemplary diversion current modules that dynamically add a diversion current to an LED current so that the summed current maintains a predetermined minimum holding current requirement of a phase-controlled dimmer supply.

FIG. 9 depicts a rather remarkable result of the control schemes from FIG. 8. The efficiency is almost doubled in the non-dimmed state, or phase angle of 0°, to almost an 80% efficiency from the original 42% efficiency. The improved efficiency is due to the bleeder current being only 10% of the maximum of the dimmed state.

Minimize Bleeder Current when the LED is Off.

In another insight, when the LED is not conducting and therefore there is little to no light output, jitter in the firing angle is not important. Therefore little to no bleeder current is needed. The key is sufficient bleeder current just before the LED turns on, and just after the LED turns completely off to ensure the firing is sufficiently consistent. As explained previously, this is especially critical at the higher phase angles, when the jitter sensitivity is highest.

Figure 11:
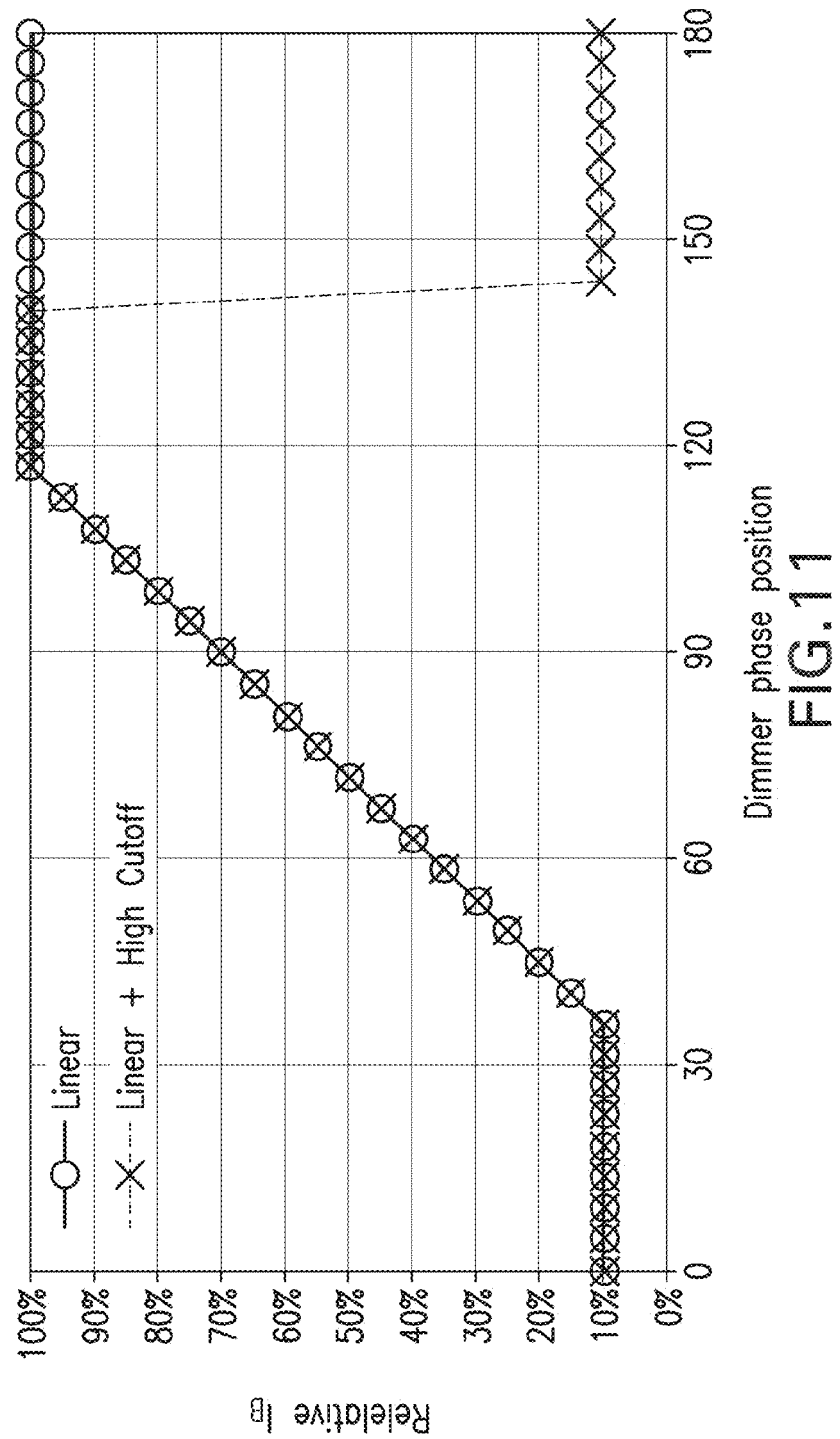
Figure 12:
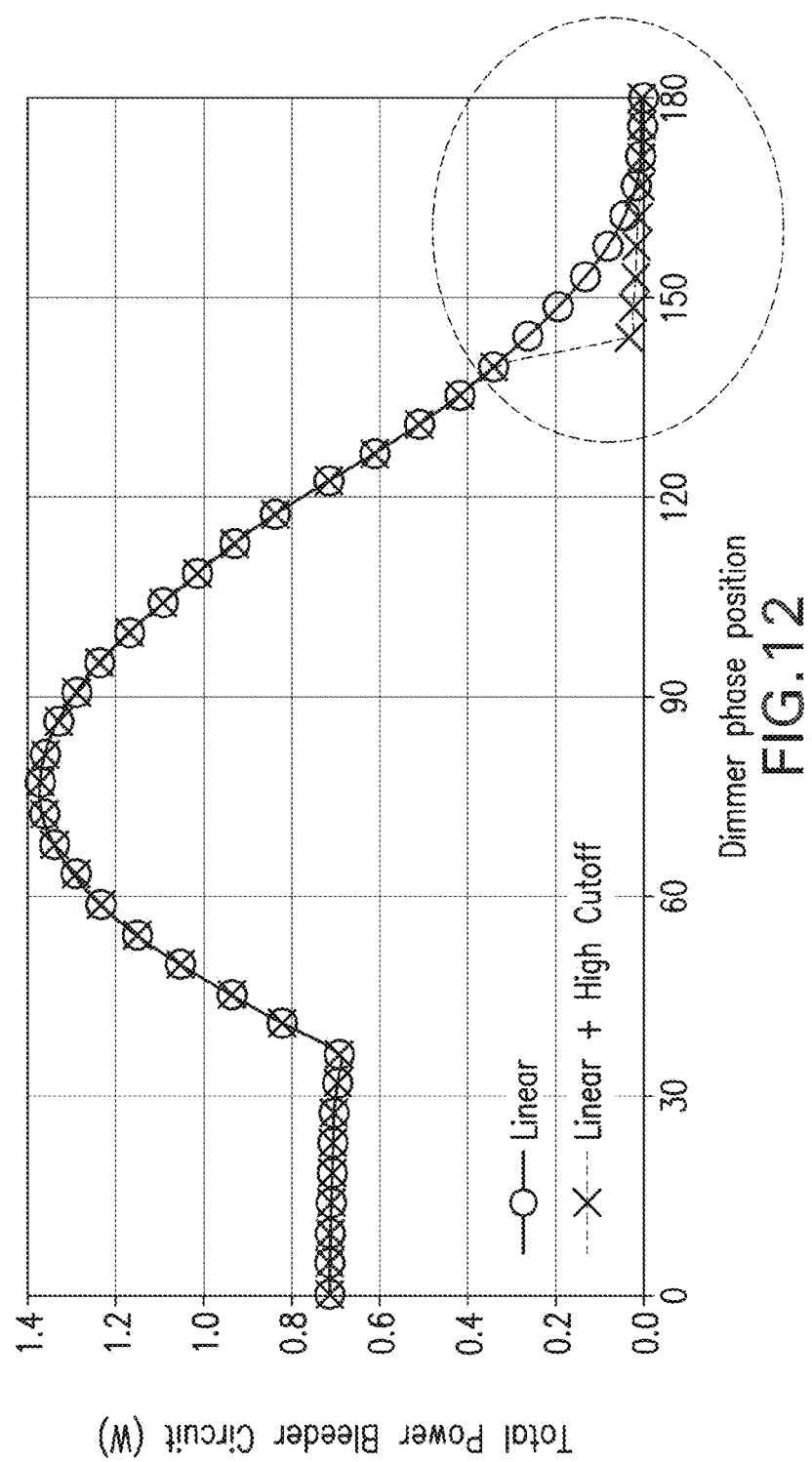

This insight can be implemented in 2 ways:

A first implementation approach may be to minimize the hold current drawn from the driver (e.g., triac) at high dimmer positions, especially after the LED stops conducting. This is an alternative embodiment discussed with reference to FIGS. 6-10. An example of this high cutoff is shown in FIG. 11 where the holding current is reduced to 10% of the non-high cut off case. The key impact is in the power drawn by the bleeder circuit at high dimmer positions. As shown in FIG. 12, at 144°, the power draw is reduced from 0.26 W to 0.03 W.

A second implementation approach may be to minimize hold current with line voltage. In this implementation, the driver holding current is adjusted to a lower position regardless of dimmer position. Ideally the holdup current is set to a low position when the LED is conducting and to a high position when the LED is not conducting. An example of this is described with reference to FIGS. 22-23B.

Of course, controlling the hold current set point BOTH as a function of phase and line voltage can be implemented.

Modulating Bleeder Current According to LED Current to Achieve Minimum Hold Up Current Another key insight is the current sourced by the driver, $I_D$, necessary to achieve the minimum driver holdup current, $I_H$, is the sum of the bleeder current, $I_B$ and the LED current, $I_L$. ($I_H \leq I_D$ or $I_H \leq I_B + I_L$). The bleeder current, $I_B$ only needs to make up the difference between the holdup current, $I_H$, and the LED Current, $I_L$. In cases where the LED current is larger or equal to the necessary hold up current, the bleeder or diversion current will be set to zero. This can be expressed as:

$$I_B = I_H - I_L \text{ for } I_H \geq I_L$$

$$= 0 \text{ for } I_H < I_L$$

Figure 13:
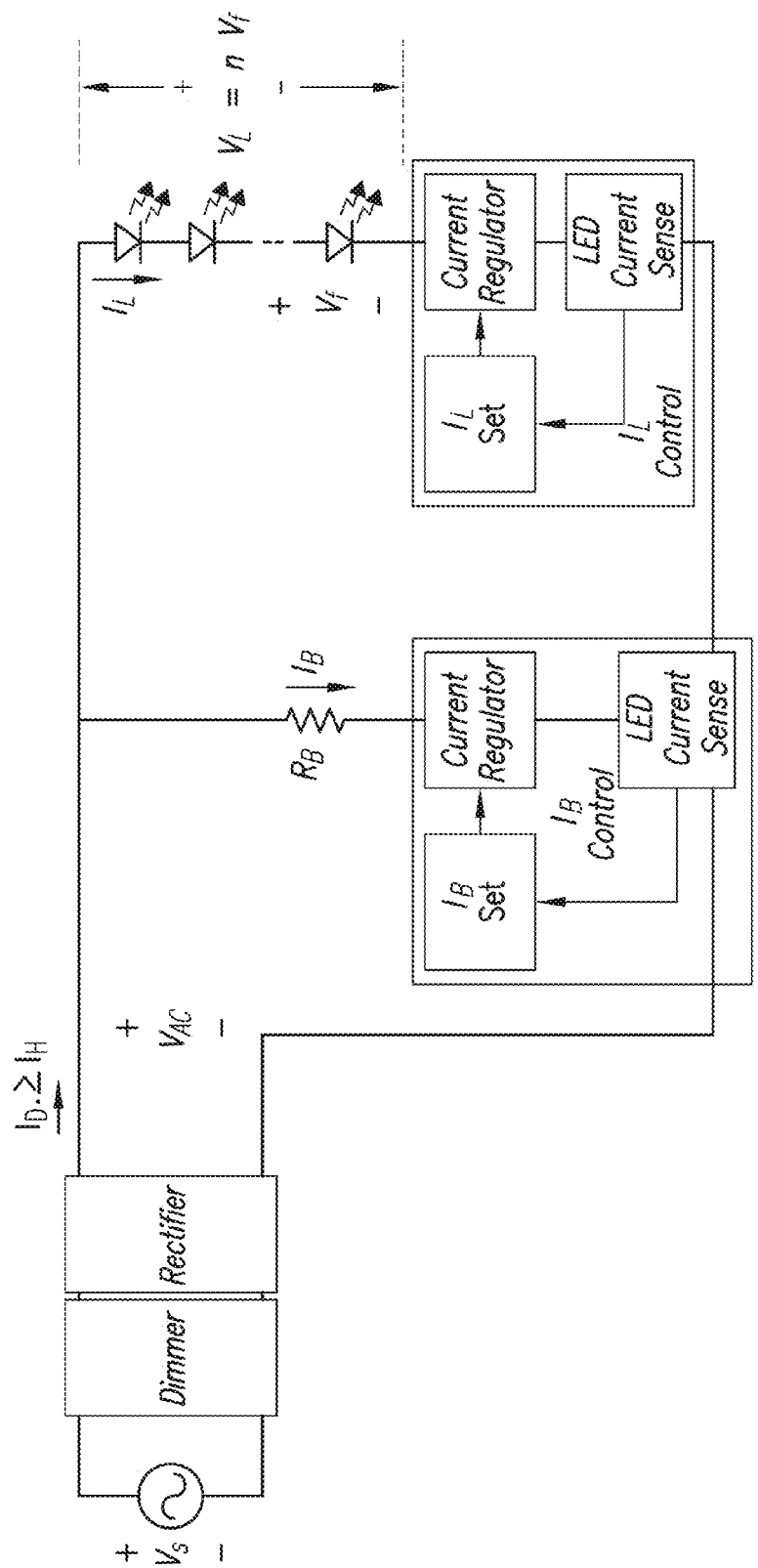

The control for $I_B$ needs to sense the LED current, $I_L$, as shown in block diagram schematic of FIG. 13.

In this implementation, the LED current, $I_L$ set point can still be constant or be varied according the dimmer firing angle and/or line voltage, as was previously done for setting $I_B$ in the discussion with reference to FIGS. 6-10.

In various implementations using, for example, a linear regulator, the set point for the current regulation may be different than the actual regulated current, for example, where the available supply voltage is not within an acceptable operating voltage range for the regulator to output the set point current. The regulator may produce a lower current, or stay off, until the supply voltage is within acceptable operating voltage range.

Figure 14:
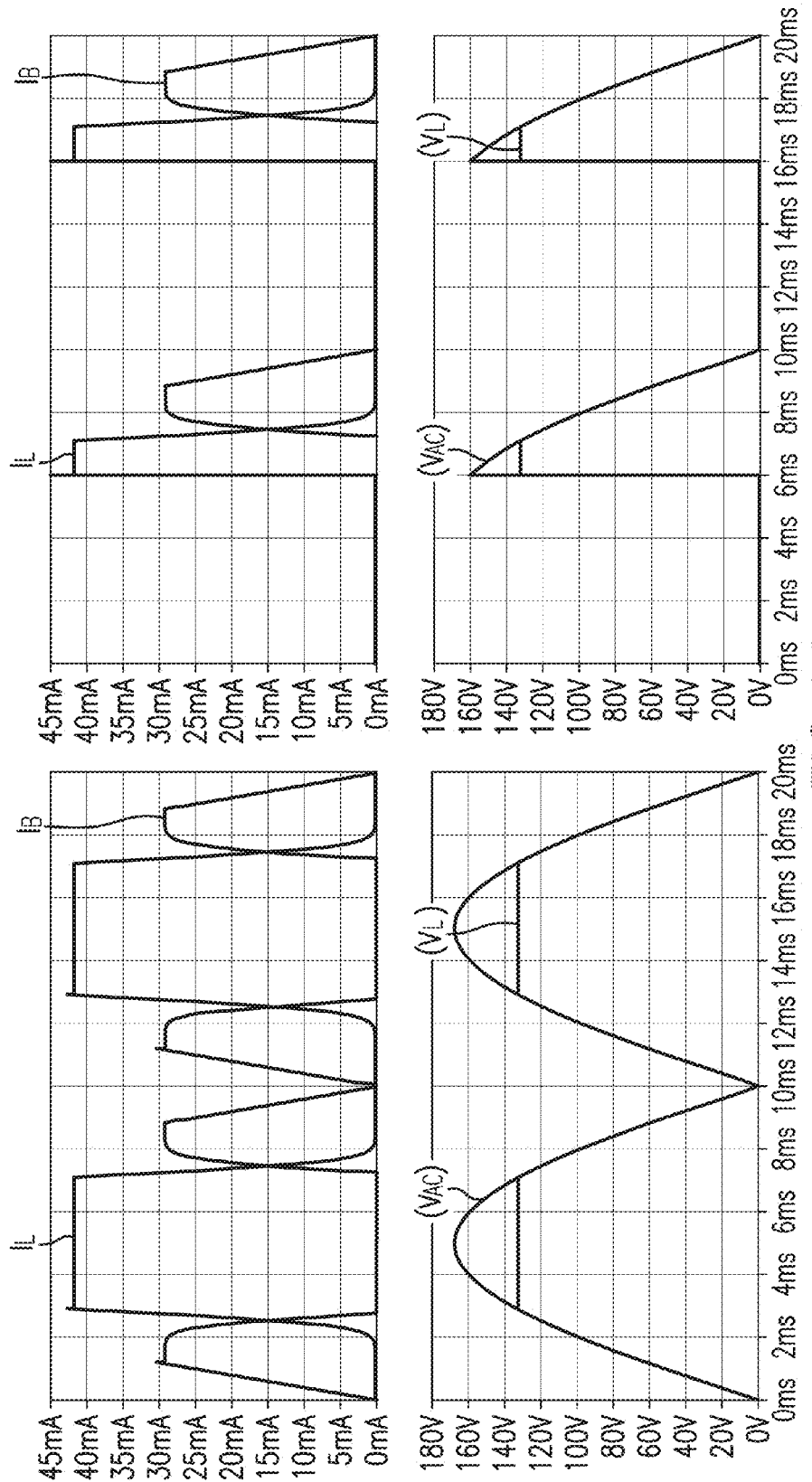

Even if the LED current, $I_L$, is constant with firing angle, the implementation still significantly improves efficiencies to about 68%. The current waveforms of FIG. 14 show where the holding current is set to $I_H$=30 mA. The bleeder current, $I_B$, shuts off whenever the $I_L \geq I_H$.

In some implementations, a more general scenario applies, where the holding current set point $I_H$ is not a constant but may vary in a predetermined but in an arbitrary function of firing angle and/or line voltage as was described above in the prior section.

Figure 15:
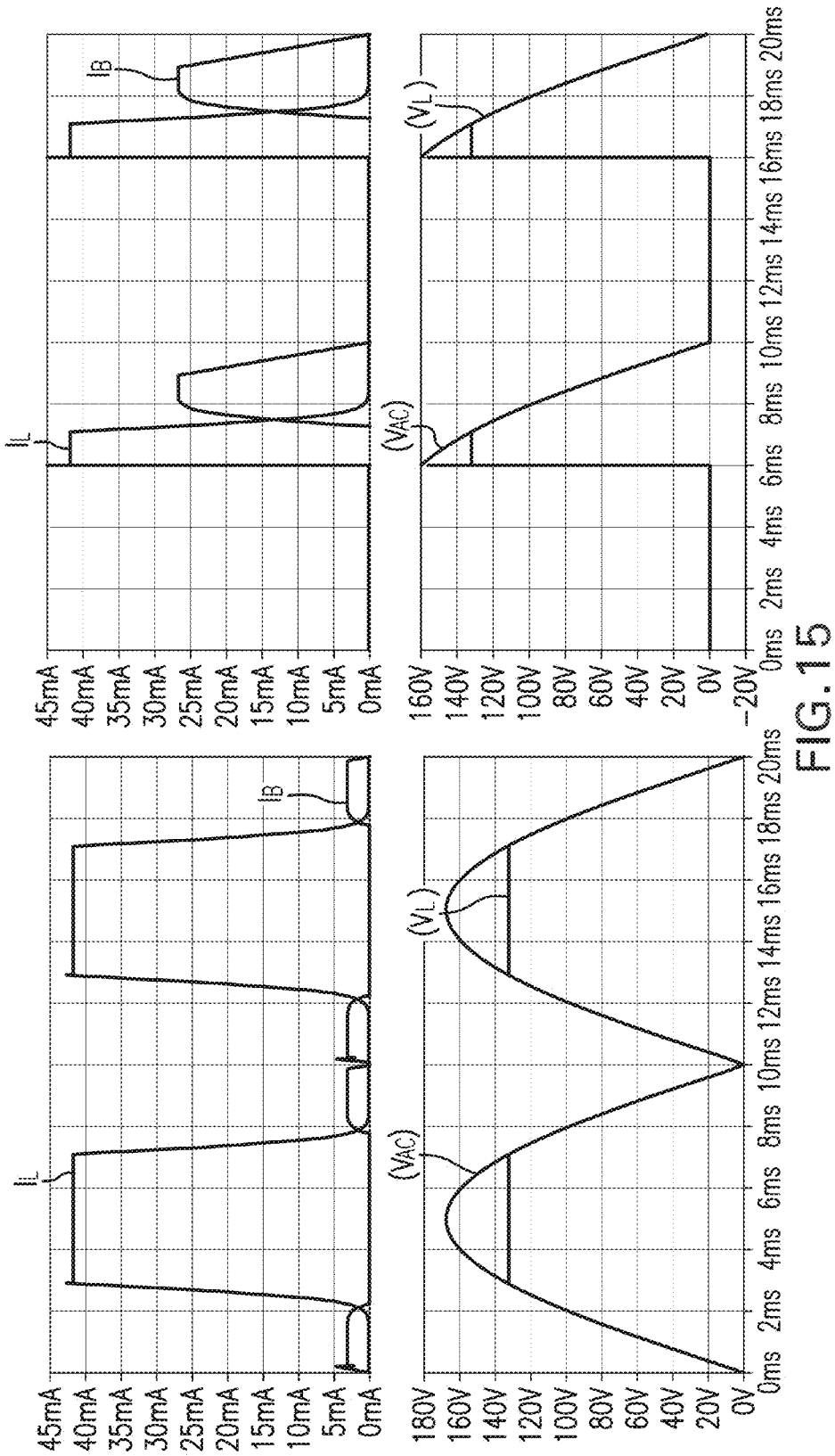

In FIG. 15, the holding current $I_H$ set point increases linearly with dimmer phase angle in the same fashion as for the bleeder current $I_B$ as described with reference to FIGS. 6-10. The efficiency is improved to 84% from 68%.

Although the examples given so far show higher hold up current with deeper dimming levels, or larger phase angles, various embodiments may provide for arbitrary control of holdup current setpoint, $I_H$. For example $I_H$ can be set according to line voltage such that it is set to a high value to match closely to a point just before the LED is on, $V_{AC} < V_L$, and minimized when $V_{AC} < V_L$. An example of this is described with reference to.

The arbitrary control of $I_H$ and $I_B$ can be implemented most flexibly using programmable devices such as microcontrollers, analog and/or digital ASIC, FPGA, custom ICs etc. Simpler controls can be implemented using discrete analog components. In a further embodiment, the custom IC or ASICs may include additional driver functionality such as fuse or surge protections. The fuse could for example be implemented using a wire bond set to fuse at specific current. The surge protection could be for example a high voltage Zener diode.

So far in the examples to this point, the regulation of LED control point, $I_L$ and hold up current control point, $I_H$, has been described with various control options and need not necessarily be a constant. The exact physical implement for setting the control points may, in some implementations, be arbitrary functions. For example to control the LED current, the controller could be part of a switch-mode driver circuit or some linear regulator. The following sections will describe some exemplary, but not limiting, physical implementations.

Elimination of Reactive Loads in LED Driver

Figure 16A:
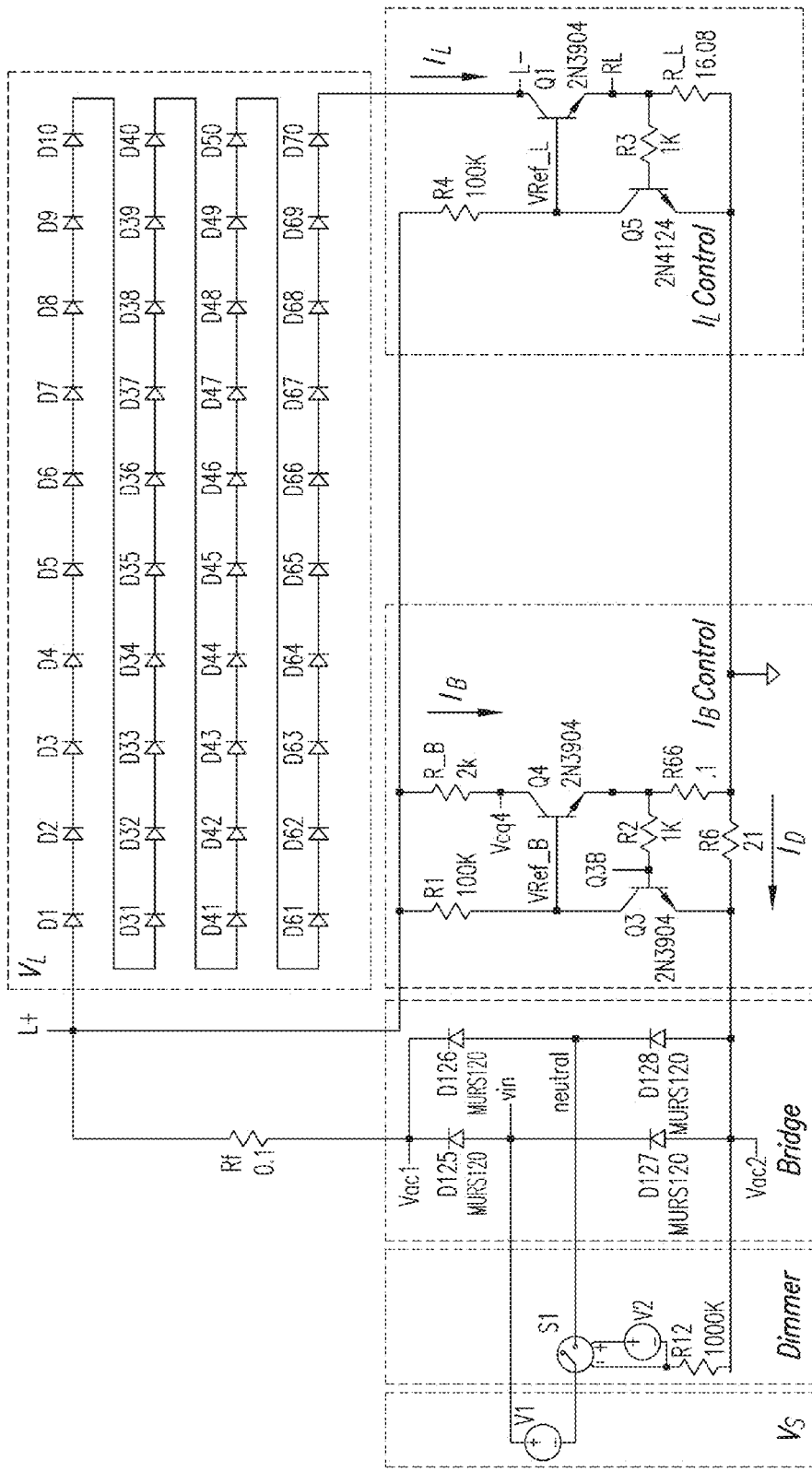
FIG. 16A depicts a schematic of an exemplary diversion current module that dynamically modulates a diversion current to an LED current so that the summed current maintains a predetermined minimum holding current requirement of a phase-controlled dimmer supply.

FIG. 16A depicts a schematic of an exemplary diversion current module that dynamically modulates a diversion current to an LED current so that the summed current maintains a predetermined minimum holding current requirement of a phase-controlled dimmer supply. In an illustrative example, FIG. 16A illustrates an embodiment that uses a linear regulator to control the LED current. Linear regulators have inherently low frequency content, thus eliminating the need for reactive (e.g., inductive and/or capacitive) input EMI/EMC filter elements. In conjunction with a resistor bleeder circuit and a sufficient hold up current, the load to the dimmer will present as substantially resistive, which is similar to an incandescent lamp. Such an implementation is also much more resilient to installation configurations as more or less number of drivers only means more or less resistors loads which are generally well behaved similar to incandescent. As a result this is a highly compatible implementation with legacy dimmers that were designed for dimming resistive loads. Moreover, FIG. 16A depicts one example of a highly efficient realization of a linear driver with bleeder current modulation in response to LED current.

As a side note, persons of ordinary skill in the art will readily appreciate the schematic representations of FIG. 16A and similar schematics in this disclosure may be recognized as schematics typical of circuit simulation software such as SPICE. In particular, the source and dimmer block and connections therein are simulator constructs, rather than physical phase-controllable circuit elements (e.g., triac, firing angle circuitry). Persons of ordinary skill in the art will appreciate that what is being represented in the portion of the schematic labeled "dimmer" includes certain well known legacy prior art dimmer circuits.

In further detail with respect to the embodiment described with reference to FIG. 13, the bleeder current control circuit ($I_B$ control) of FIG. 16A also senses the LED current $I_L$ and modulates the bleeder current ($I_B$) to be at least the minimal holder current, $I_H$.

$$I_B = I_H - I_L \text{ for } I_H \geq I_L$$

$$I_B = 0 \text{ for } I_H < I_L$$

Figure 16B:
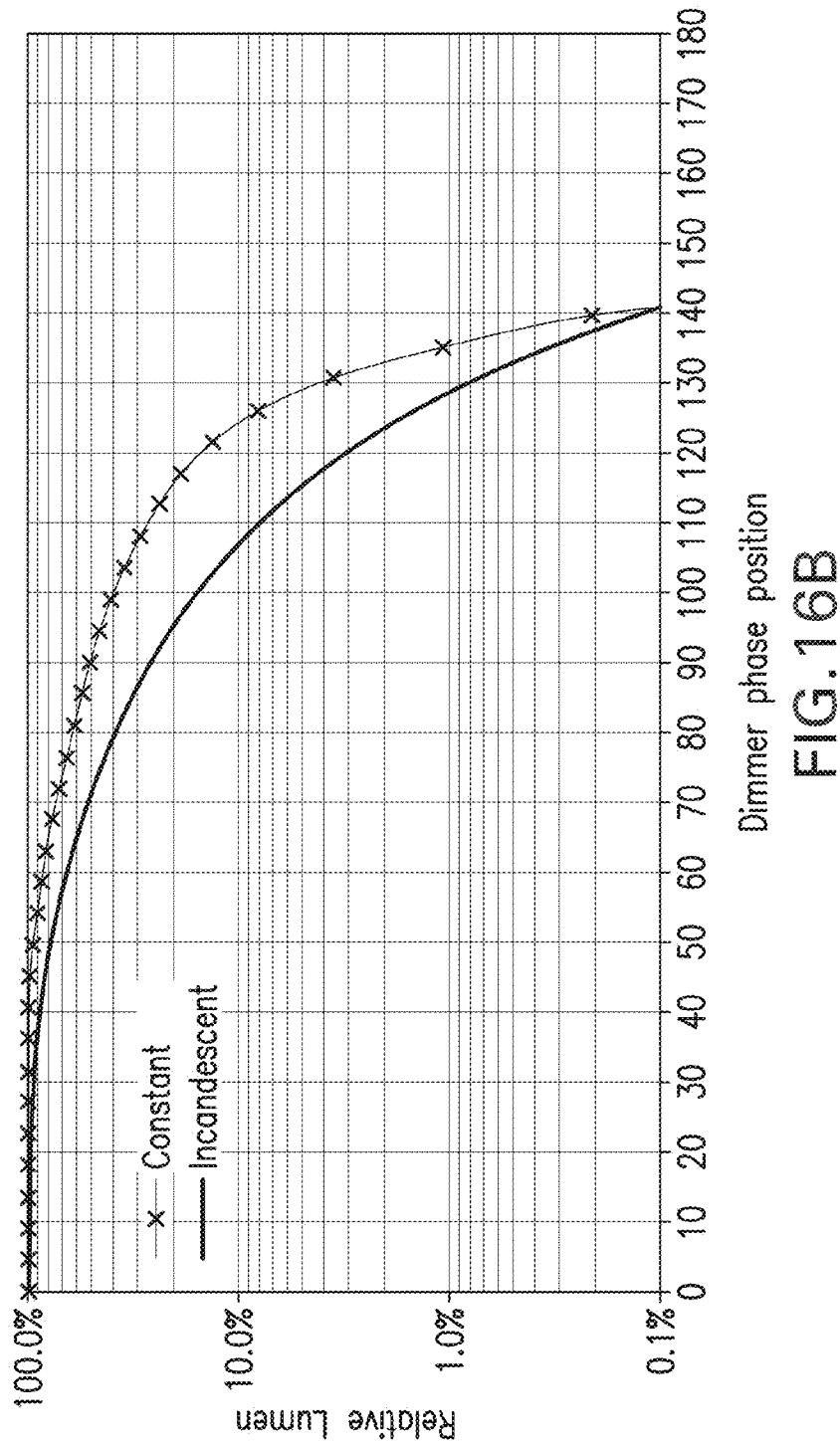
FIG. 16B depicts a plot comparing an exemplary LED light output to an incandescent light output over dimmer phase angle, with the constant LED current circuit of FIG. 16A.

FIG. 16B shows light output, on a logarithmic scale, versus dimming position for the implementation of FIG. 16A ("Constant") where the LED regulated current is constant versus the light output behavior of an incandescent lamp. Note the curves do not match. For the constant regulated LED current, a greater portion of the dimming is squeezed into a smaller portion of the dimmer travel at the end of the curve. A logarithmic light output scale is shown as it better emulates the light sensitivity of the human eye.

Figure 17:
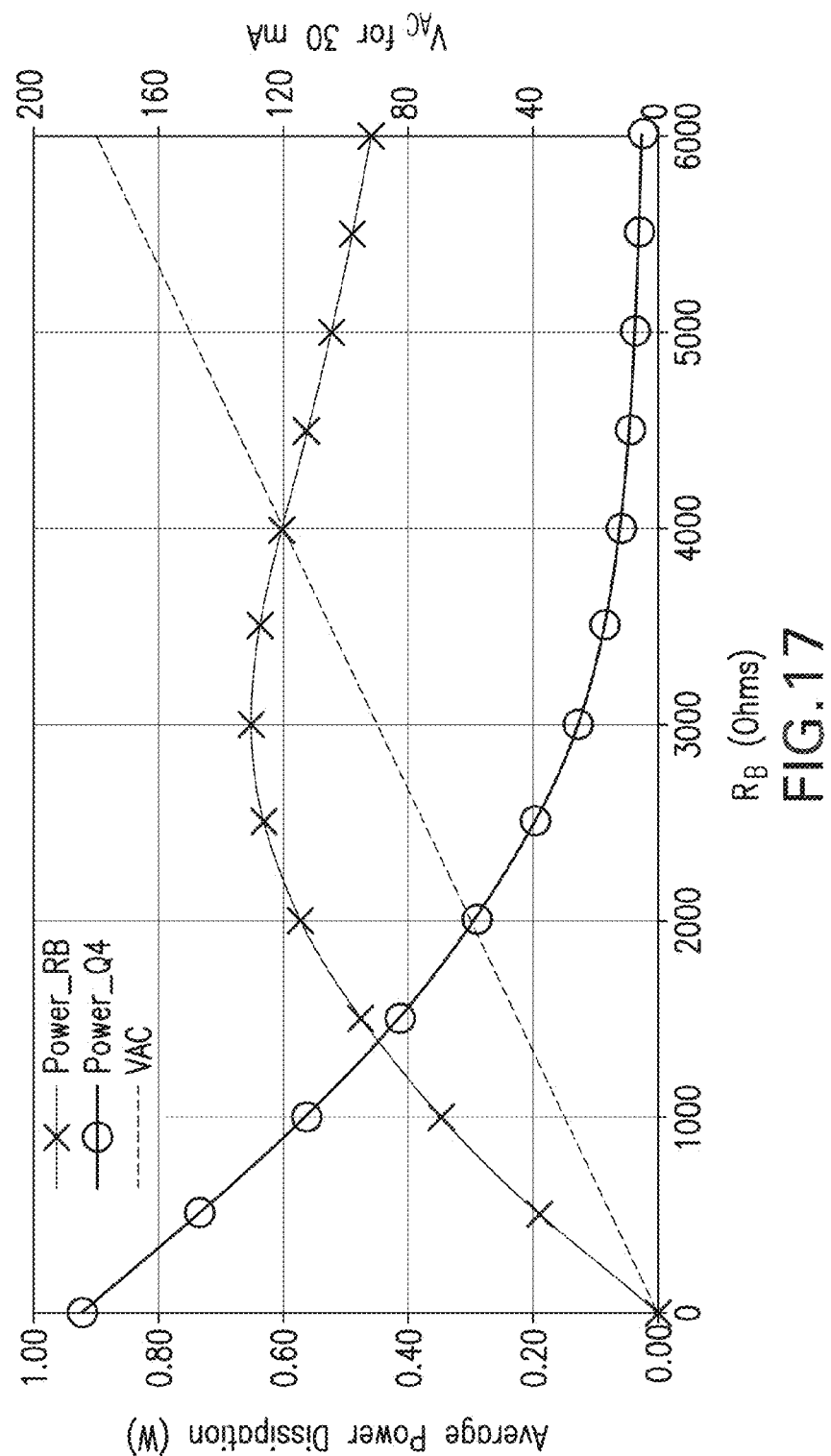
FIGS. 17-18 depict power dissipation and light output plots over a wide dimming range using the exemplary holding current module of FIG. 16A.

FIG. 17 shows a plot of the power dissipation in an exemplary implementation of the current regulator transistor Q4 and the resistor $R_B$ (R_B) in the bleeder circuit of FIG. 16A.

To facilitate discussion and aid understanding of this example, the following terms as used herein are described:

$V_1$ $V_1$=120 VAC @ 100 Hz (note that that generally we also specify line voltage $V_1$ as $V_s$)

$V_{AC1}$ Rectified input line voltage $V_1$.

$I_B$ Control The current sense resistor $R_6$ is used to control $I_B$ such that the driver current is at least the required hold current, $(I_B+I_L) > I_H$. The resistor is set by base emitter voltage, $V_{BE}$, of the transistor Q3 which is approximate 0.66V resulting in $R_6$=0.66V/$I_H$. For $R_6$=21Ω, $I_H$=30 mA.

$R_B$, $I_B$ Resistor and current for the bleeder circuit. In the examples discussed in this document, $I_B$=30 mA when $V_{AC}$=60V. This sets $R_B$=2000Ω. In various implementations, the circuit may be configured to substantially balance the heat dissipation between $R_B$ and Q4. Higher resistance, $R_B$, results in more the power dissipated than by Q4.

Figure 18:
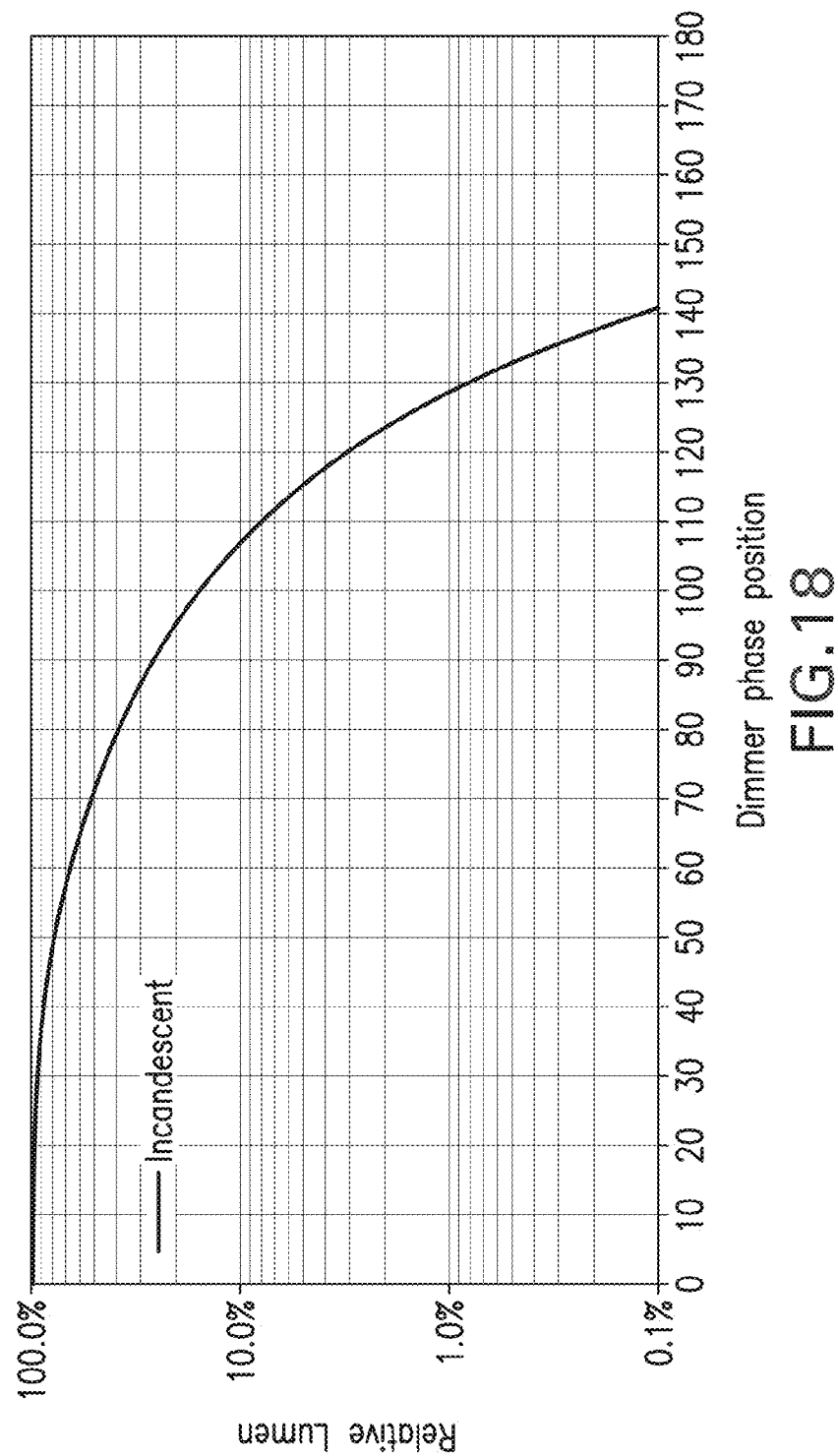

FIGS. 17-18 depict power dissipation and light output plots over a wide dimming range using the exemplary holding current module of FIG. 16A.

The graph of FIG. 17 shows an example with average power dissipation between resistor $R_B$ and transistor Q4 at various values of $R_B$. Note that $R_B$ also sets the minimum $V_{AC}$ needed before 30 mA regulation can be achieved.

In other implementations, we may want to dissipate the majority of the bleeder circuit power, for example >70%, >80% or >90% in the resistor rather than the transistor, for example Resistor $R_B$≥3000Ω.

In another implementation, we would set resistor value such that the power dissipation is always at a minimum across the transistor Q4. For such as case we would set the resistor such the bleeder current $I_B$, is only achieved when the line voltage is matching or close to matching the LED forward voltage $V_L$. In such a case $R_B$=$V_L$/$I_B$+0%/−25%. For example, if $V_L$=134V, $I_B$=30 mA then $R_B$=4466Ω. In this case, the transistor Q4's main purpose is to modulate the bleeder current according the LED current $I_L$.

To facilitate discussion and aid understanding, the following terms as used herein are described:

n, $V_f$ n is the number of individual LEDs (D1 to D10, D31 to D70) each with an individual forward voltage of $V_f$. The number and types of LEDs is intended to be very general. For the examples in this example, n=40 with $V_f$=3.35V resulting in a total LED forward voltage $V_L$=n·$V_f$=134V.

Rectifier Full Bridge as represented by D125 to D128.

$I_L$ Control The current sense resistor $R_L$ (R_L) is used to control to a constant $I_L$ according to the formula, $R_L$=0.66V/$I_L$, where 0.66V is the approximate voltage across the base emitter, $V_{BE}$ of Q5. For $R_L$=16.0Ω, $I_L$=42 mA when line voltage is greater than the forward voltage of the LEDs, $V_{AC}$>$V_L$. Taking into account the "on" and "off" modulation of $I_L$, average $I_L$ is about 20 mA.

$I_L$, $V_L$ Current and Voltage across LED String. For the examples in this document, $V_L$=134V and the current is controlled to an average $I_L$=20 mA.

Dimmer The component is shown is a simulation circuit model of a phase cut dimmer circuit as represented by simulation components switch S1, voltage signal source V2 that turns on and off the switch S1 and resistor R12.

Various embodiments may provide smooth dimming to black with LED current $I_L$ control level to be a function of dimmer firing phase angle with a phase offset. There are 4 issues to consider.

First, the eye's response to light is generally quadratic, so at a 10% dimmed level, typical of most LED drivers, it is perceived by the eye as only as 31% light level ($\sqrt{10\%}$). It is desirable to achieve a much lower dimming level to 0.1%, or a perceived level of 3%.

Second, LEDs have a substantially linear response to input power which is inconsistent with incandescent technology. With incandescent, the spectrum shifts into the infrared on dimming. As a result, the lamp becomes more inefficient, so the light output becomes even dimmer than the input power would suggest.

Third, the dimmer position is not linear with power or phase. Furthermore, the firing angles of individual dimmers can vary widely within a wide distribution of possible phase angles.

Fourth, as previous explained, many dimmers exhibit an asymmetry between the positive and negative cycles resulting in line frequency shimmer at about 10-30% of the dimming range.

The key to cutting through this Gordian knot is first to understand incandescent dimming behavior. Legacy dimmers were designed to be compatible with incandescent lighting. FIG. 18 shows incandescent dimming as a function of firing angle plotted on a log scale. By plotting against phase, it is now independent of dimmer type, dimmer position, input power or input voltage. All dimmers, no matter the construction, will have a firing range within 0-180°. One key observation of FIG. 18 is the incandescent goes to <0.1% (or almost off) at 140°, which is well before the input power from the dimmer goes to zero, which is at 180°.

FIG. 16A depicts a schematic circuit of an exemplary implementation of FIG. 13. In FIG. 16A, the LED current $I_L$, is maintained at a constant value (when $V_{AC}$>$V_L$). As previously observed, the LED of this example may conduct between about 40°, "LED On" and 140°, "LED Off" A dimmer can cut off the line voltage at a controllable phase angle between 40° and 140°. Thus, although the instantaneous regulated LED current, $I_L$, is at constant level, when $V_{AC}$>$V_L$, the dimmer phase cut causes a natural pulse width modulation (PWM) of this current, resulting in dimming, or where the average current is reduced approximately, linear with phase angle.

FIG. 16B depicts a plot comparing an exemplary LED light output to an incandescent light output over dimmer phase angle, with the constant LED current circuit of FIG. 16A. The natural cut off at 0.1% level at about 140° is similar to incandescent, but at other points, it does not dim as quickly as incandescent. The light output dimmed range of 10% to 0.1% is compressed to between 124° to 141° verses a longer incandescent travel of 107° to 141°.

An improvement is to sense the dimmer firing angle and change the regulated current level accordingly. Any arbitrary change is possible including, linear, polynomial, logarithmic, exponential, power, etc. Such arbitrary control of LED current is most flexibly implemented using some programmable devices such as microcontroller, microprocessor, FPGA, ASIC, IC etc. Simpler schemes can be implemented in analog circuits.

Figure 19:
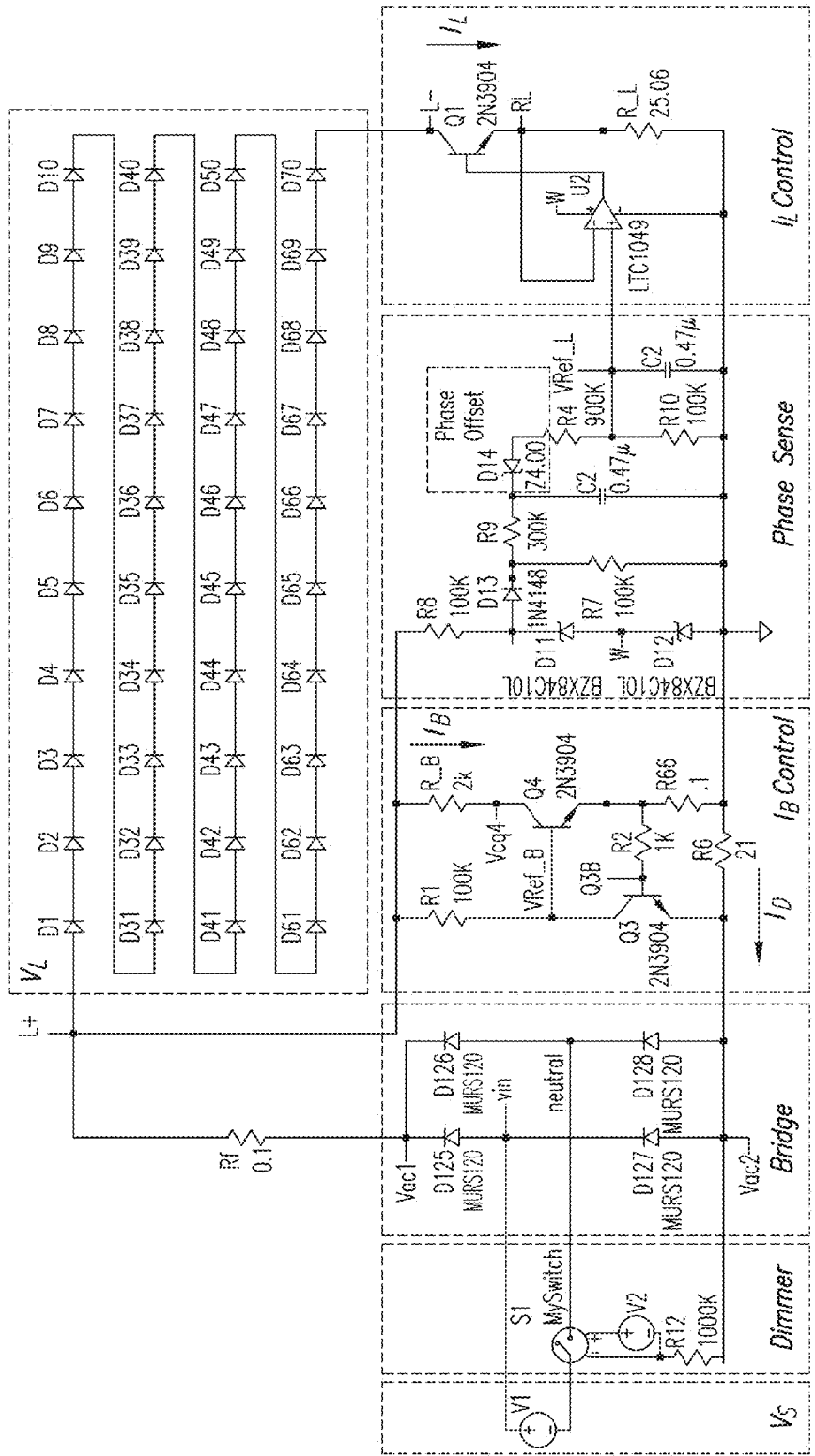
FIG. 19 depicts a schematic of an exemplary circuit with dimmer position phase sense control of LED current.

FIG. 19 depicts a schematic of an exemplary circuit with dimmer position phase sense control of LED current.

Figure 20A:
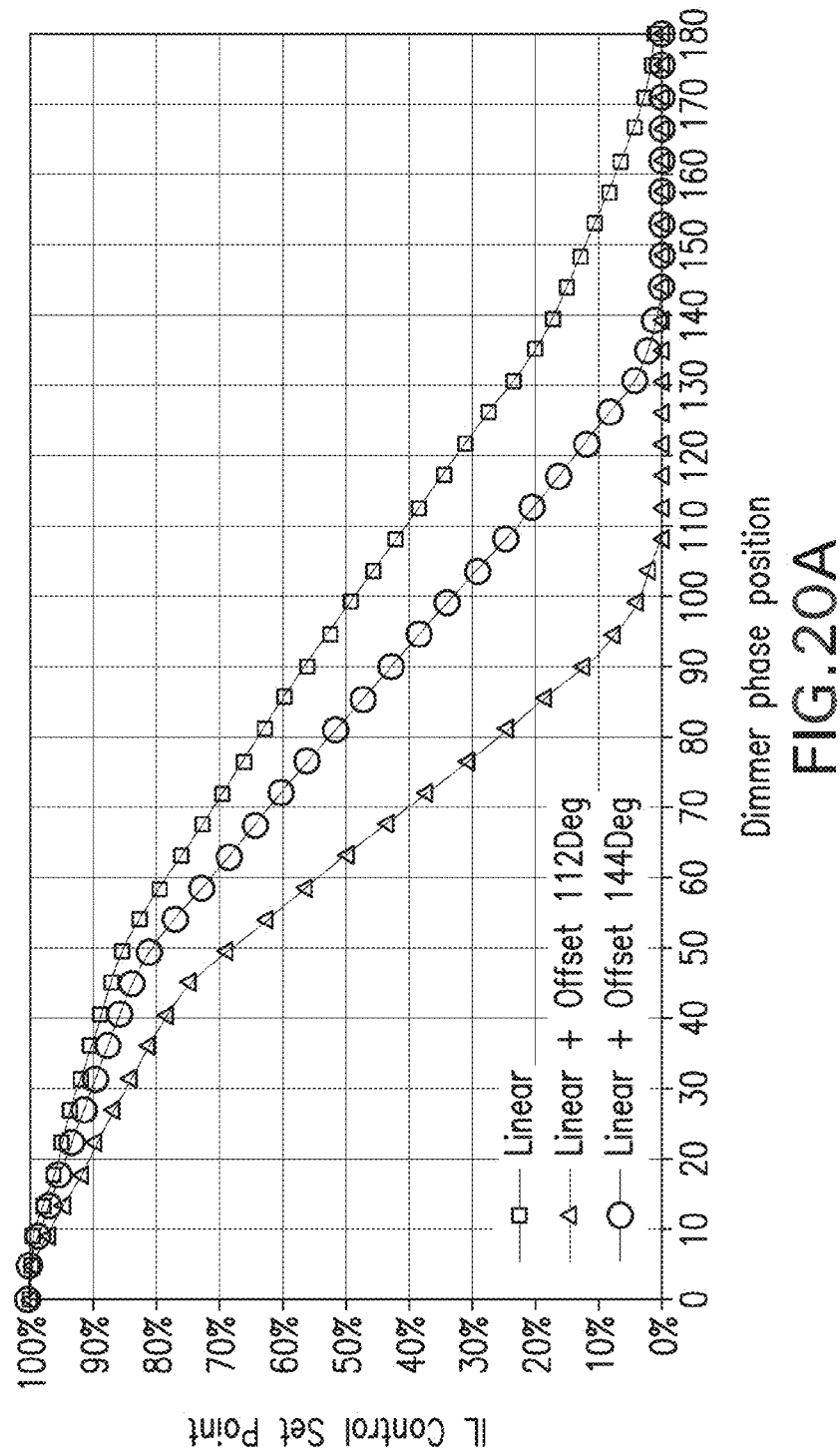
FIGS. 20A-20B depict LED current set point control and the resulting light output plots over a wide dimming range using the exemplary circuit of FIG. 19.
Figure 20B:
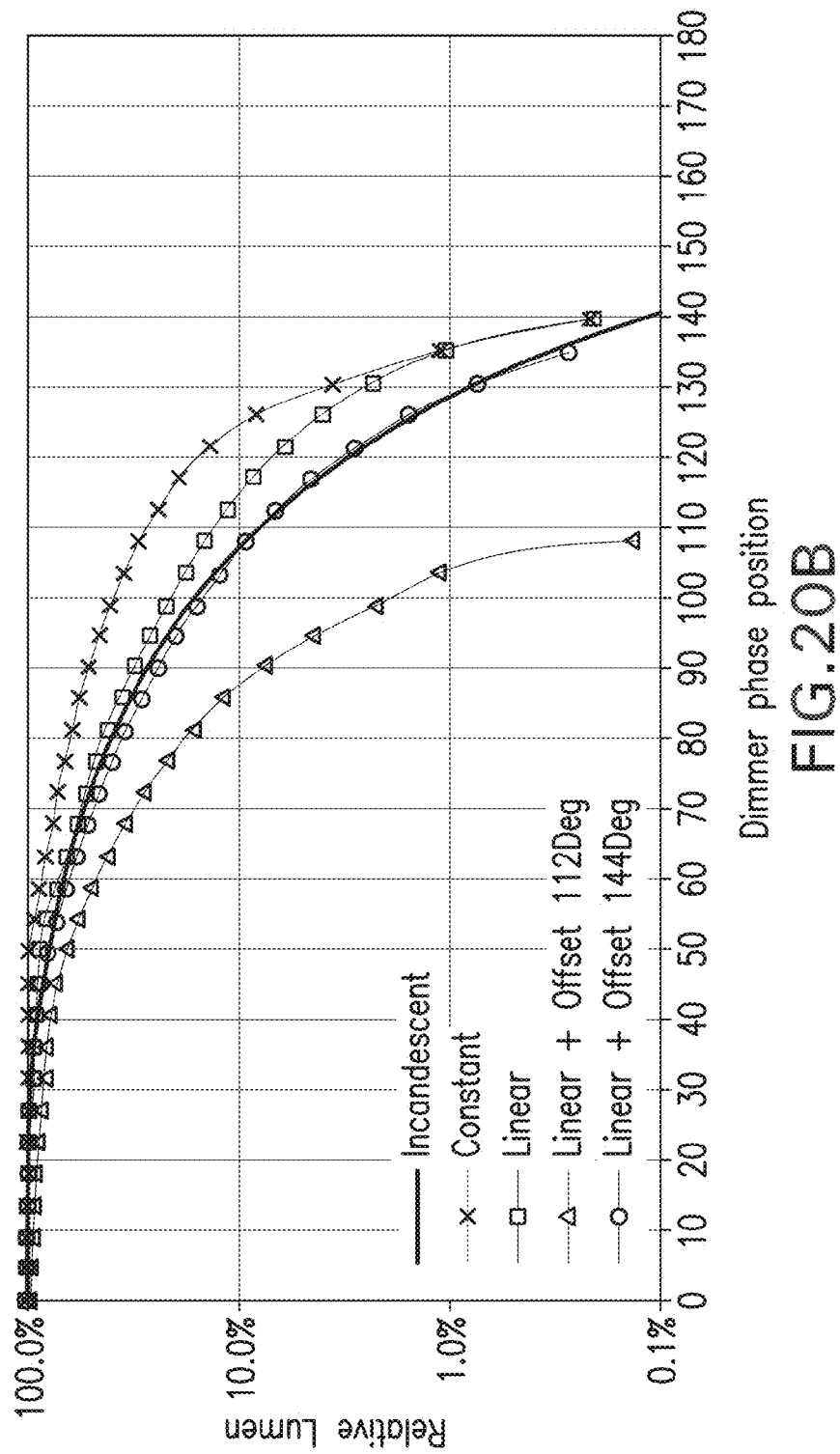

FIGS. 20A-20B depicts LED current set point control and the resulting light output plots over a wide dimming range using the exemplary circuit of FIG. 19.

Figure 21:
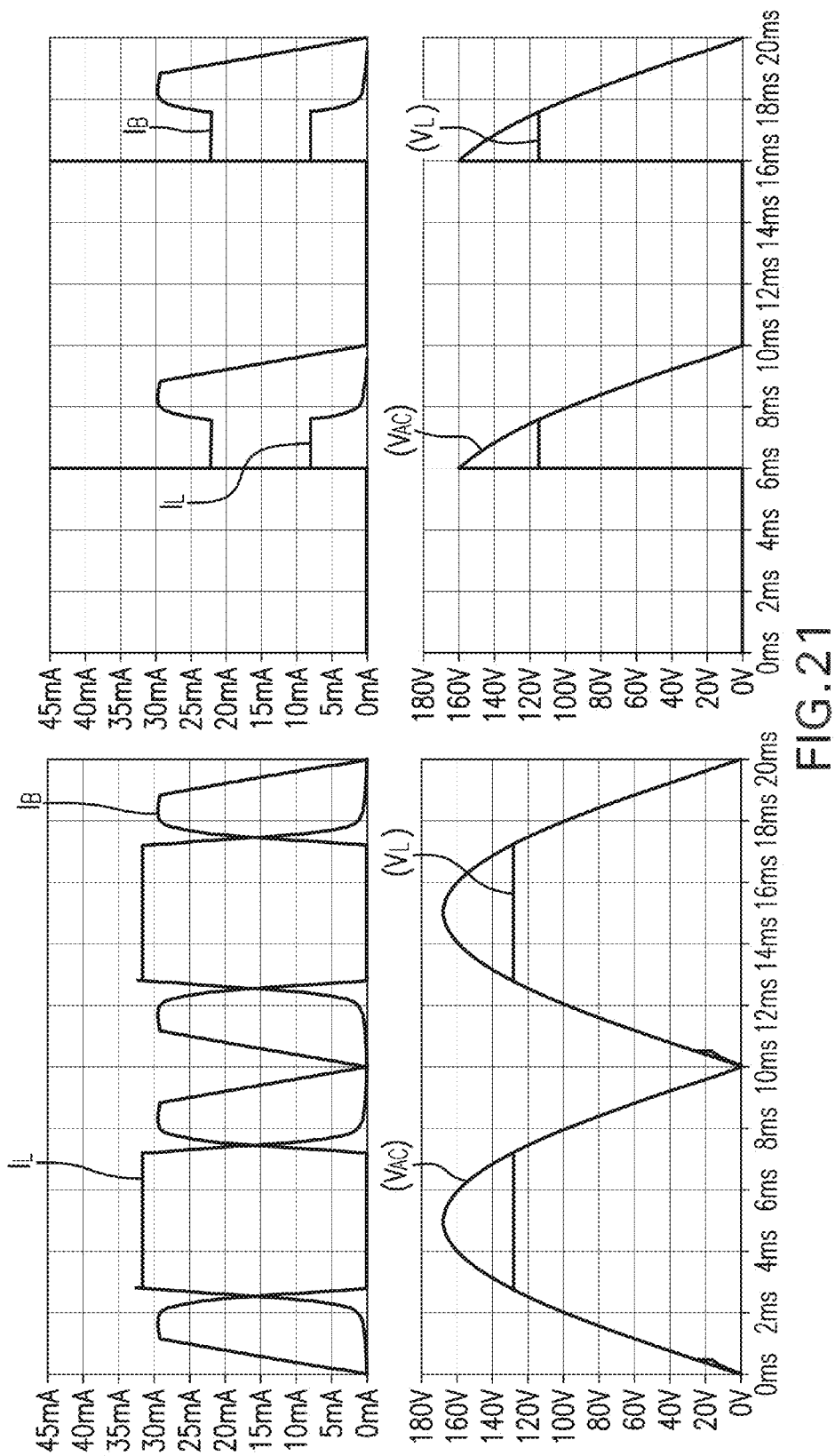
FIG. 21 depicts waveforms for undimmed and dimmed operation of the exemplary holding current module of FIG. 19.

FIG. 21 depicts waveforms for undimmed and dimmed operation of the exemplary holding current module of FIG. 19.

One embodiment of such a phase sensing circuit and variable LED current regulation set point, $I_L$, is depicted in FIG. 19. It provides a substantially linear decrease in amplitude of the LED regulation set point, $I_L$, with increasing dimmer position or phase.

In combination with the existing linear PWM dimming, the linear decrease of $I_L$ with phase results in a multiplication of two linear functions leading to a parabolic decrease in LED average current.

In a preferred embodiment, the 2 linear functions cross zero at the same phase angle. For PWM, the zero naturally occurs at the LED cutoff of about 140°. Without any offset from the phase sense control circuit, the $I_L$ amplitude control set point goes to 0% at a dimmer phase of 180°, which does not match the 140°.

The actual $I_L$ control set point is set by the voltage $V_{ref\_}L$ in the circuit of FIG. 19. We can set the relative $V_{ref\_}L$ voltage level as various function of phase as shown in FIG. 20A. Note the shapes of the various curves are the analog circuit approximation of the desired control curve. They are not perfectly linear but are sufficient to demonstrate the key concept.

In simulation of FIG. 19, the offset in the phase sense circuit is realized using Zener diode D14. In the exemplary circuit of FIG. 19, a 4.0V Zener provides an offset that cause LED current control amplitude set point, $I_L$, to effectively go to 0% at about 144°.

The effect on the LED dimming is shown in FIG. 20B. Without an offset, where D14 is shorted, "Linear" curve show the dimming curve. There is an improvement in matching to incandescent. However with the added offset at 144°, "Linear+Offset 144DEG" curve, the LED dimming curve is almost identical to the incandescent.

In all cases with and without offset, the average LED current and therefore the average light level is brought faster to a lower level than would otherwise with a constant LED current amplitude regulation set point, $I_L$. By doing so, the light level is brought to a much lower before jitter or the asymmetry becomes noticeable. For example, the light level is brought to less than 10% at dimmer phase angle <120° or the light level is brought to less than 15% at dimmer phase angle <110°.

In another possible implementation, it may be desired to bring the dimming level faster than incandescent as in the case with at an offset of 112°, "Linear+Offset 112DEG". The two advantages of doing so include at least the following.

First, some dimmers have maximum angle as low as 110°. The larger offset allows these dimmers to bring the LEDs to about 0.1% levels close to the end of dimmer travel of 110°. An 8.2V Zener, D14, provides an offset at about 112°. Second, as explained before, some embodiments may attenuate the light to be nearly "off" before reaching the problematic end travel region of the dimmer, where jitter and/or asymmetries can cause objectionable flicker, shimmers or other perceptible light output instabilities.

Although a bleeder circuit is shown in FIG. 19, it is intended the LED current control, $I_L$, scheme may be implemented as an embodiment either alone or in combination with a bleeder circuit. If implemented with a bleed circuit, the control of the bleeder circuit may, in general, be flexibly adapted to for various applications. In some embodiments, the bleeder control current can be a function of the line voltage as previously described, or a function of the dimmer phase, or LED current, etc.

The exemplary circuit of FIG. 19 produces waveforms as shown in FIG. 21. The bleeder circuit senses the LED current $I_L$ and adjusts its own current, $I_B$, such that a minimum hold current, $I_H$ is achieved. In the dimmed condition, where the LED current is reduced with dimmer phase angle, the bleeder current naturally adjusts itself to achieve a minimum required hold up current of about $I_H$=30 mA. In fact in a dimmed condition illustrated in FIG. 23A, the bleeder current level $I_B$ is greater than the LED current level $I_L$.

Figure 22:
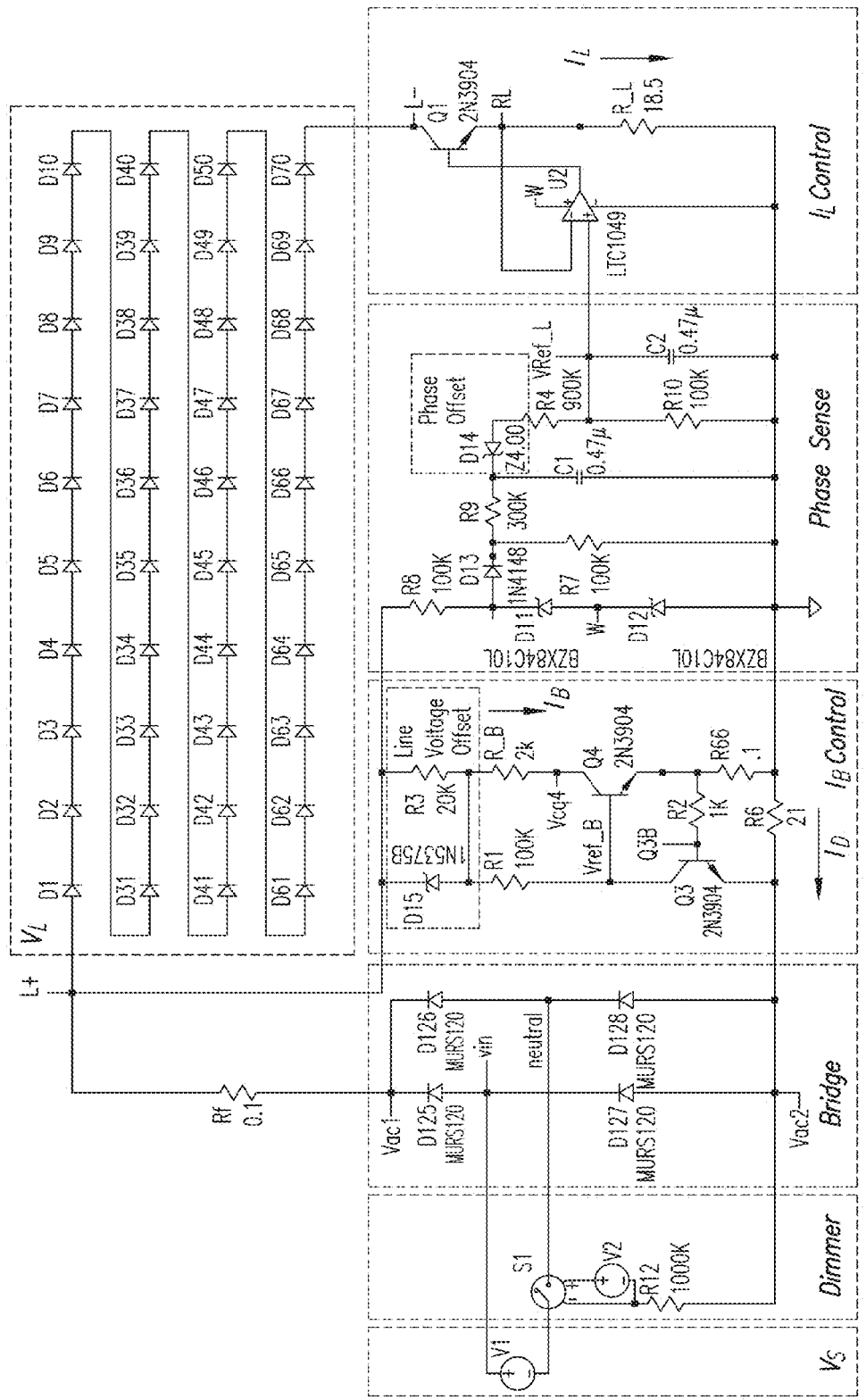
FIG. 22 depicts a schematic of an exemplary holding current module with line voltage offset and phase sense control of LED current to maximize efficiency.

FIG. 22 depicts a schematic of an exemplary holding current module with line voltage offset and phase sense control of LED current to maximize efficiency.

Figure 23A:
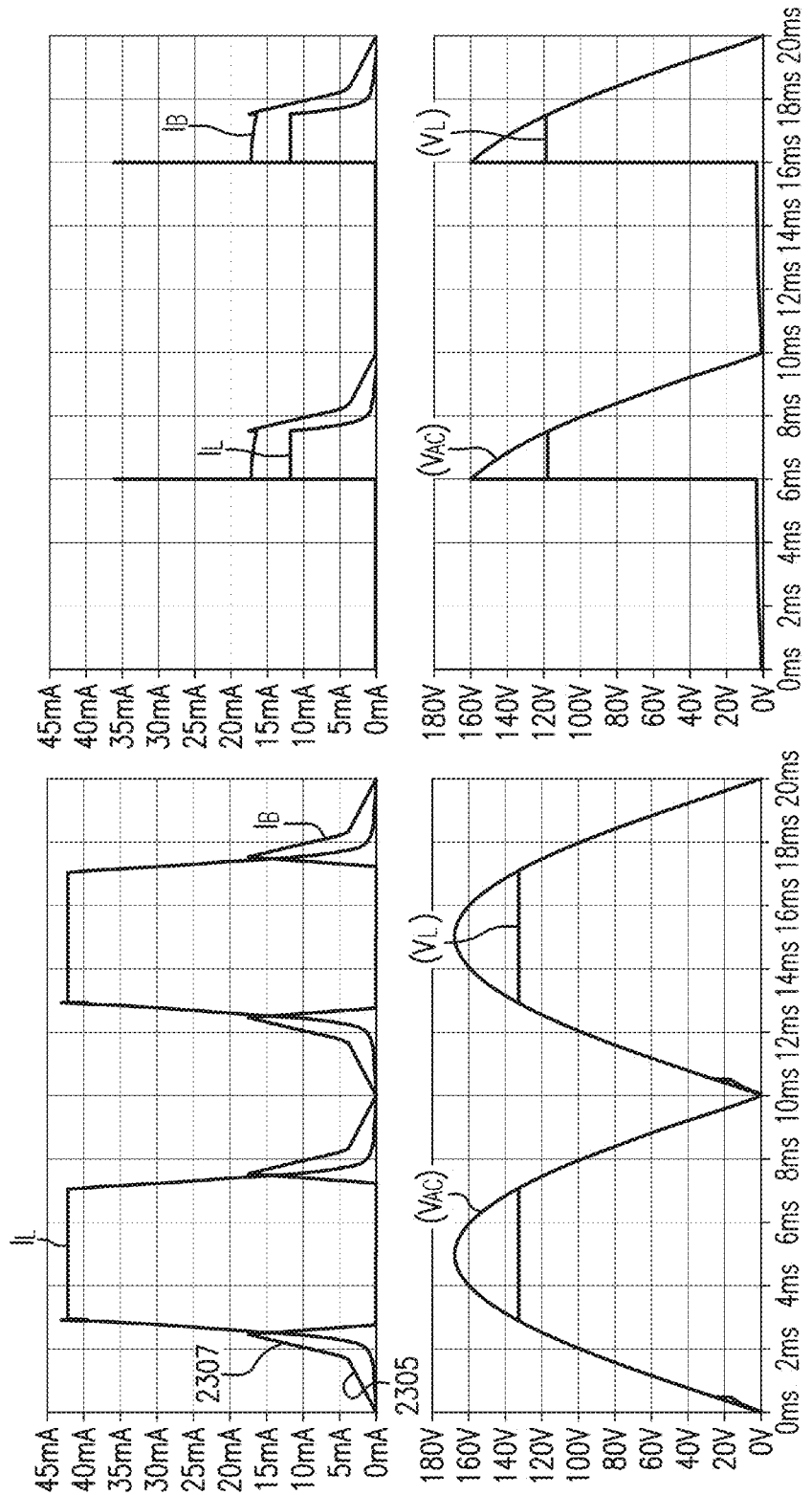
FIG. 23A depicts waveforms for undimmed and dimmed operation of the exemplary holding current module of FIG. 22.

FIG. 23A depicts waveforms for undimmed and dimmed operation of the exemplary holding current module of FIG. 22.

A further improvement to efficiency can be achieved by adjusting the holding current, $I_H$, to a minimized level, and then turning on to a high level just before the LED starts to turn on and keeping it to a high level to just after the LED turn off. In such a case the hold current, $I_H$, behaves a function of the line voltage.

An example is depicted in FIG. 22, the required hold up current is adjusted by a line voltage offset circuit that includes a 20K resistor, R3 and an 82 V Zener diode, D15. With reference to FIG. 23A, in portions of the waveform where the LED current is not conducting and the line voltage $V_{AC}$ is below the zener voltage of 82V (e.g., 2305 of FIG. 23A), all the bleeder current, $I_B$ must flow through the 20K resistor R3, thus hold up current and therefore bleeder current $I_B$, is forced to a low level. When $V_{AC}$>82V, region 2307, the zener starts to conduct and the current $I_B$ increases at a much faster rate, as it begins to bypass R3 through Zener D15. The addition of the two components (R3, D15) may increase efficiency from about 62% to about 74%, in some examples.

The Zener-augmented bleeder circuit can be used in various LED current control circuit implementations. The Zener value may be selected, for example, to be nominally below the LED forward voltage, $V_L$, allowing it to turn on before the LED control circuit. In one illustrative example, a lower limit for the Zener may be selected to be 30% of the total LED forward Voltage, $V_L$. For example, $V_L$=120V the Zener voltage may be set to 40V to 120V. In various implementations, the Zener voltage may be between about 30% and about 98%, such as, for example, about any of 35, 40, 45, 50, 55, 60, 65, 70, 75, 80, 85, 90, or 95% of the LED forward voltage rating.

Figure 23B:
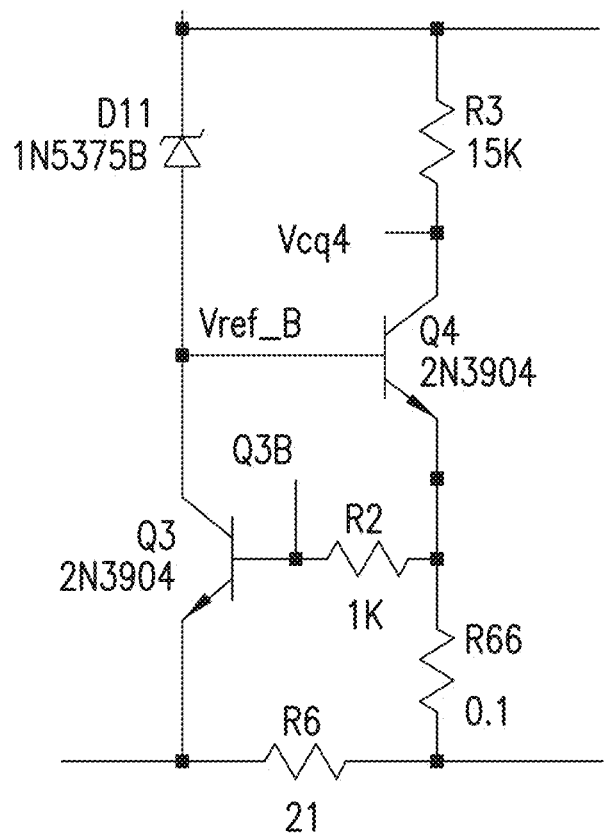
FIG. 23B depicts an exemplary holding current control circuit with line voltage offset.

FIG. 23B depicts an exemplary holding current control circuit with line voltage offset. In the depicted example, the Zener diode D11 is selected to be 82V for a line voltage $V_1$=120 VAC. The optional R3 resistor in parallel with D11 is used allow some current to flow before the Zener starts to conduct. As an example, for a line voltage of 120V, a R3 resistor value of 15K will allow about 5 mA of $I_B$ current to flow before the Zener turns on.

General Summary of Current, $I_H$, and/or LED Current, $I_L$ Control

In the prior sections, examples of analog circuitry were used to control either $I_H$ or $I_L$. However much more sophisticated and arbitrary implementation can be more easily implemented in a programmable microcontroller, ASIC or IC. For example the LED Holding Current setpoint, $I_H$, can be an arbitrary function and/or combination of Line Voltage ($V_{AC}$), Dimmer Phase Angle, and LED Current ($I_L$). Similarly the LED Current setpoint, $I_L$, can be an arbitrary function and/or combination of Line Voltage ($V_{AC}$), dimmer phase angle, and LED Holding Current ($I_H$). Both $I_H$ and $I_L$ can also be a function of temperature for the driver or driver IC. For example, if a predetermined temperature threshold is exceeded, the currents may be turned down.

Control of Hold Current Set Point $I_H$

Figure 23C:
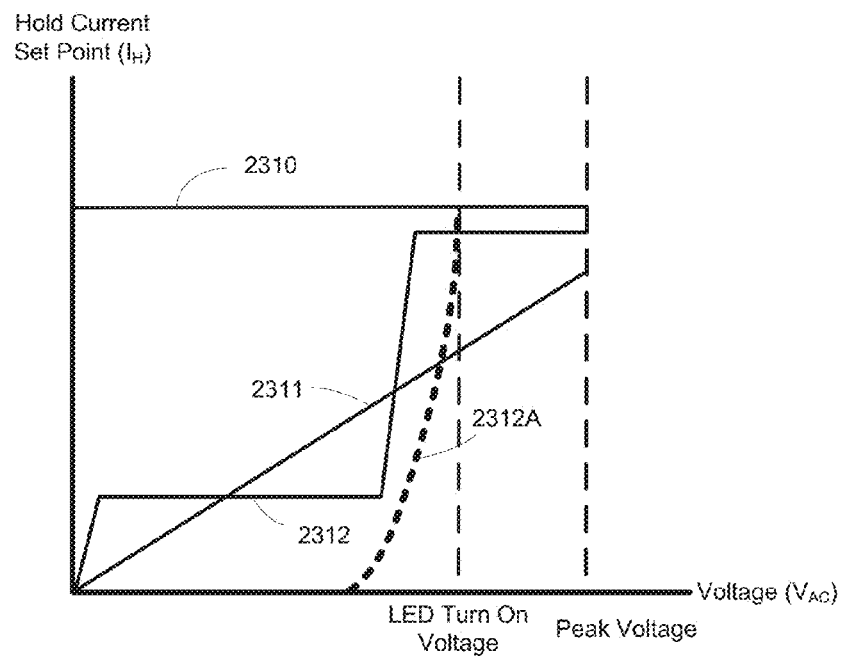
FIGS. 23C-23D depict plots illustrating various exemplary hold current set points as a function of AC voltage for lamps with embodiments of bleeder current control.
Figure 23D:
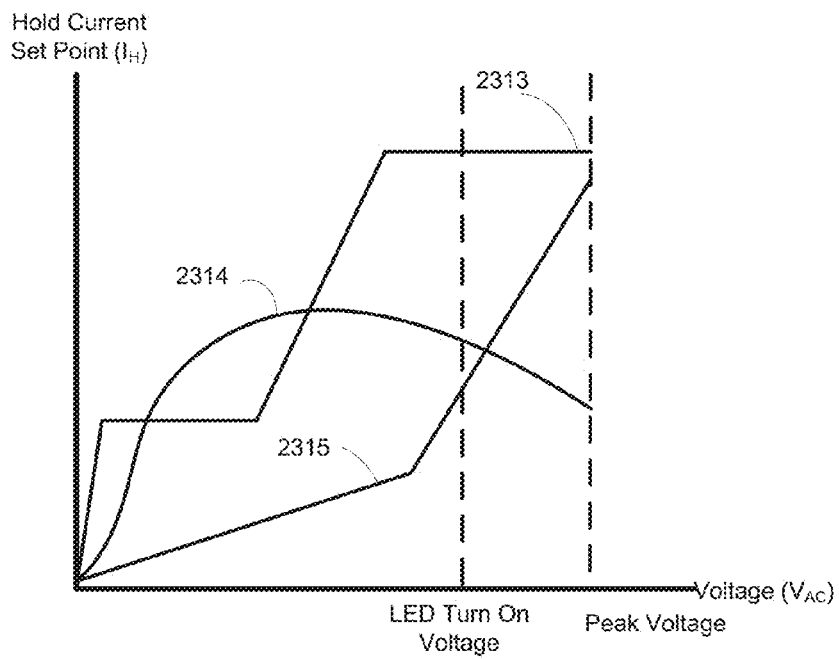

FIGS. 23C and 23D show plots of example set points for LED Holding Current, $I_H$, as a function of Line Voltage ($V_{AC}$). 2310 indicates the scheme where $I_H$ set point is a constant regardless of $V_{AC}$. 2311 indicates a portion of the holding current, $I_H$, showing a gradual linear increase of $I_H$ with $V_{AC}$ such as with a simple resistor where $I_H = V_{AC}/R_B$. 2312 show a 2 step level control, first to a low level at low $V_{AC}$ then to a higher level just before the LED turn on voltage, $V_L$. It is important that the higher level occurs before the LED turn on voltage, $V_L$ because the LED does not instantaneously turn on at $V_{AC} = V_L$, rather there is gradual exponential increase in current before $V_L$ or $V_{AC} < V_L$ as represented by 2312A. Thus if there was zero or insufficient bleeder current during the portion 2312A, the gradual increase in the LED current before $V_L$, is insufficient to provide the required hold current, $I_H$, to keep the dimmer stable, resulting in inconsistent dimmer triggering and flickering light output. By forcing the $I_H$ to high level during this exponential gradual turn LED on, just before $V_{AC} = V_L$, this control scheme ensures sufficient $I_H$ to keep the dimmer stable.

2312 could be implemented using a second bleeder current controller arm in parallel with the first bleeder control circuit, where each bleeder current level may be independently controlled by its own regulator circuit. 2313 is similar to 2312 but the transition between the two levels is more gradual by incorporation of resistance into the regulator arms. 2315 show 2 slopes with no flat horizontal control level starting with a lower current slope rising to a higher current slope. 2312 is similar to the prior analog implementation of FIG. 22 to FIG. 23B. 2314 is intended to show a different implementation with arbitrary control of $I_H$ as a function of $V_{AC}$.

Figure 23E:
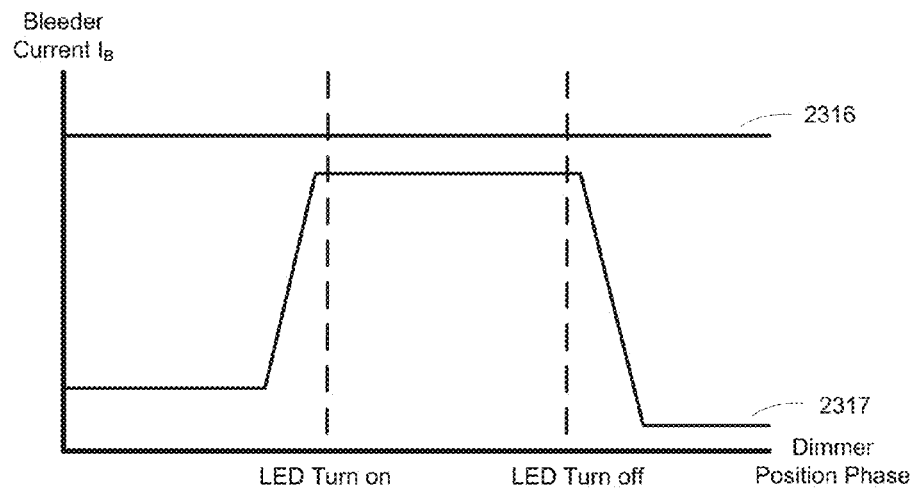
FIGS. 23E-23F depict plots illustrating various exemplary bleeder current set points as a function of AC voltage for lamps with embodiments of bleeder current control.
Figure 23F:
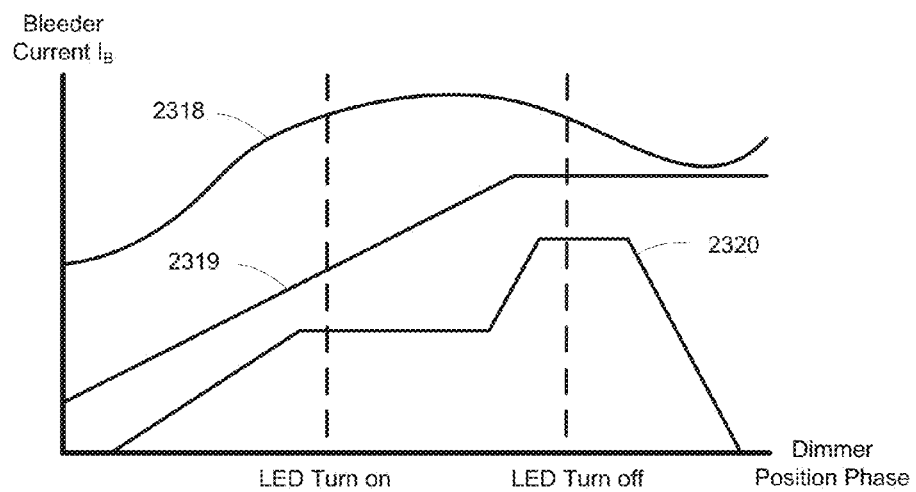

FIGS. 23E and 23F show examples of LED Holding Current set point, $I_H$, as a function of dimmer phase position. 2316 where $I_H$ is constant with dimmer phase position. 2317 is where the $I_H$ is set to a lower level but turns to a high point when dimmer phase position correspond to just before the LED turn on, and just to after the LED turn off phase angle. Otherwise $I_H$ is set to a low level or to zero. 2319 show a gradual increase in $I_H$ with phase up to a maximum level. 2320 show a shows a multi-step gradual increase in $I_H$ with phase, up to a maximum constant level. 2319 and 2320 are similar to the example previously given for FIG. 11 and for similar reasons. 2318 is intended to show an arbitrary function of $I_H$ with dimmer phase position.

In all case the hold current, $I_H$, can be a combination of the LED current, $I_L$ and the bleeder current, $I_B$ where:

$$I_B = I_H - I_L \text{ for } I_H \geq I_L$$

$$I_B = 0 \text{ for } I_H < I_L$$

When the LED current, $I_L$, is higher than the set point $I_H$, ($I_H < I_L$), then $I_B$ shuts off.

Although the hold current set point, $I_H$, has for the sake of simplicity and clarity been explained as a function of $V_{AC}$, $I_H = F[V_{AC}]$, or Phase, $I_H = F[P]$, it is anticipated that it may be simultaneous functions of both, e.g., a complex function of both $V_{AC}$ and Phase, $I_H = F[V_{AC}, P]$ or as independent functions combined together, for example, $I_H = F[V_{AC}] \cdot F[P]$.

Control of LED Current Setpoint $I_L$.

Figure 23G:
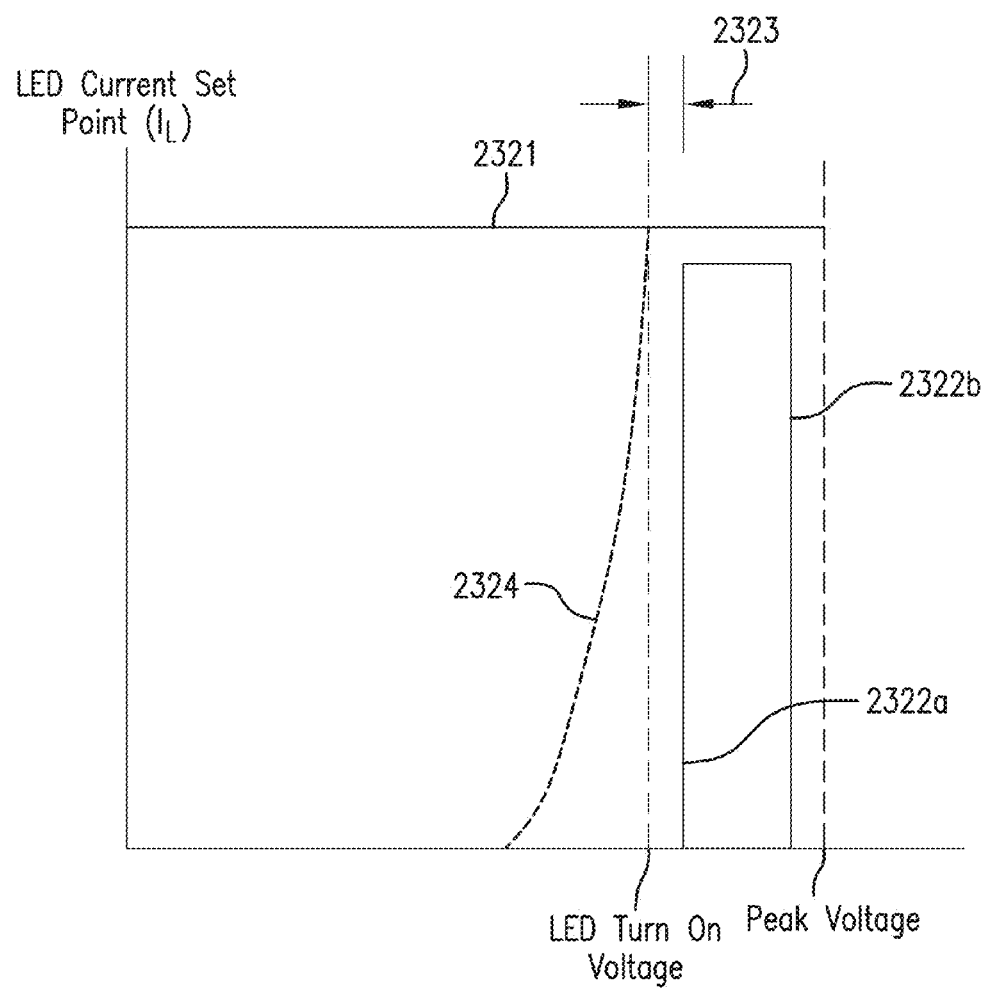
FIGS. 23G-23I depict plots illustrating various exemplary LED current set points as a function of dimmer phase position for lamps with embodiments of bleeder current control.

FIG. 23G show examples of LED Current set point, $I_L$, as a function of Line Voltage ($V_{AC}$). 2321 is where the $I_H$ is constant with $V_{AC}$. 2322a and 2322b show an interesting embodiment where the $I_L$ is set to a low to off position until the Line voltage $V_{AC}$ is above the LED turn on voltage or LED forward voltage, $V_L$. One advantage for doing so is the LED does not instantaneously turn on at $V_{AC} = V_L$, rather there is gradual natural exponential increase in current with voltage just before $V_L$ or $V_{AC} < V_L$ as represented by 2324. If there was no bleeder current circuit, the gradual increase in current before $V_L$, may be insufficient to provide the required hold current, $I_H$, to keep the dimmer stable resulting in inconsistent dimmer triggering and flickering light output. By forcing the LED current not to turn on until 2322a, where $V_{AC} > V_L$, the LED current can turn on almost instantaneously to the set point level, $I_L$. It is only limited by inherent bandwidth of the LED current control circuitry in combination with the LED elements. It is anticipated that such an implementation may eliminate the need for the bleeder circuit, or at least reduce or minimize the required power dissipation in the bleeder circuit.

The LED Current, $I_L$ may also be shut off at a high level at 2322b also known as high voltage shut off. This embodiment may be applied to 2322a, 2311 or any other LED current control schemes. High Voltage shutoff is advantageous for over voltage protection in abnormally high line voltage, $V_s$ situations. An even more interesting benefit would be to improve efficiency where there is high voltage shut off on every cycle. Consider any of the prior examples of FIG. 16A, 19, or 22, where the power transistor Q1 regulates the LED current $I_L$. Q1 must take up the voltage differential, $DV_{Q1} = V_{AC} - V_L$, between the rectified line voltage $V_{AC}$ and the LED forward voltage $V_L$. This creates heat, $P_{heat} = I_L \cdot DV_{Q1}$, in Q1 and a loss in efficiency. The larger the voltage differential, the greater the heat and the greater the inefficiency. In one embodiment, we would turn on the regulator only when $V_{AC}$ is close $V_L$ so the $DV_{Q1}$ is small. Stated in another way, some embodiments may shut off the current, $I_L$, when $V_{AC}$ reaches a level at which too much heat is generated, such as for example, between 103% to 135% $V_L$.

In a further embodiment, rather than completely shutting off the LED current, the LED current can be set to a lower level. This is advantageous, for example, to keep sufficient holding current so it does not have to be sourced by the bleeder current circuitry.

In both of the above scenarios, the overall LED current set point at the peak of the AC voltage waveform is a lower value than the LED set point in at least one portion when the AC voltage waveform is less than its peak.

Figure 23H:
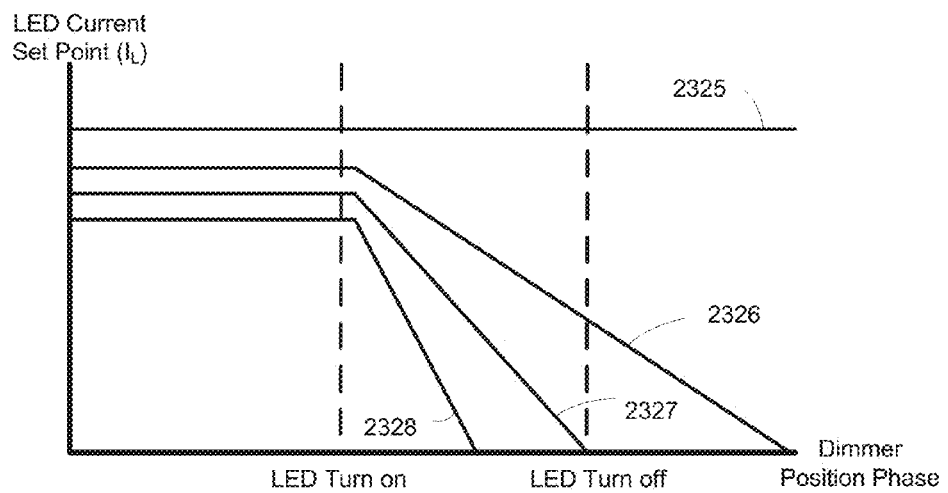
Figure 23I:
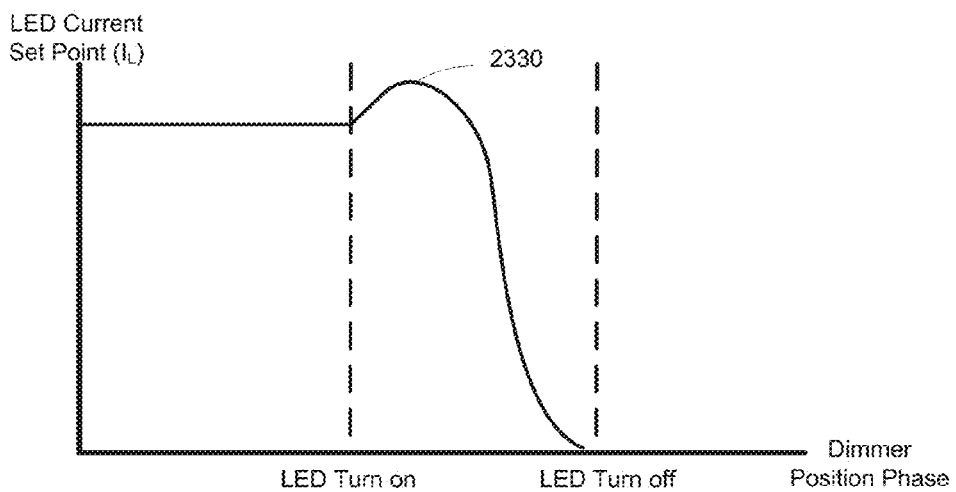

FIGS. 23H and 23I show examples of LED Current set point, $I_L$, as a function of dimmer phase position. FIG. 23H is similar to the example described with reference to FIG. 20A. 2325 represents $I_L$ being a constant with dimmer phase position. 2326 is a linear decrease in $I_L$, where the zero set point is at 180°, which is far beyond the angle at which the LED has already turned off. 2327 is 2326 with a phase offset to match the LED turn off. 2328 represents the $I_L$ controlled to be near zero at a phase angle well before the LED natural turn off point. This is desirable to avoid the unstable areas near the dimmer end of travel regions and to avoid the similar region previously referenced as 2324 in FIG. 26H during LED turn off.

2330 is intended to show an arbitrary function of $I_L$ with dimmer phase position. 2330 shows a slight increase in $I_L$ at the beginning of the LED turn on. This may be useful for example where dimmer minimum phase position is after the LED turn on region. This means the LEDs never fully turns on. To compensate, we can increase the LED current set point near the LED turn on region.

Although the LED current set point, $I_L$, has for the sake of simplicity and clarity been explained as a function of $V_{AC}$, $I_L=F[V_{AC}]$, or Phase $I_L=F[P]$, it is anticipated that it may be simultaneously a function of both, e.g., a complex function of both $V_{AC}$ and Phase, $I_L=F[V_{AC},P]$ or as independent functions combined together for example, $I_L=F[V_{AC}]\cdot F[P]$.

Implementation in LED Decorative Filament Lamps

FIGS. 24A-32 depict perspective, cross-section, and tabular views to explain and illustrate exemplary packaging of diversion current modules of FIGS. 6-23B within a standard form factor lamp base.

One application of the described technology is for LED decorative retrofit filament lamps. This application requires dimming and full glass aesthetics. Full glass requires the driver to be substantially hidden within the lamp electrical base cap. Non full glass, for example, may include a large plastic intermediary between the glass and metal base resulting in the following issues: (1) significantly obscuring a portion of the decorative glass and thereby also light output; and, (2) significantly violating the standard lamp form factor to the point it is aesthetically objectionable.

Retrofit lamps are designated by the glass shapes and the base cap types. (See, e.g., IEC 60630 ed2.5 b-2005 Maximum Lamp Outlines for Incandescent Lamps, IEC 60630-amd6-2009 Maximum Lamp Outlines for Incandescent Lamps, Amendment 6, ANSI C79.1-2002 Nomenclature for Glass Bulbs Intended for Use with Electric Lamps, and ANSI C81.61-2009_IEC 60061-1 Specifications for Bases (Caps) for Electric Lamps, the contents of which are incorporated herein by reference). Some exemplary standard form factor lamps, including glass shapes, are shown in FIG. 29, and some exemplary standard form factor base types are shown in FIG. 30, of U.S. Provisional Application Ser. No. 62/141,010, titled "LED Lighting," filed by Shum, on Mar. 31, 2015, the entire contents of which are incorporated herein by reference.

For example, decorative lamp bulbs for illuminating through an optically transmissive envelope. For example, optically transmissive envelopes for illuminating include a subset of these glass shapes including A, CA, C, B, G, S, T, F, ST, and Prism. Decorative lamps also use a subset of the bases including E10, E11, E12, E14, E17, E26, E27, BA9S, B15D, B22, B22D, BA15D, BA15S, SC, GU10, and GU24. E12, E14, E26 and E27 are of particular interest as they are the more popular for decorative lamps. Of these 4 base types, E12 presents the greatest challenge since it is the smallest. A cross section of a typical lamp base is show in FIG. 25. The lamp base includes a metal base shell forming the "neutral" terminal, a center contact forming the "hot" terminal and an electrically insulating material at the bottom of the base to electrically isolate and fix the terminals from each other. The lamp base form factor is typically designed to allow for electrical and mechanical connection to a lamp socket. Such lamp form factors include, a screw such as with Edison base "E", bayonet such as "B" type, twist lock such as "GU" type, pin type such as "MR" and others.

The next section of this disclosure describes the construction of embodiments of an LED driver for E12, as solving the problem for the smallest base automatically solves the problem for the larger base types. By way of example and not limitation, further challenges for the confined space may include: (i) meeting regulatory, safety, general industry requirements (see, e.g., Integral LED Lamps Program Requirements Version 1.4 Energy Star; UL 1993 "Self-Ballasted Lamps and Lamp Adapters, UL 8750 "Safety Standard for Light Emitting Diode (LED) Equipment for Use in Lighting Products," the contents of which are incorporated herein by reference) generally call for relatively large components such as fuses and surge protectors, e.g., Metal Oxide Varistor (MOV) is one type of surge protector; (ii) UL requires minimum electrical spacing between metal traces on a PCB as well as from traces to the metal housing. This will drive the PCB to become too big to fit into, for example, an E12 lamp base. The electrical insulation requirements may also be difficult to accommodate without increasing in thermal resistance; and, (iii) the driver circuit generates power which must be dissipated in a very confined space, thus creating very high power densities resulting in driver temperature at unreliable operating levels. In particular the bleeder or hold up current of the previously described examples may be expected to consume significant power that must be properly dissipated. As one example, FIG. 16 show the holdup current circuit consuming more than 0.5 W of power.

In a further embodiment, the lamp base may include a portion that is beyond the standard lamp base form factor, for example an additional portion that sits above the standard screw section that extends the overall base height. This additional portion may be one piece formed from the metal base or second pieced added to the screw section. Regardless, this addition portion must comply with appropriate certification such as, UL 8750, UL 1993 or CE regulations. For example, the additional region should generally be insulating. If the additional region was formed from the same piece as the metal screw base, then this addition region should be covered with electrically insulating material. Such insulation could be accomplished by covering with heat shrink, a silicone or rubber elastic sleeve, a regular plastic cap, painted on insulation, or over molding with an insulating material such a plastic. The overall result is at least a portion of the lamp base defines a form factor that complies with ANSI C81.61-2009 standards for a form factor.

Figure 24A:
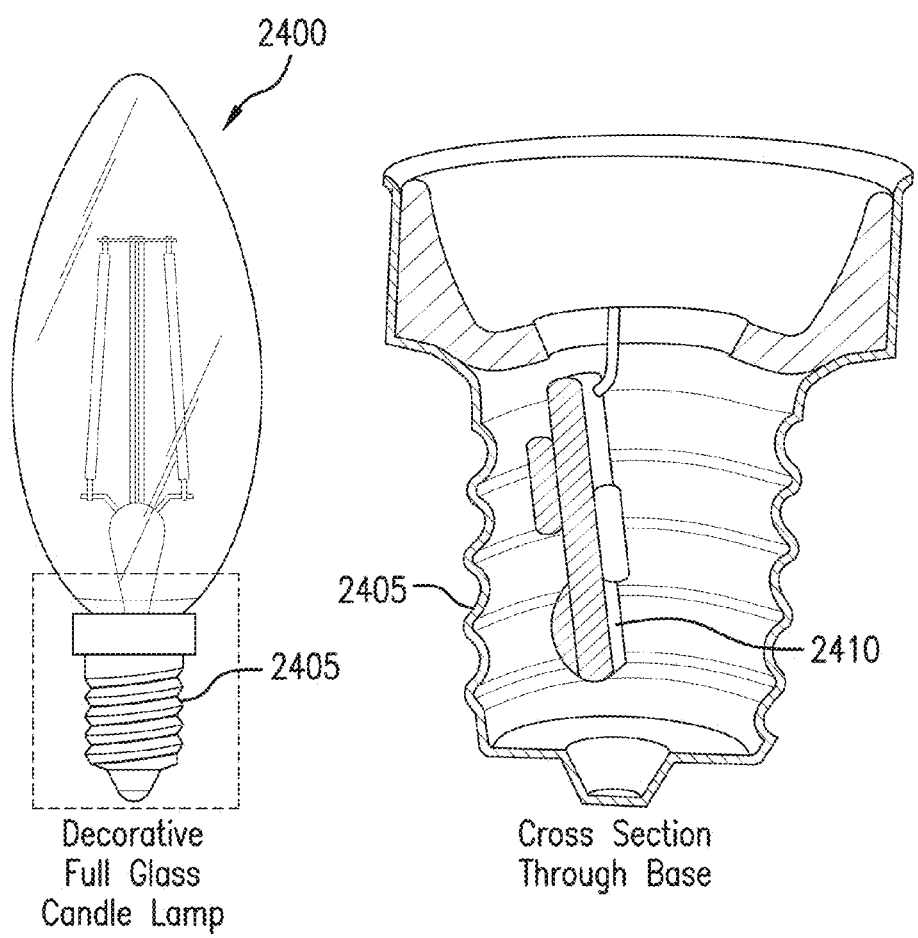

Example of Prior Art FIG. 24A

In the example of FIG. 24A, a prior art lamp 2400 includes a base 2405 that contains a PCB 2410. The PCB 2410 is arranged substantially in a vertical orientation dangling in the middle of the base resulting in it being substantially thermally isolated from the metal base 2405. Indeed, the PCB 2410 is disposed substantially in the middle of the base. It is also missing a fuse and a surge protector such as an MOV. The removal of these components may have allowed it to mechanically fit into the base but will significantly impact the commercial viability of this product as it violates multiple standards, cannot dim, and will exhibit poor reliability. Example of a typical fuse include part number 0473002.MRT1L from Littel Fuse. Example of MOVs include part number B72205S0151K101 from TDK.

Figure 27:
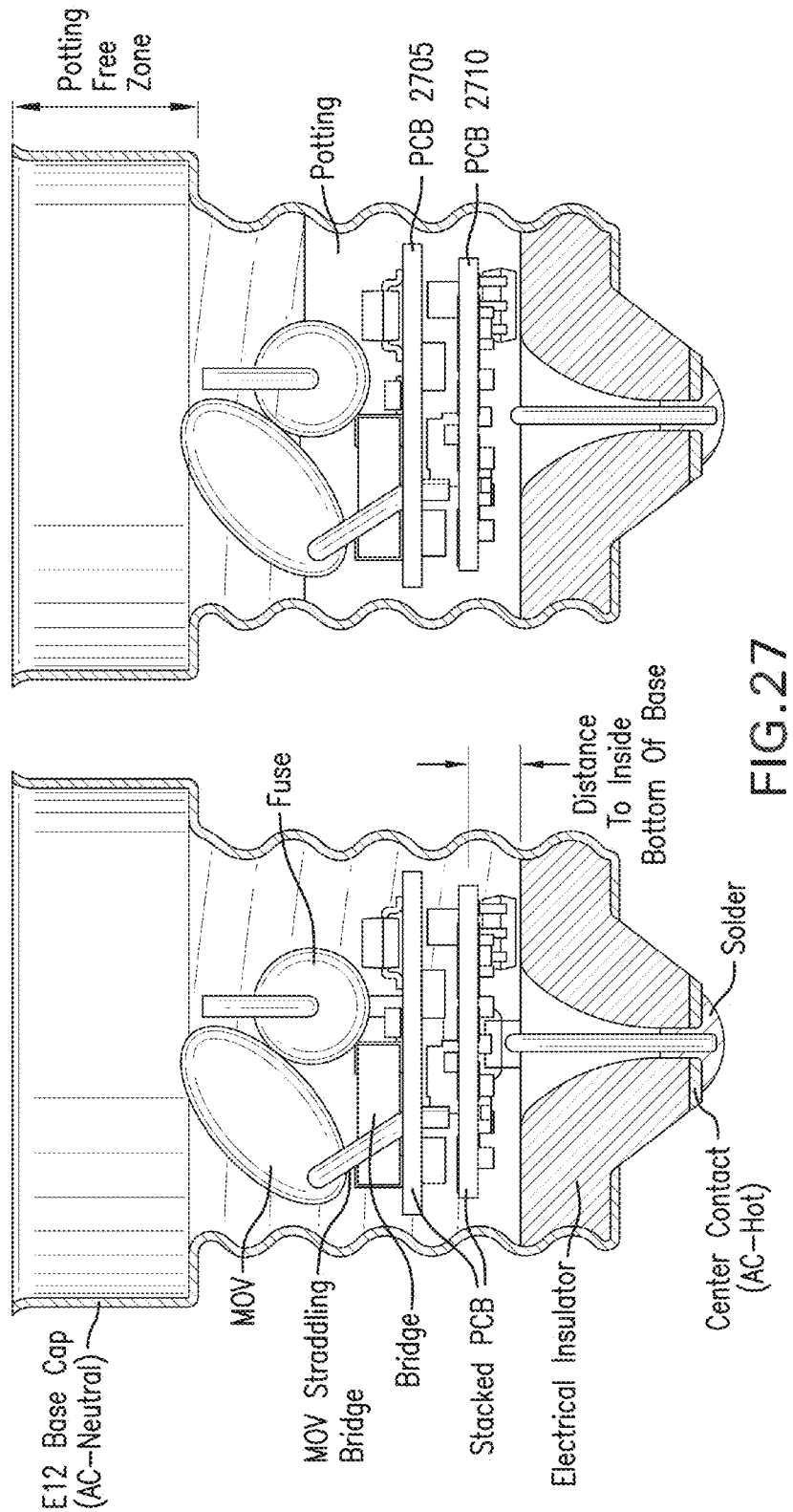

By way of illustrative example, and not limitation, the elements of the solution may address several questions, employed either alone or in combinations: (i) thermal conduction of heat from PCB to the base metal; (ii) Horizontal PCB orientation; (iii) Reversed orientation as shown in FIG. 27, enables placing the highest heat producing components (e.g., RB, Q1 or Q4 of FIG. 19) in close proximity to the inside bottom of the base; (iv) locating the hot driver components to the bottom of the base; and, (v) PCB spurs to provide spacing.

Thermal Conduction of Heat from PCB to the Base Metal

The full glass aesthetics of decorative lamps require the entire driver to be hidden inside the metal base. For small bases including E10, E12 or E14, this is a particular challenge. E12 is a commonly used base for candle lamps in North America, with bulb shapes such as B10, B11, C10, C11, CA10, CA11, etc. For the E12 base in particular, the internal diameter is about 10 mm with a height also about 10 mm. In some embodiments, the entire driver must not only fit within but also be sufficiently electrically isolated from the metal screw base to meet UL standards. In the past, such insulation would typically involve heatshrink with the driver substantially suspended in the middle of the driver, as in prior art depicted in FIG. 24A. Such an implementation exhibits very low thermal conductivity.

In one embodiment, to overcome this problem, a thermally conductive but electrically insulating material, such as potting, may be used to provide an improved thermal path from the driver to the lamp's metal base. In some preferred embodiments, this thermally conductive material may have a thermal conductivity >0.3 W/mK. Potting is generally used here to describe such materials. By way of example and not limitation, such material may include, for example, a 2 part Dow Corning Sylgard 160 Silicone or single part material Silicone Adhesive TIA0220 or TSE3282-G from Momentive, or epoxy based, or paste materials. In one embodiment, one or more electrical components, that can together dissipate more than 30% of the total driver heat power, make contact with the thermally potting conductive material.

In another further embodiments, the entire driver may be substantially encapsulated by the potting material and the material cures from a paste, gel or liquid form to a solid form. This may be advantageous in that the exposed electrical portions of the driver PCB is substantially encapsulated resulting in relaxation of the trace spacing requirements needed for safety certification. For example, with reference to FIG. 24B, in table 7.4 of UL Standard 8750, the spacing requirements relaxed from 0.5 to 0.3 mm for traces carry up to 150V thus allowing the PCB to become more compact and fit into small bases such E12.

In some embodiments, the driver may be conformally coated with a thin electrically insulating material. The coating relaxes the spacing requirement. Thus the driver need not be completely encapsulated. Examples of such conformal coating materials include UV50, UV500, UV40, 1C63, 1C49LVF, 1C49HVF, which are commercially available from the company HumiSeal, which has offices in Massachusetts.

Horizontal PCB Orientation

Figure 25:
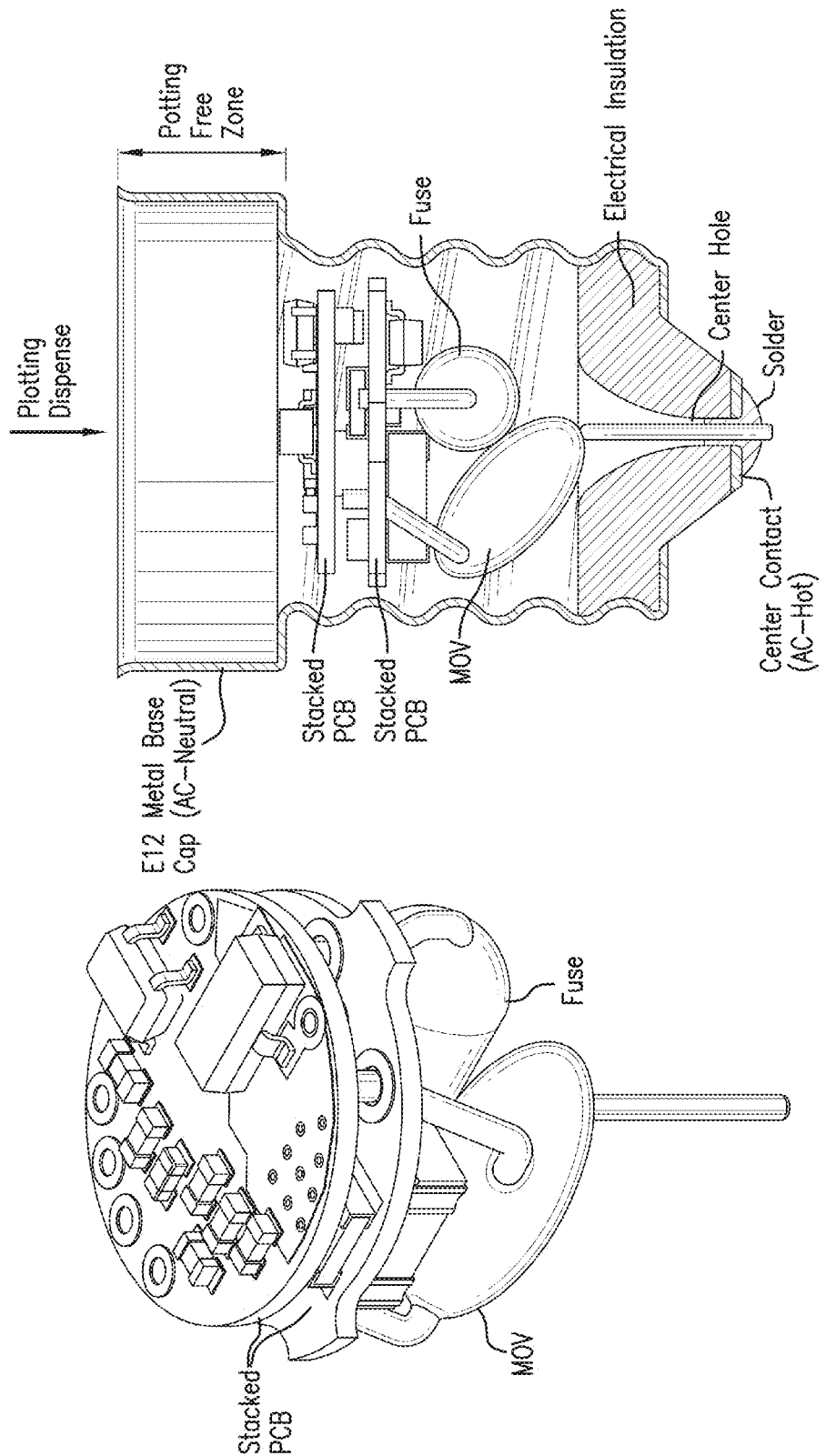

In one proposed orientation, the PCB is horizontal. In the example of FIG. 25, two parallel stacked PCBs are used to provide sufficient PCB areas for the electronic components, but in future implementations where many of the components can be consolidated into an ASIC, IC a single PCB may be sufficient. The horizontal implementation enables room for the relatively large components of a fuse and MOV to go above or below the PCB whereas the vertical PCB orientation does not.

In FIG. 25, the fuse and MOV are at the bottom of the E12 base cap. This allows for the natural electrical wiring flow as the center AC-Hot contact goes first to fuse and MOV. However this orientation presents 2 problems: (i) difficulty for potting; and, (ii) long thermal path required for the conduction of heat from electronics components to the base cap resulting in higher thermal resistance. In prior examples in this document, example LED drivers had an efficiency from 26-80%. For a 5 W driver, for example, this means, the mechanical geometry need to dissipate from 1 to 4 W to base metal cap and then in to a socket, then to the environment. If the PCB is left isolated from the base cap, the heat must dissipate first into the surrounding air with a very poor conductivity of 0.026 W/m-K.

By way of example and not limitation, some embodiments may include potting material, which may be silicones or epoxy, for example. An example of a potting material is Dow Corning Sylgard 160. Although potting material can have thermal conductivity to for example 0.62 W/m-K for Sylgard 160, which is significantly better than air, it is still much lower than the base cap metal material typically made of aluminum with thermal conductivity of 200 W/m-K or brass 109 W/m-K. It is advantageous to locate the electronic components as close to the base metal cap as possible to minimize conduction through the potting material.

Another advantage of potting is to reduce electrical trace spacing requirements, thus enabling smaller PCBs.

In an illustrative embodiment, at the top of the E12 cap, the area is to be kept free of potting, "Potting Free zone", since the glass bulb interfaces into this region. Potting material has relatively high viscosity with the consistency of syrup. For example Sylgard 160 has a viscosity of 8775 centipoise (cP). In one embodiment, potting is dispensed from the top of the E12, but the flow is immediately impeded by the PCB making the process not suitable for high volume manufacturing. Potting must be dispensed to fill the entire bottom screw portion so it can then cover the top of the PCB without entering the potting free zone, a very difficult task.

In other implementation where the viscosity is such it is paste like and does not flow such as viscosity in the range of 20,000 to 1,000,000 cP it made be advantageous to first inject the paste into the base then push the drive into the paste, allowing the center hot lead from the driver PCB to thread through the center base hole. The advantage of the paste is that it will not flow out of the center hole.

Thermal Issues

Figure 26:
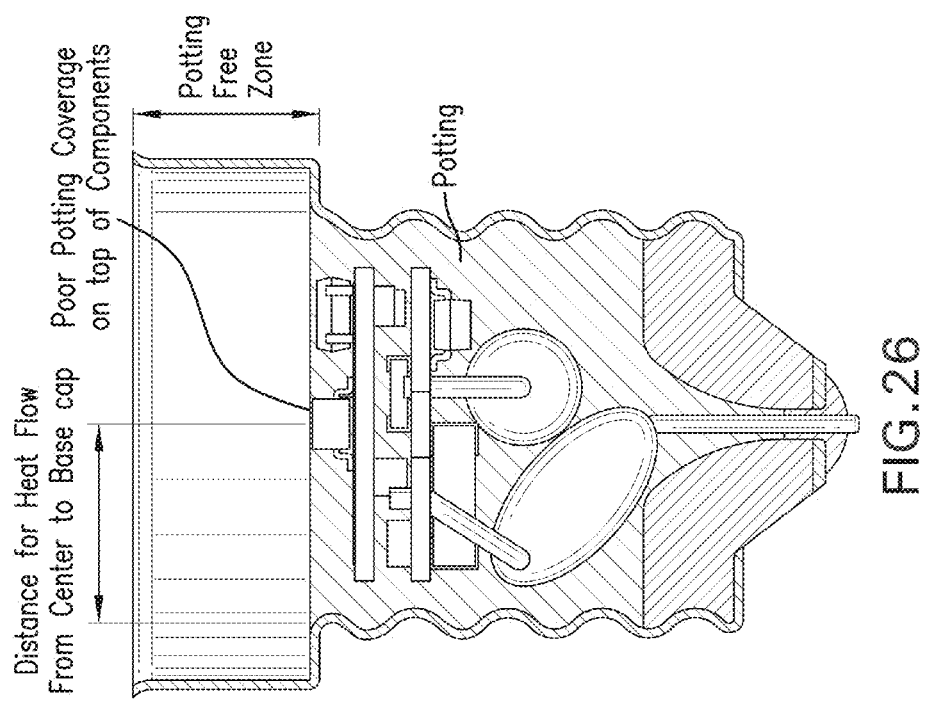

Even if it were possible to dispense the potting material, the geometry is inherently not optimal for thermals. As illustrated in the example of FIG. 26, the top (e.g., distal-most facing) of the PCB has poor potting coverage. Heat generating components at the center of the PCB must traverse a long distance to reach the metal cap.

Reversed orientation as shown in FIG. 27, enables placing the highest heat producing components (e.g., $R_B$, Q1 or Q4 of FIG. 19) in close proximity to the inside bottom of the base.

In this reverse orientation many of the heat generating components are disposed on a side of the PCB that is facing toward the bottom of the base (i.e., facing away from the light emitting portion of the lamp. In one embodiment more than 50% of the heat generated is on the bottom-facing side of the board.

Reversing the PCB, i.e. inverting it to be upside down in comparison to the PCB depicted in FIG. 25, advantageously solves both potting and thermal issues. The reserved orientation is not obvious since its goes against the electrical wiring flow. In this reverse orientation, there is space above the PCB for potting compound to accumulate then flow around the PCB.

Neither the fuse nor MOV generate significant heat and need not be potted. Thus unlike the prior geometry of FIG. 25, the screw base need not be completely filled to have adequate coverage of the PCB. Less potting material is needed, saving cost and time needed to dispense the material into the base.

Another benefit, the electronic components and the PCB are pushed against the insulating floor of the base thus significantly reducing distance and thus thermal resistance to the base cap. In one embodiment, the PCB components are within 6 mm of the top most portion of the insulator inside the bottom of the base.

It is preferable that the Fuse is in the horizontal orientation to minimize the overall height in the base. The term fuse is also to include a fusible resistor.

In various embodiments, as may be seen from FIGS. 25-27, for example, packaging may incorporate a "straddling" technique for placing circuit larger leaded components, such as the fuse or MOV, in an overlapping footprint on the same side of a PCB with at least one other component, for example a resistor, capacitor, bridge, transistor. FIG. 25, for example, illustrates an example with both an MOV and a fuse bridging or overlapping other components disposed between their electrical leads. The fuse in FIG. 25 is shown in a horizontal orientation to minimize height. In some embodiments, these components may my facing away from a proximal end of the lamp, where the proximal end of the lamp is the end to which the base attaches.

PCB Spurs to Provide Spacing.

Since PCBs 2705, 2710 handle high voltage, there needs to be sufficient spacing and therefore electrical insulation between the PCB traces and the metal base cap. In the past, the PCB must be insulated with a sleeve such heat shrinking tubing. However, such sleeving may be difficult to control in overall size, as it may impede the flow of potting compound, and may also impedes heat flow from the electronic components.

Figure 28:
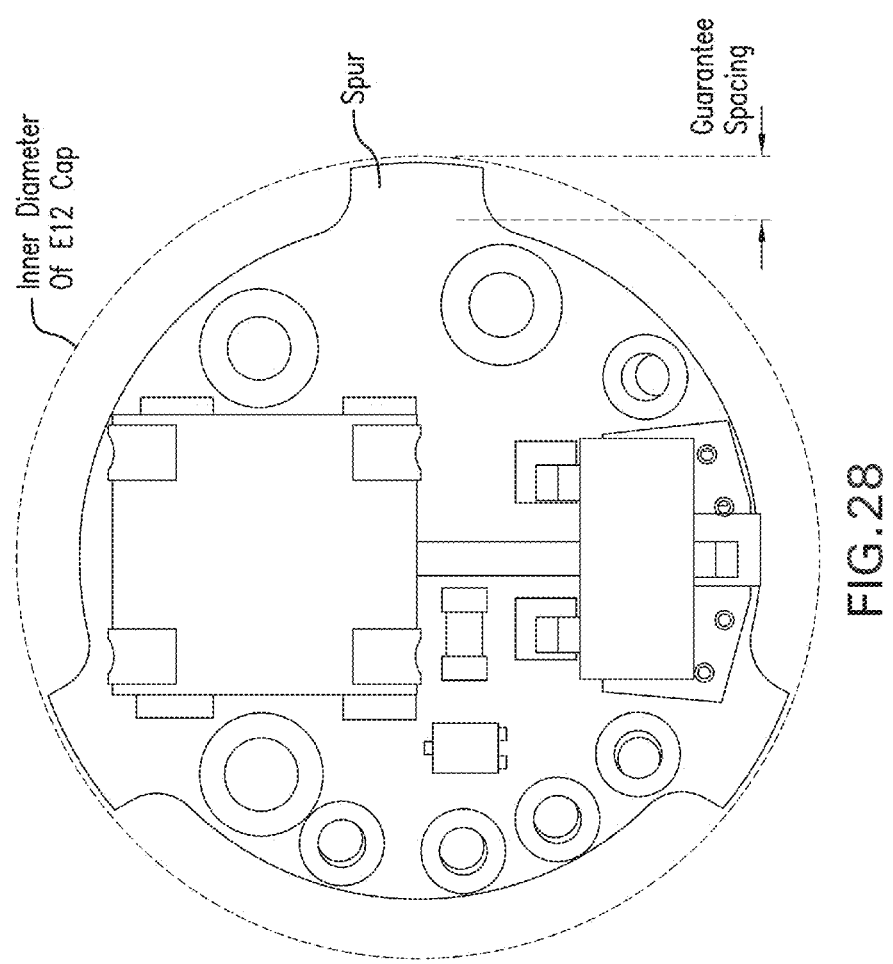

FIG. 28 depicts an exemplary PCB with peripheral spurs arranged to facilitate insertion of thermally conductive material into the base. The spur in the PCB guarantees a minimum spacing to the E12 metal cap and eliminates the need for sleeving while creating gaps between the spurs to allow for the potting compound to flow around. A minimum spur dimension of 0.35 mm provides sufficient spacing to meet UL 1993 insulation requirements. The addition of potting creates solid insulation between electrical traces and components on the PCB and the metal base, thus reducing UL spacing requirements. The potting also fixes the PCB so it does not move thus fixing the spacing between the driver components relative to base thus relaxing again the UL spacing requirement to the metal base. Although in the depiction of FIG. 28, there are 3 relatively small symmetric spurs, it anticipated, that the number of spurs may vary, and spacing between spurs may be of varying dimensions, as long as the spurs serve generally to locate the PCB in a center of the base. In addition, there should be sufficient openings between the spurs to allow for the flow of potting compound. In one assembly process, the PCB is placed inside the cap and the center hot lead is soldered to center contact creating a seal unit. The potting is then injected into the cap so the potting flow on top and around the edge of the PCB. An outgassing operation such as in the low pressure or vacuum chamber may facilitate the removal of air bubbles. In an alternate assembly process, the potting is first put into the base and the PCB is pushed into the potting and some of the potting squeezes around the PCB to cover at least a portion of the top of the PCB. The center "hot" lead from the PCB is pushed through the potting compound and through the center base hole. The potting material is wiped of the lead and soldered in to the center base contact. In this second process, the potting material has viscosity similar to a gel or paste so it does not leak through the center hole.

Additional Features

It is anticipated there may be additional features, derivatives and modifications to the circuits or mechanical packing.

Addition of Capacitor to Reduce Flicker

Figure 29A:
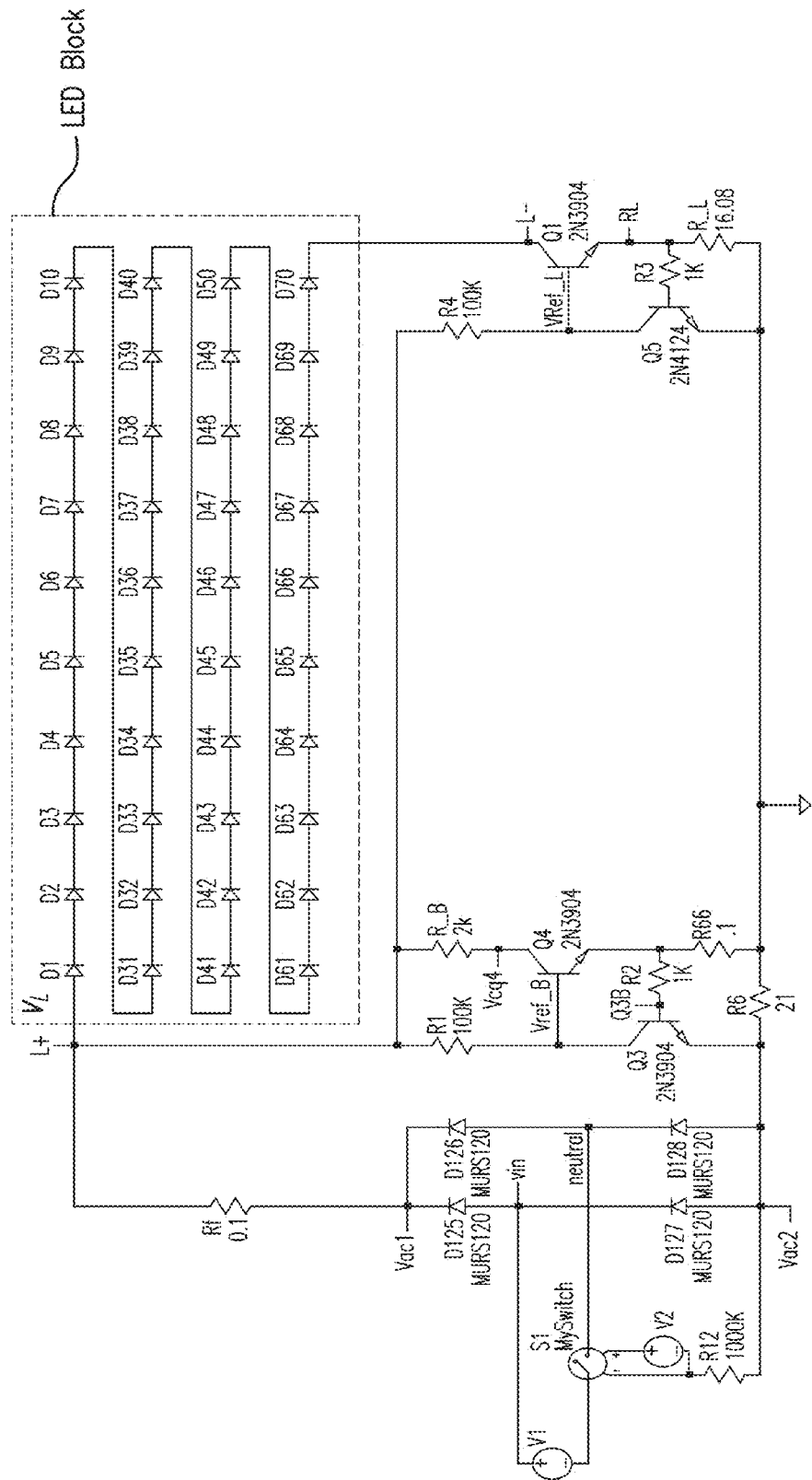
Figure 29B:
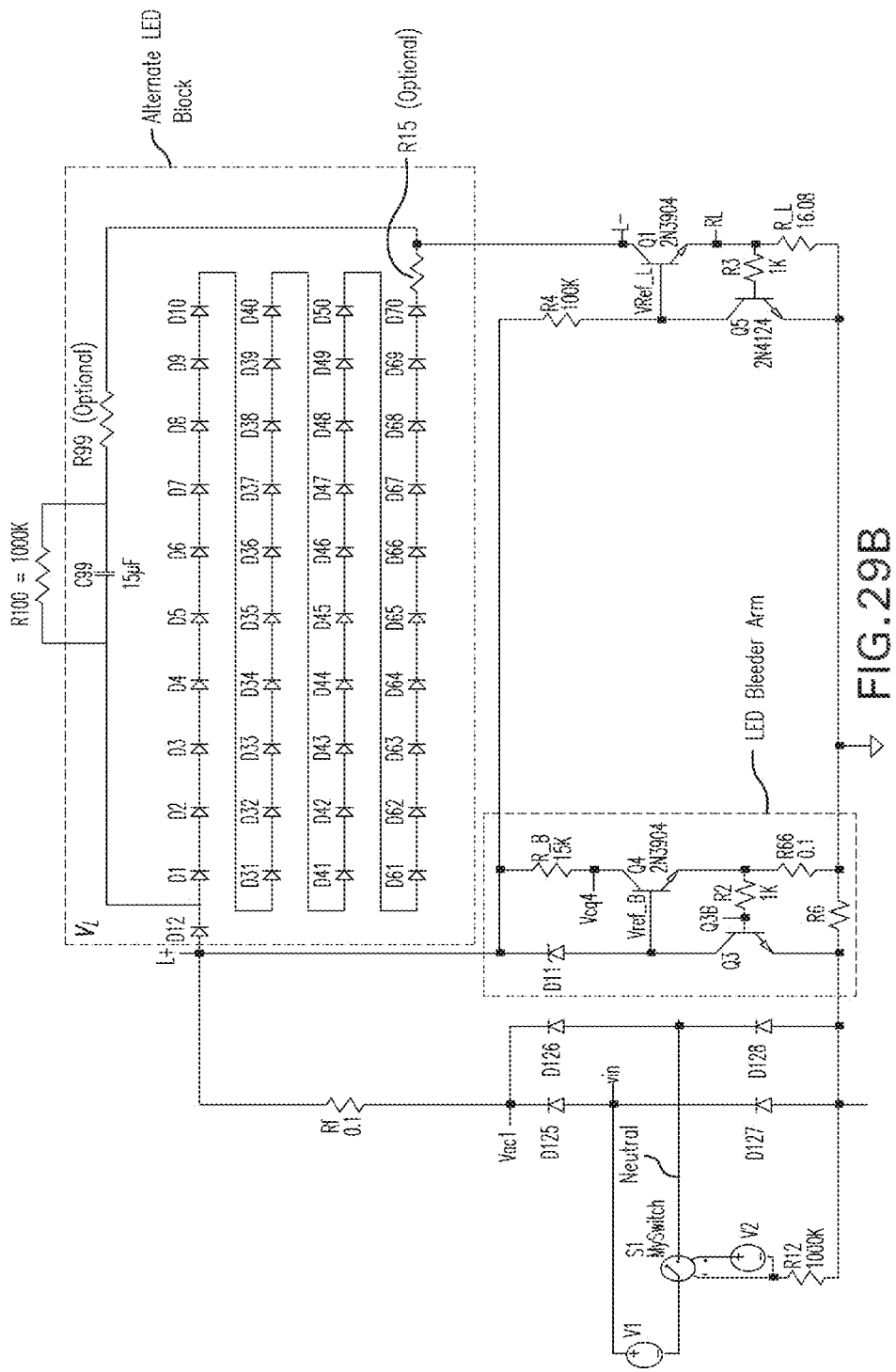
Figure 30:
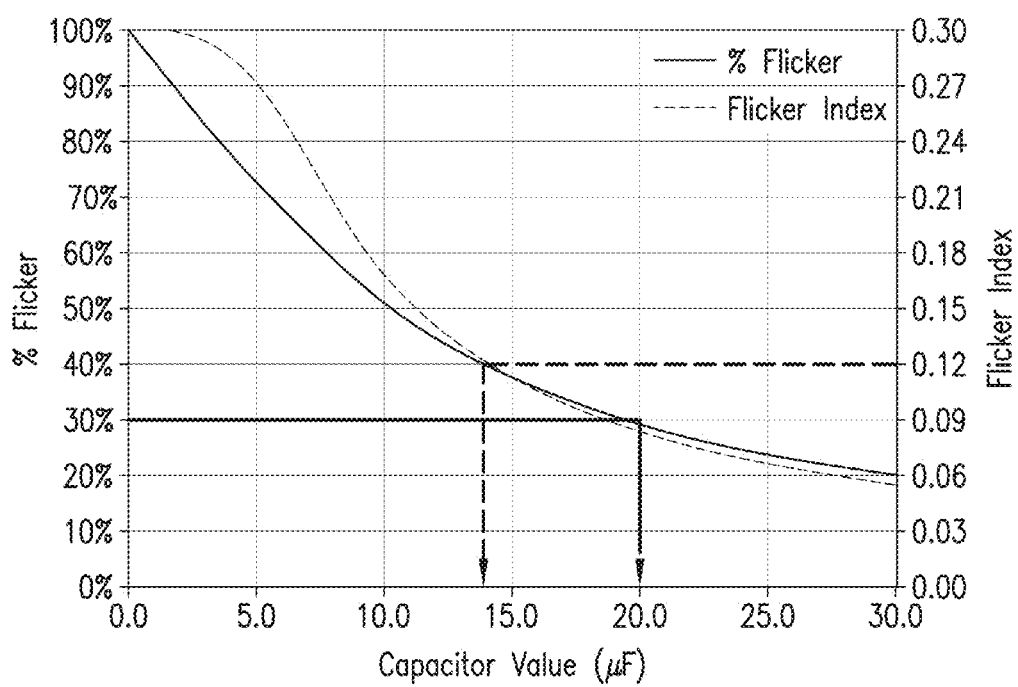

In the examples of FIGS. 29A and 29B, the LED block of FIG. 29A and prior examples with similar LED Blocks may be modified to include a capacitor C99 across the LEDs (D1-D10, D32-D70) as shown in FIG. 29B. In this embodiment, a diode D12 is added immediately before the capacitor to prevent the capacitor from discharging back into the LED bleeder arm. There are also optional resistors R99, in series with the capacitor, or optional resistor R15 in series with the LEDs.

When the power to the system is turned off, capacitor C99 continues to supply a small amount of current to the LED until it is completely discharged. As the eye is very sensitive, the light emitted from the LEDs is noticeable and is perceived as the lamp having not turned off even though the power to the lamp is power off. In a further embodiment, in order to discharge the capacitor faster and thus turn the LEDs off, an optional resistor R100 can be placed in parallel across capacitor C99. R100 need to be small enough to allow for the rapid discharge of the capacitor but large enough so that it does not degrade the efficiency of the system. Possible value of for R100 would range from 250 kΩ (kilo ohms) to 10,000 kΩ for example 1,000 kΩ.

This disclosure includes this derivative implementation where all the LED blocks examples described herein can be modified with the capacitor C99, diode D12 and resistors R99, R15 and R100. The capacitor C99 may be formed of one or more capacitors together to make up the total capacitance value.

It is advantageous to put the capacitor across the LED rather than across the output of the bridge. In such an implementation, the dimming performance is not affected while reducing flicker and the capacitor charges to a steady state voltage fluctuation around the LED forward voltage, $V_L$.

The capacitor should have a large enough capacitance value so that the flicker is maintained below a predetermined acceptable value. Flicker is measured as Percent Flicker or Flicker Index. For the flicker not to be objectionable, the minimum flicker percentage may be specified to be less than about 20% at 100 Hz and about 30% at 120 Hz. In prior Energy Star drafts, an upper limit of a flicker index of 0.12 was proposed.

FIG. 30 shows the flicker index and percent flicker as a function of capacitor value, where the LED forward voltage, $V_L$, is about the same as the RMS AC line voltage, $V_{AC}$, and where the average LED current $I_L$=20 mA. To achieve the same flicker at different average LED current, the capacitor need to scale proportionately. To achieve a percentage flicker of less than 30%, the capacitor need to be larger than 20 uF for 20 mA or the capacitor value in uF is equal or larger than the LED average current in mA. To achieve a flicker index less than 0.12, the capacitor needs to be larger than 14 uF for 20 mA or the capacitor value in uF is 70% or larger than the LED average current in mA.

In some cases, the capacitor may be simply too large to fit into the required form factor. In a further embodiment, the addition of the resistor R15 in series with the LED will also reduce flicker. The value and/or the configuration (e.g., series or parallel) of additional resistance can be an important parameter to optimize flicker index and efficiency. The following table shows the effect of adding either a resistor R99 or R15 to FIG. 29B with completely different results. In the first reference case, where the capacitor is limited to 15 uF, and both resistor R99 and R15 are 0Ω, the flicker is at rather high level of 38% as previously shown in FIG. 30 for 15 uF. In the second case when we change the resistor R15 to 200Ω, the flicker is reduced significantly to 29% with a slight decrease in driver efficiency from 62% to 60%. However, in the third case, when we just change R99 to 200Ω, it has the opposite effect of increasing the flicker percent to 50% thus making it worse. The resistor selection is important and not immediately obvious. In the fourth case, the value of R15 is further increased to 500Ω to further reduce flicker to 21%.

| Capacitance | Driver Efficiency | R15 | R99 | % Flicker | Flicker Index |
|---|---|---|---|---|---|
| 15.0 | 62% | 0.0 | 0.0 | 38% | 0.11 |
| 15.0 | 60% | 200.0 | 0.0 | 29% | 0.08 |
| 15.0 | 63% | 0.0 | 200.0 | 50% | 0.16 |
| 15.0 | 57% | 500.0 | 0.0 | 21% | 0.06 |

For Japan, the required PSE (Product Safety Electrical Appliance & Material) certification requires the minimum flicker to be 5% of the peak light output. In such as case the capacitor value in uF is 5% or larger than the LED average current in mA or 1 uF for 20 mA.

Addition of PCB Board

Figure 31:
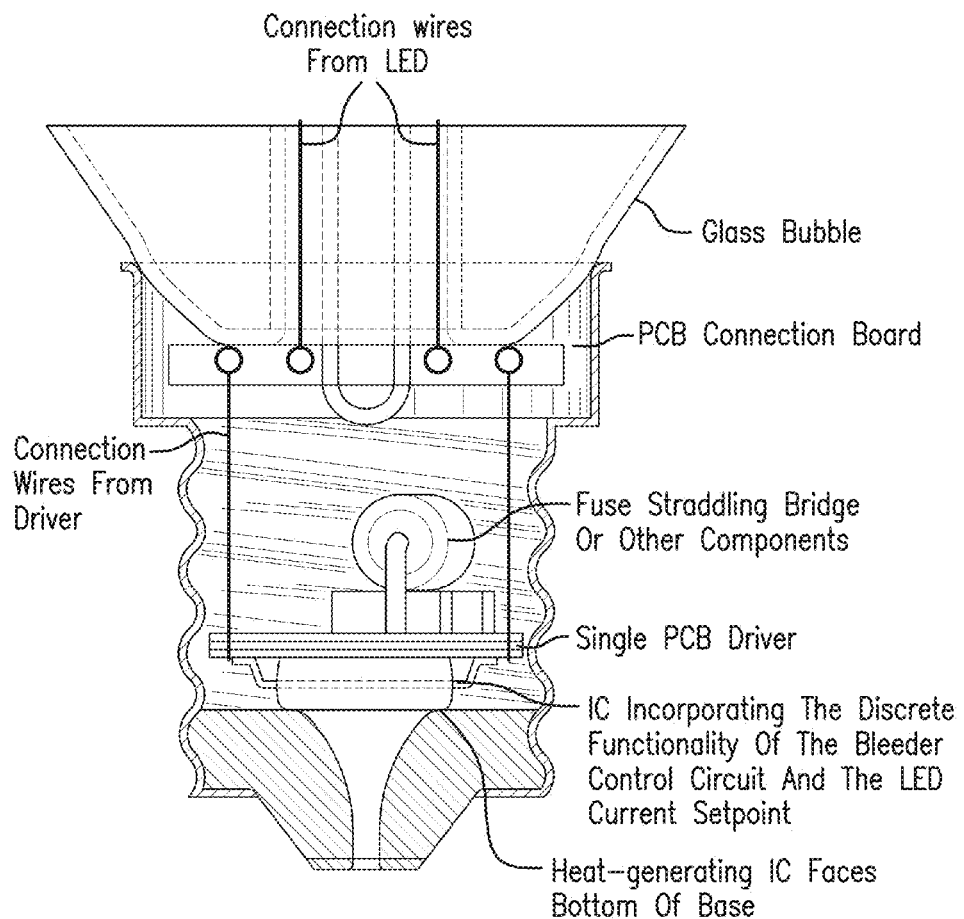

In another embodiment shown in FIG. 31, there is another PCB. In one embodiment it is located next to the glass bulb. In an alternative embodiment it is located nearer the first driver PCB. The PCB serves as a means to connect (1) the wires from the filament and wires from the driver and/or (2) additional room to locate electronics. Both sets of wires are connect together onto this PCB.

The connection can be in the form of soldering, connector or wire wrap. Connector can be in the form, for example, of insulation displacement connector (IDC), pin headers, insulation piercing crimp connector or wire gripper such as those from by Zierick Engineered interconnection Solutions.

Figure 32:
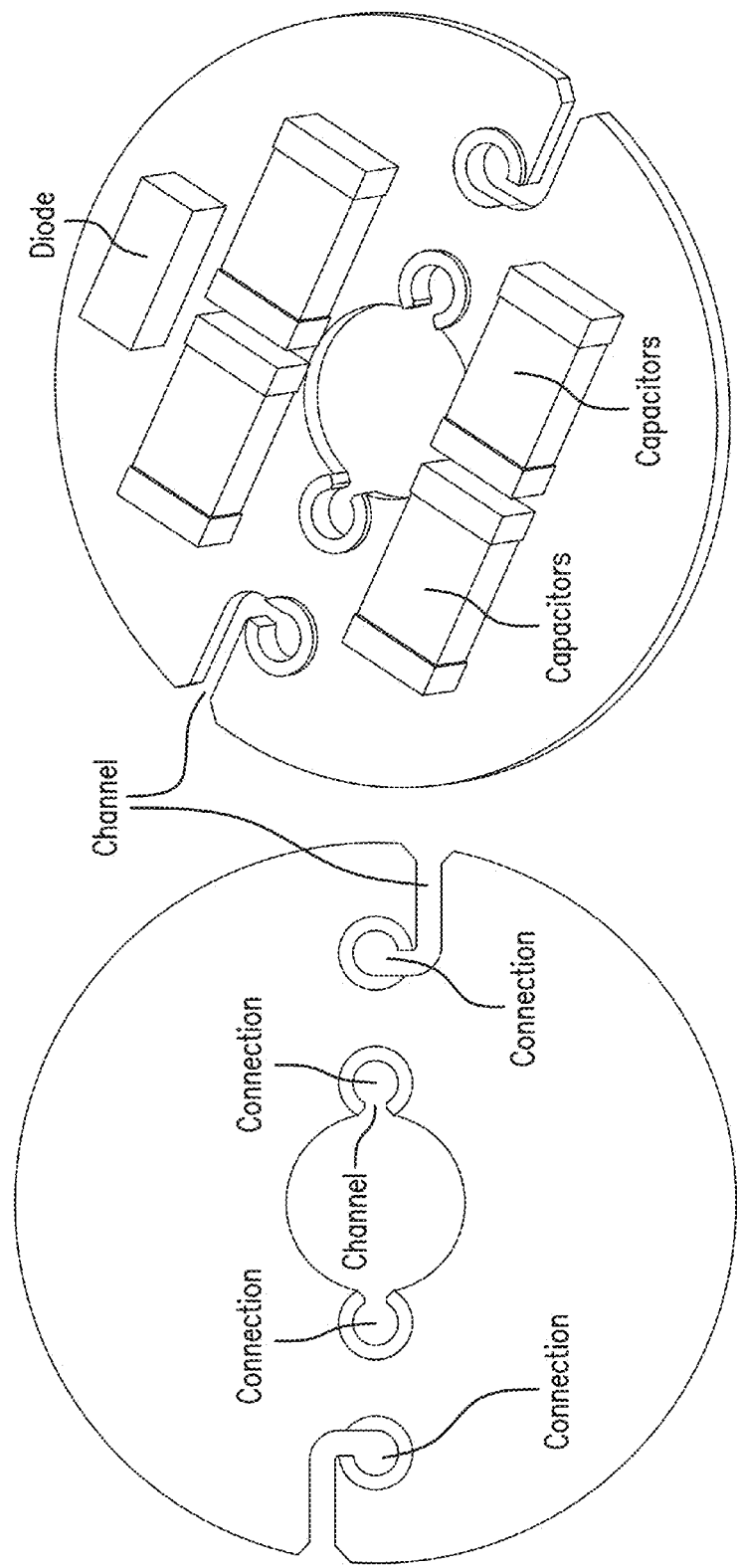

This additional PCB as shown in FIG. 32 allows for optional addition of components such as the capacitors C99, diode D12 or resistor R99, resistor R100, R15 or other components. As will be described elsewhere herein, the additional PCB may support other components, which may include, for example, transistors, switches, current regulators, interconnects, control circuits, and the like.

The second PCB, although providing additional space for such components, generally does not have as good thermal connection to the base as the first driver PCB. So it is highly advantageous to locate components on to this additional board, which do not generate substantial heat, such as the capacitors C99, diode D12 or resistor R99, resistor R100, R15 or other components. In addition, the second board being away from the heat generating components, such as the linear regulator, are generally in a cooler location than the first PCB with such components. This cooler environment of the additional PCB will extend the life of board components, such as an electrolytic capacitor that may be used for C99.

In a further refinement shown in FIG. 32, the connection openings have channels routed in from the edge of the board so the wire need not be threaded through a fully enclosed aperture. This routed channel may, in various embodiments, advantageously facilitate wiring by making it easier to pull in from the edge.

Although ceramic capacitor are shown in FIG. 32, any type of capacitor is allowed. For example miniature electrolytic capacitors such as Nichicon Aluminum Electrolytic Capacitor part number ULD2C100MPD1TD have the appropriate diameter to fit into an E12 base. However, it may be necessary to add an additional portion above the screw section to accommodate the height of the capacitor. The features and requirements for such an additional has already be previous described.

In an alternative embodiment, the additional PCB connection board of FIG. 32, is located next to the first PCB near the bottom of the base and is also in a substantially horizontal orientation.

AC Driver+Multi String at Different CCT+Bleeder Circuit

FIGS. 33-39 depict schematic, waveform and performance plot views to explain and illustrate exemplary LED color temperature shifting as of function of dimming.

Figure 39:
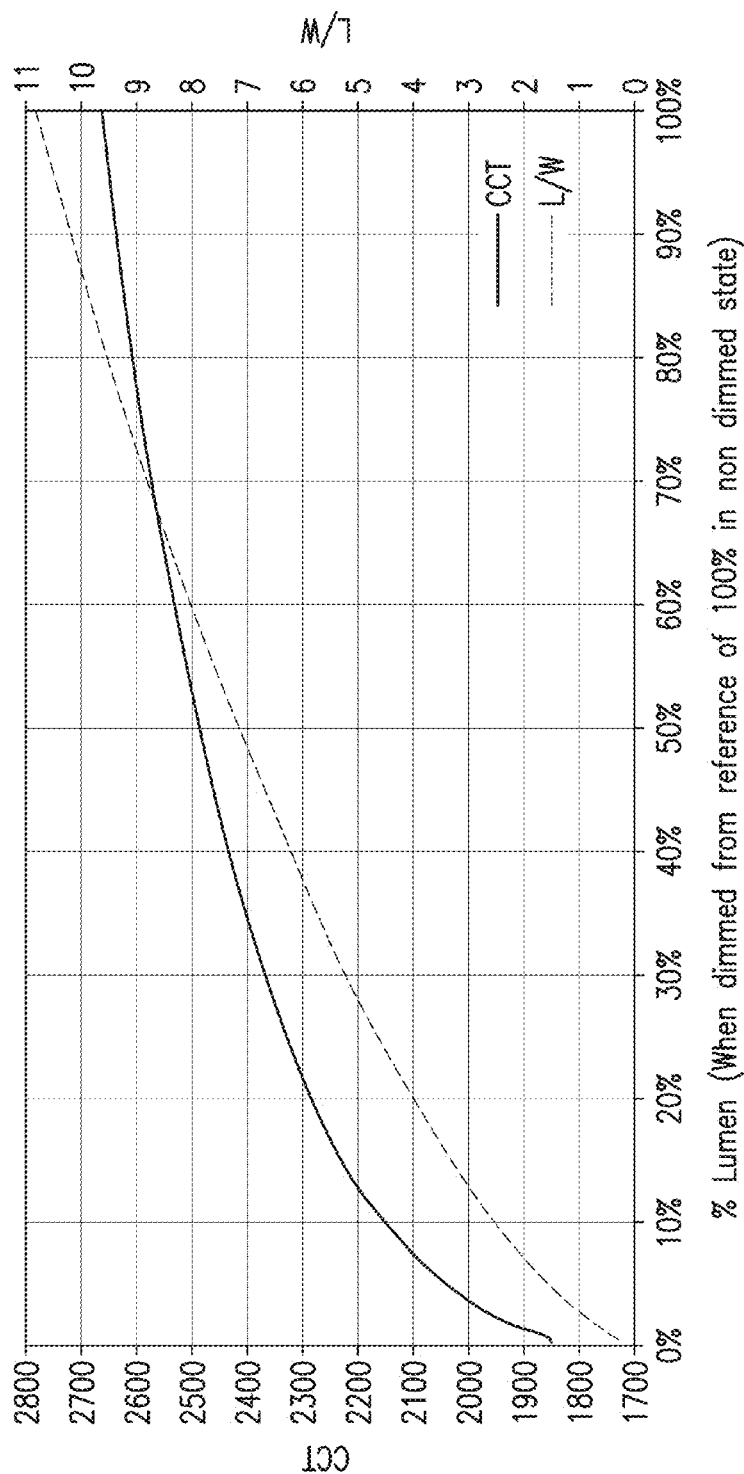

As incandescent lamps are dimmed, the color temperature (CCT) shifts from about 2700K to 1800K. This is a result from the filament cooling in temperature and the spectrum shifting toward the red and infrared, yielding a more orange to red glow also known as "warm dim". Due to a larger portion of the spectrum shifting into the non-visible portion of the spectrum, the efficiency goes down significantly when dimmed. In contrast, LEDs when dimmed shift very little in CCT. It may be desirable in some applications for the LED to shift in color temperature to emulate incandescent. A summary of incandescent behavior is depicted in FIG. 39.

Figure 33:
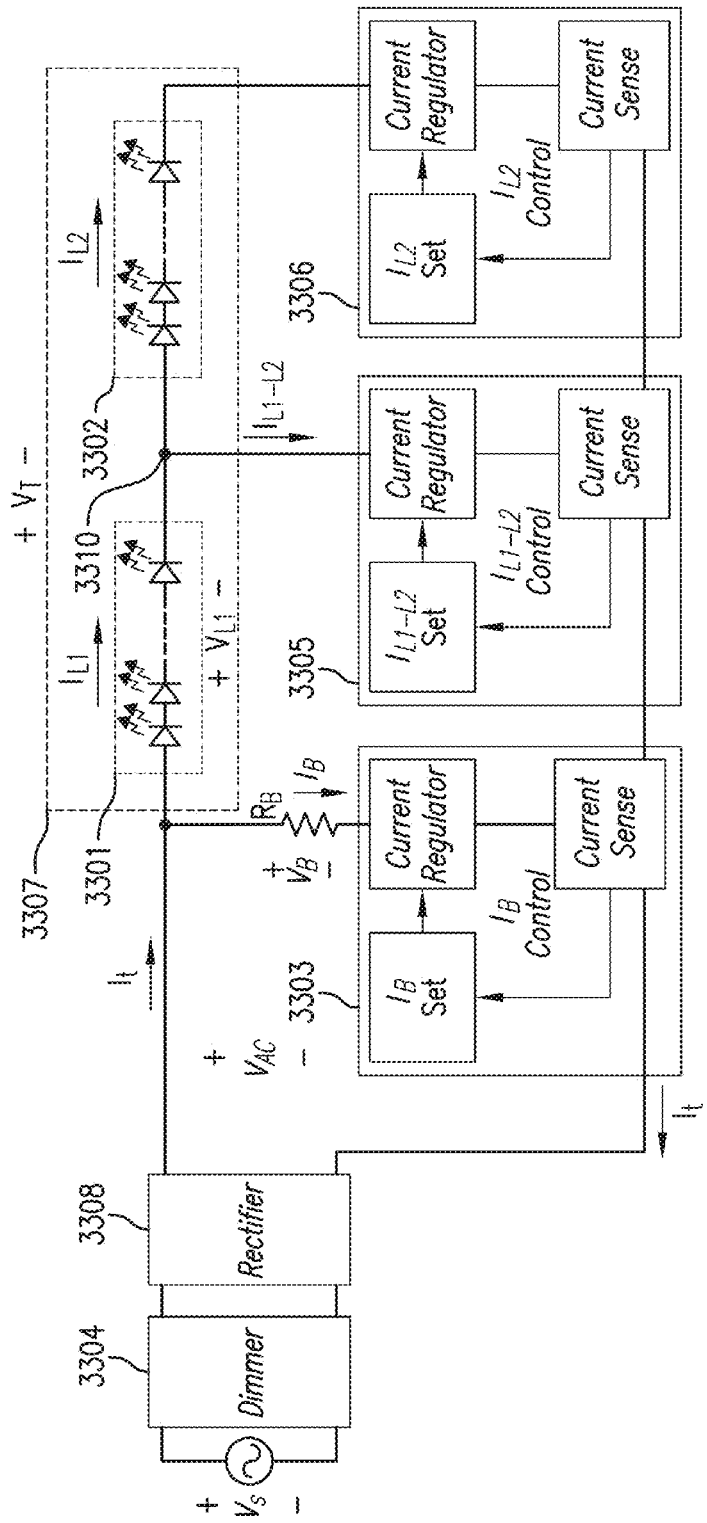
FIGS. 33-39 depict schematic, waveform and performance plot views to explain and illustrate exemplary LED color temperature shifting as of function of dimming.

FIG. 33 shows an exemplary conceptual control implementation for a warm dimming LED. In the depicted figure, the circuit includes 2 LED strings $L_1$ 3301 and $L_2$ 3302 connected in series with a center tap node 3310. String 3301 has a forward voltage of $V_{L1}$ with current $I_{L1}$. String 3302 has a forward voltage of $V_{L2}$ with current $I_{L2}$. Together the total forward voltage of the two strings is $V_T$. In addition, there is a bleeder circuit that maintain a minimum hold current $I_H$ that has similar functionality and options for control as described in the prior sections. In one embodiment, the strings 3301 and 3302 are arranged in proximity to each other shown in box 3307, such for example on a same LED package, on same LED substrate such as a COB (Chip on board), in linear arrangement such as a LED filament substrate or two separate LED filaments connected to each other.

LED filaments are generally long, linear COB substrates between 0.5-5 mm wide by 12 to 70 mm long. These substrates may be made of sapphire, ceramic, metal, or glass. Generally there is a linear array of LED dies connected in series across the length of the LED. When covered with phosphors and activated, the LED filament presents an attractive decorative "look" of an incandescent filament.

In another embodiment, the controllers 3303, 3305 and 3306 are setup in an AC driver format where the controllers are turned on and off as a function of the line voltage. The current to bleeder circuit $I_B$, is regulated by current controller 3303 to a minimum hold current set point $I_H$ as in the same fashion and with the similar options to the prior examples with a single LED current controller. The current $I_{L1-L2}$, is regulated by current controller 3305 to a minimum value of $I_{L1}$, once $V_{AC}>V_{L1}$. The current $I_{L2}$, is regulated by current controller 3306 to a constant level of $I_{L2}$ once $V_{AC}>V_T$. The summary of such an AC driver scheme summarized.

$V_{AC}<V_{L1}$

No LED strings are on. Only Bleeder circuit starts to conducts.

$I_B=I_H$, assuming $V_{AC}>I_H R_B$ (for the simplest implementation with a resistor and current regulator)

otherwise $I_B=V_{AC}/R_B$ $V_{L1}<V_{AC}<V_T$

3301 String starts to conduct, but 3302 string is off

3301 current $I_{L1}$ is regulated by $I_{L1}$ controller $I_{L1-L2}=I_{L1}$ If $I_{L1-L2}<I_H$ $I_B=I_H-I_{L1-L2}$ Else $I_B=0$ $V_T<V_{AC}$ Both 3301 and 3302 Strings are on

3302 current $I_{L2}$ is regulated by $I_{L2}$ controller

If $I_{L2}<I_{L1}$ $I_{L1-L2}=I_{L1}-I_{L2}$

Else $I_{L1-L2}=0$

If $I_{L2}+I_{L1-L2}<I_H$
  $I_B=I_H-I_{L1-L2}-I_{L1}$
Else $I_B=0$

The current set points for the hold current, $I_H$, $I_{L1-L2}$ and $I_{L1-L2}$ can be a constant, or some predetermined general (e.g., arbitrary user-defined) function of the dimmer phase angle and/or line voltage. Such functions have already be described previously. Generally in the configuration shown, LED string 3301 will be active longer than 3302. This is because, string 3301 turns on sooner at a lower line voltage ($V_{AC}>V_{L1}$) than string 3302. At lower dimming levels, where $V_T>V_{AC}>V_{L1}$, only string 3301 is on.

Figure 34:
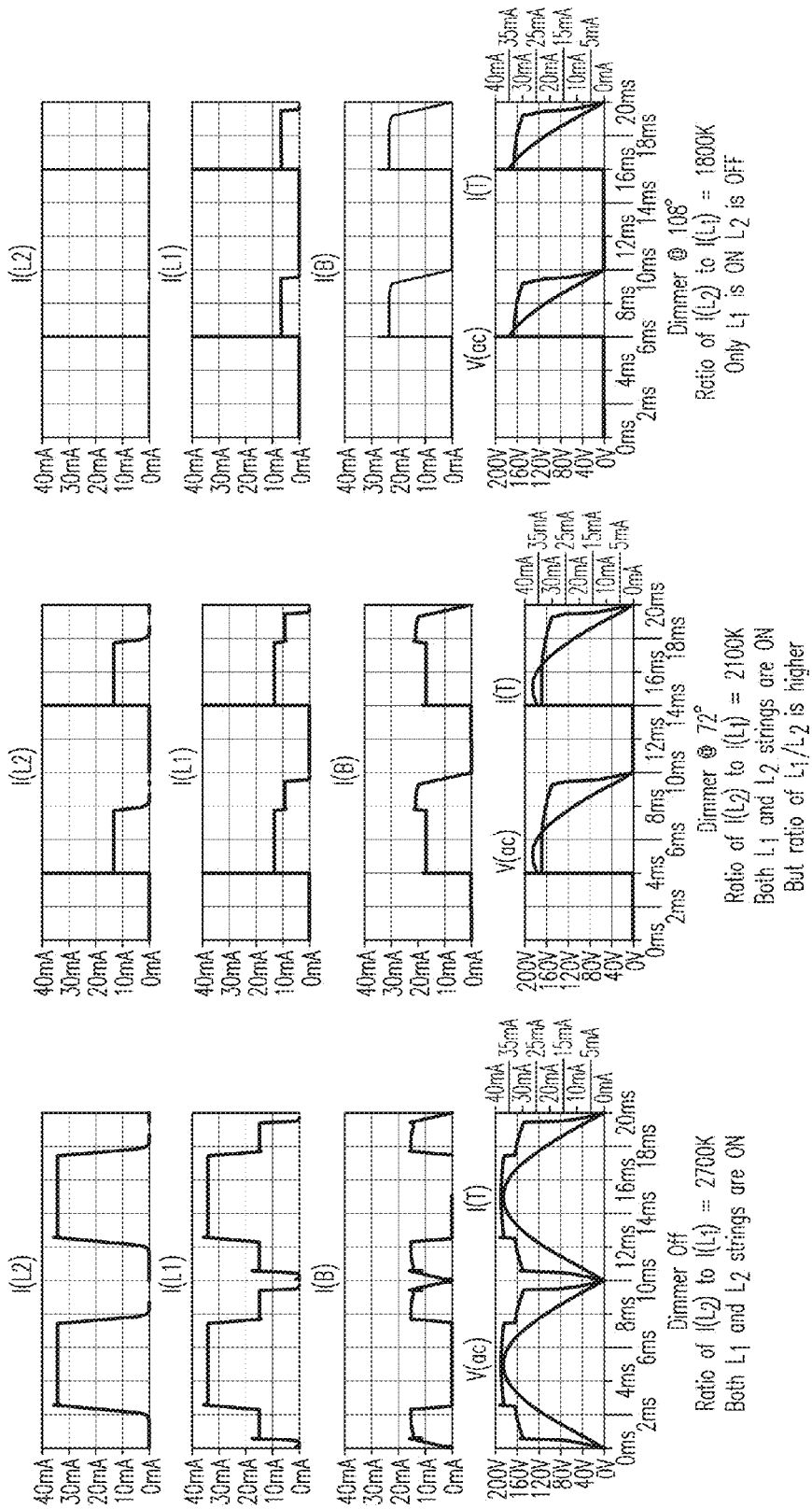

By setting string 3301 to be a warmer color temperature than string 3302 and using the above control scenario, warm dimming is enabled. FIG. 34 shows how the warming dimming works using the implementation of FIG. 33. String 3301 is set to a color temperature of 1800K. The left most set of graphs in FIG. 34 show the waveforms where the dimmer is off and both strings 3301 and 3302 are on. String 3302 is set at a color temperature above 2700K, such in combination with 3301 provides a color temperature of 2700K.

As the dimmer is enabled as shown in the middle set of graphs in FIG. 34, the ratio of light emitted by string 3301 ($I_{L2}$) at 1800K to light emitted by string 3302 ($I_{L1}$) becomes increasingly greater such the average color starts to shift towards 1800K from 2700K. Thus the start of warm dimming occurs.

In the right most set of graphs in FIG. 34, the dimmer is in a position such only string 1901 ($I_{L2}$) is on, thus the lamp has transitioned from 2700K to 1800K.

Figure 37:
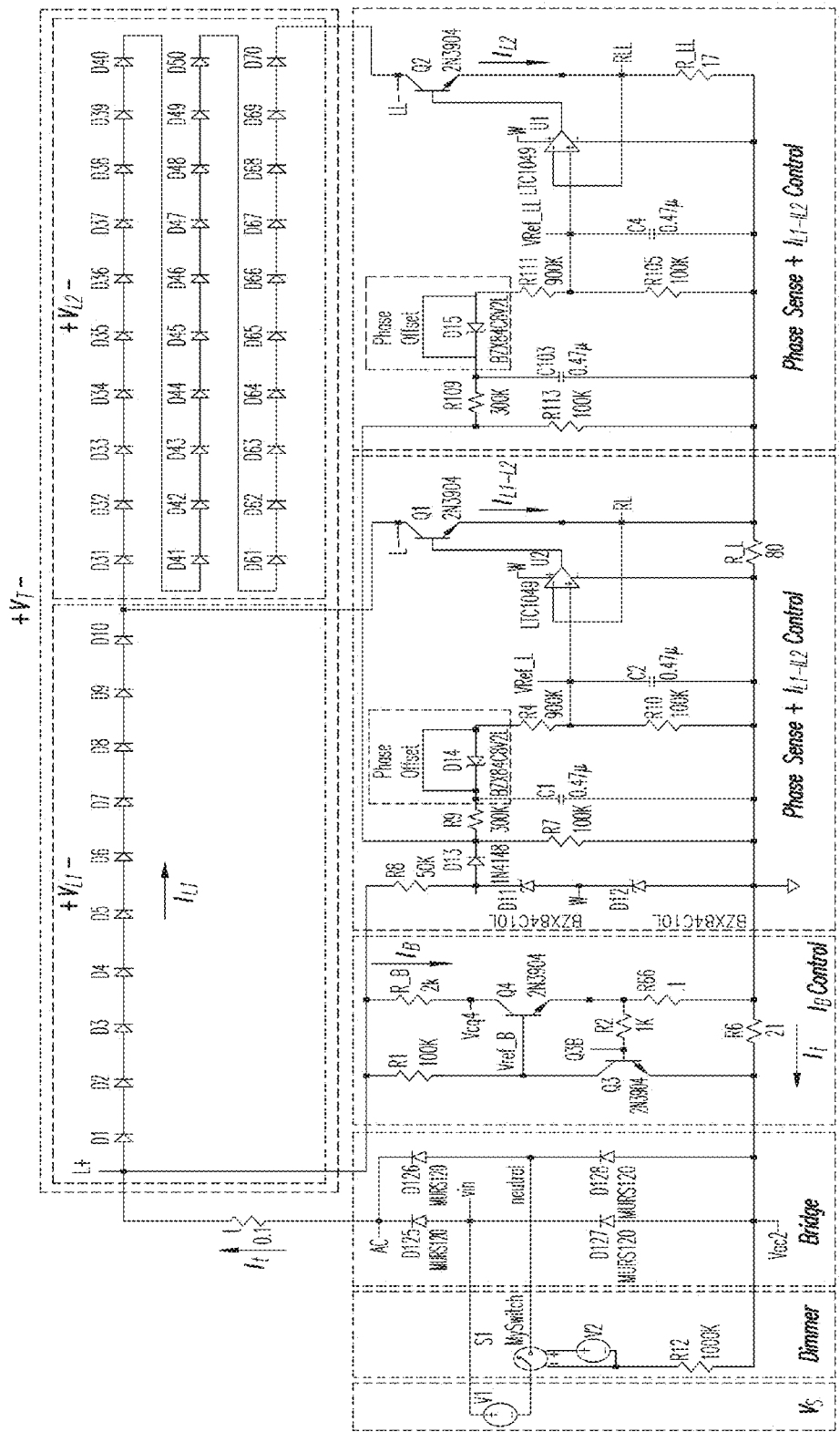

In the exemplary implementation of FIG. 37, both of the LED current regulation circuits sense phase and adjust the amplitude accordingly. Both also have a phase offset using Zener diode D14 and D15. The offset in the two circuits are set differently to control how the warm dimming occurs.

FIG. 37 is but one possible embodiment illustrating how the ratio of the current may be changed as a function of a dimmer phase. Any arbitrary function of the current is possible, such as function of phase, line voltage or current in the upstream branch.

The various schemes to efficiently regulate bleeder current as a function of dimmer phase, line voltage, LED current and line voltage as well as tailoring dimming curves for the LED controllers, 3305 and 3306 have already been discussed in the prior sections of this disclosure.

Figure 35:
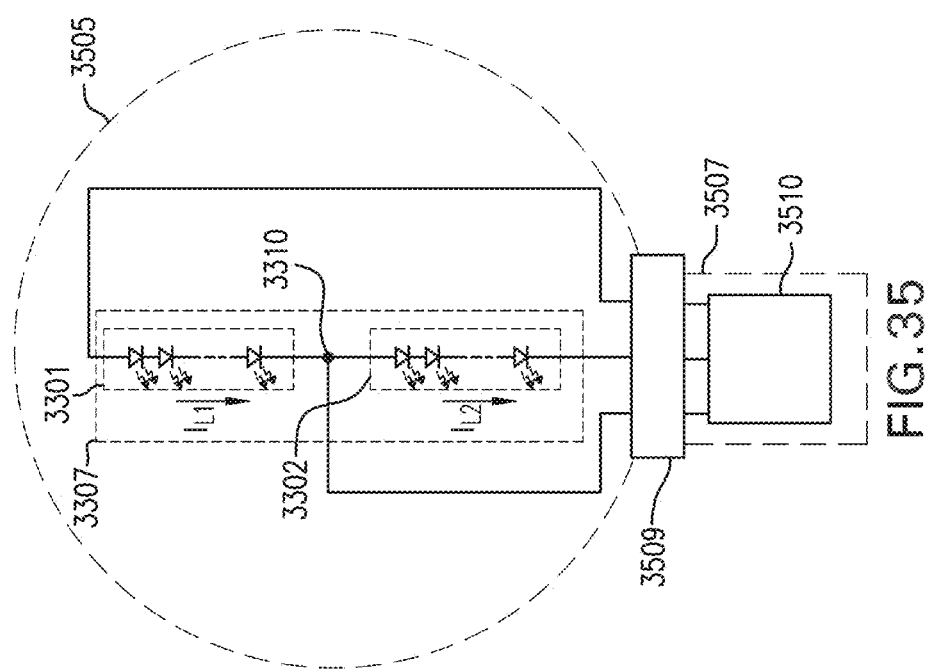

FIG. 35 illustrates an exemplary LED filament lamp. Strings 3301 and 3302 are linear arranged in series connection on the same filament substrate 3307. In this embodiment, 3301 is intentionally arranged to be on top so at low dimmer position, only 3301 lights up while string 3302 remains dark. This has a desired look where 3301 may appear to glow floating in a center of the lamp. The control circuitry 3510 may be arranged in base 3507. The glass feedthrough 3509 contains 3 wire from the LED filament.

Figure 36:
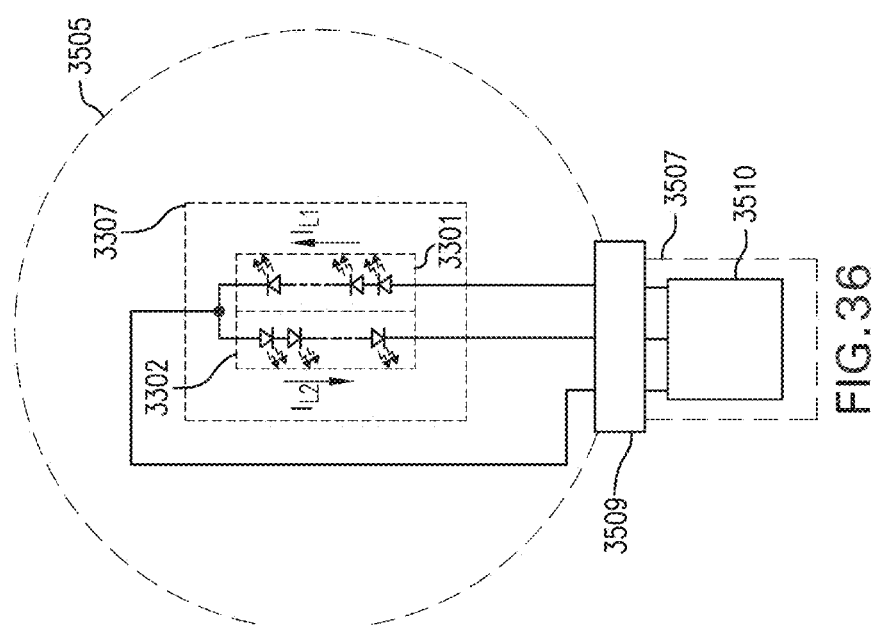

FIG. 36 show an alternate implementation where the LED strings 3301 and 3302 are next to each other, such as side by side on same or different filament substrate 3307. Another arrangement is back to back on same or different filament substrate.

Figure 38:
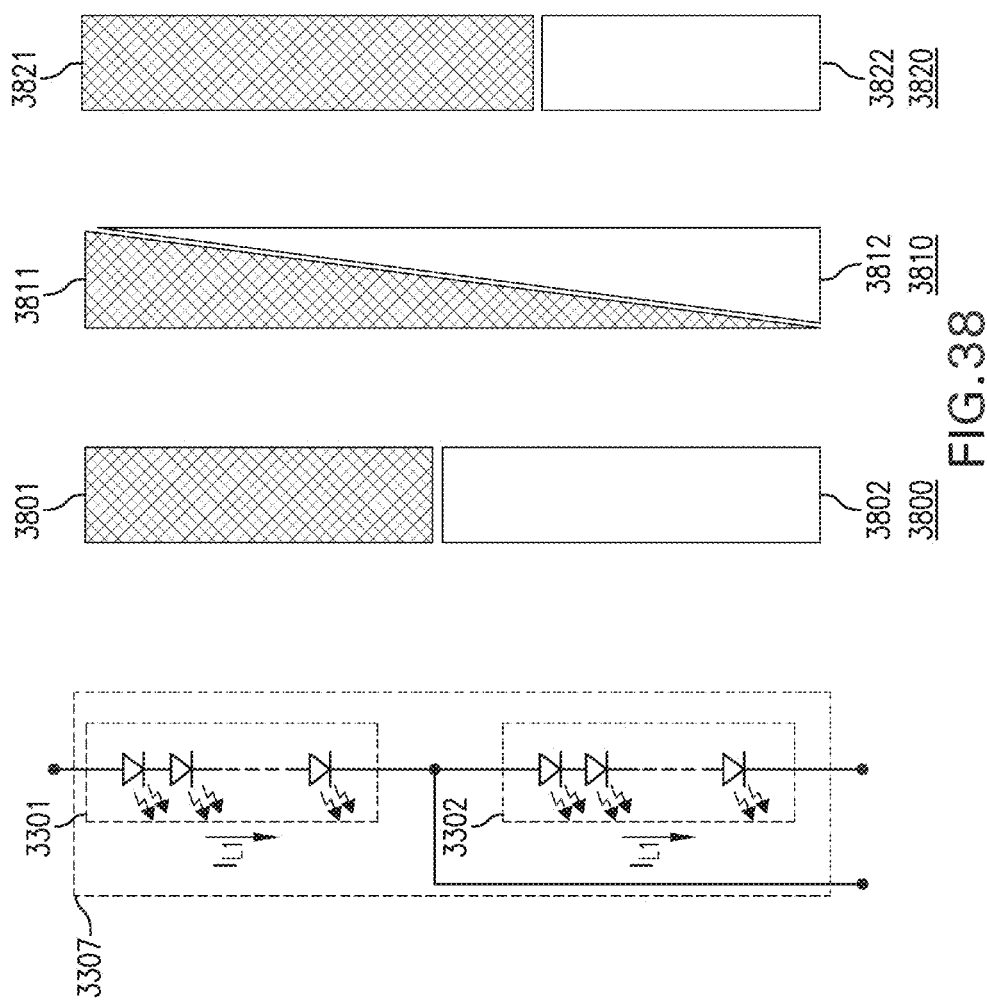

The color temperature of the strings can be controlled with different composition of phosphors. FIG. 38 shows filament 3307 with strings 3301 and 3302. 3800, 3810 and 3820 show 3 possible phosphor pattern on the filament. In 3800, there are two distinct composition of phosphors 3801 and 3802. The demarcation between the two phosphors matches that of the 2 LED strings 1901, 1902. However, it not necessary for the demarcation to match the LED string. For example 3820 shows phosphor 3821 to cover both 3301 and 3302. A more gradual transition is shown in 3810, with different phosphor regions 3811 and 3812. 3811 and 3812 represent the phosphor ratio across the filament not necessary linked to 2 physically separate region. They may be the same physical region with a predetermined variation in the distribution or ratio of 2 or more phosphors, for example.

Parallel Strings Current Balance

Figure 40:
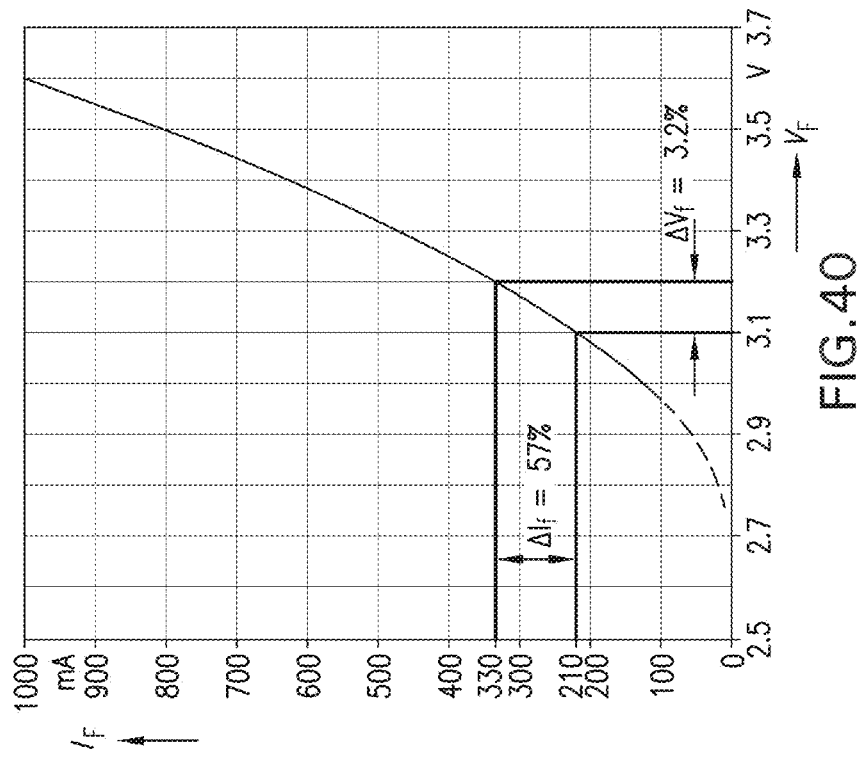
FIGS. 40-47B depict schematic, waveform and performance plot views to explain and illustrate exemplary methods to improve service life of lamps that include imperfectly matched parallel strings of LEDs.
Figure 41:
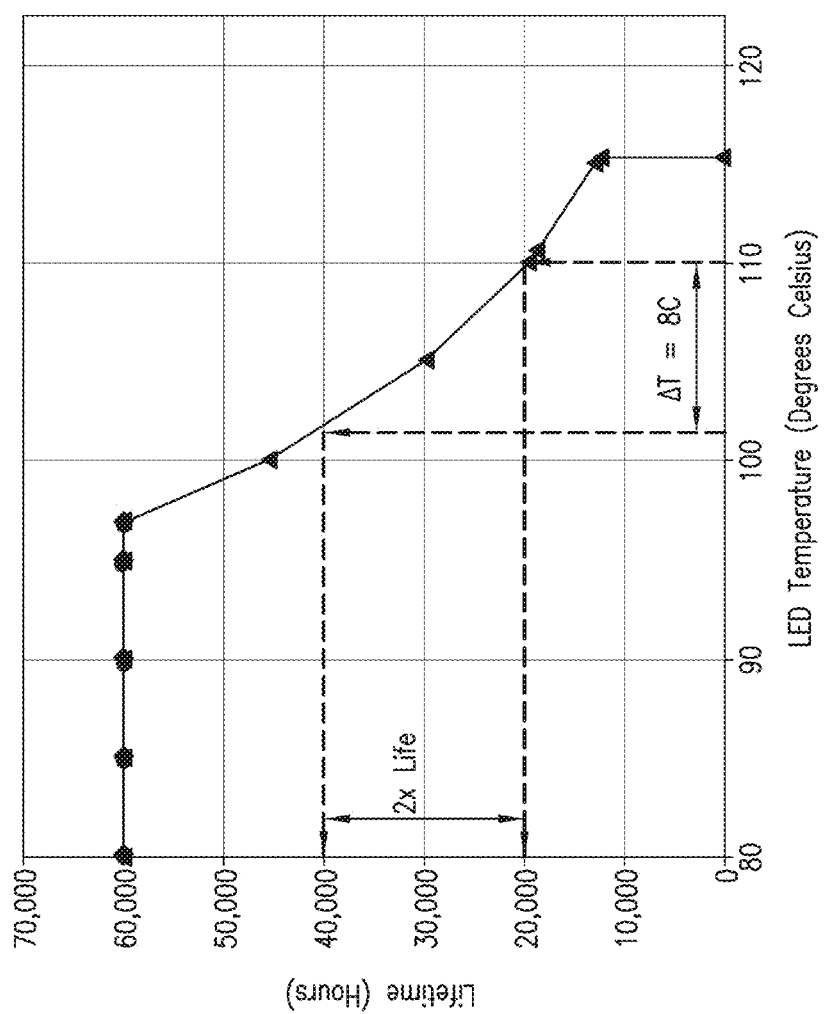
Figure 42:
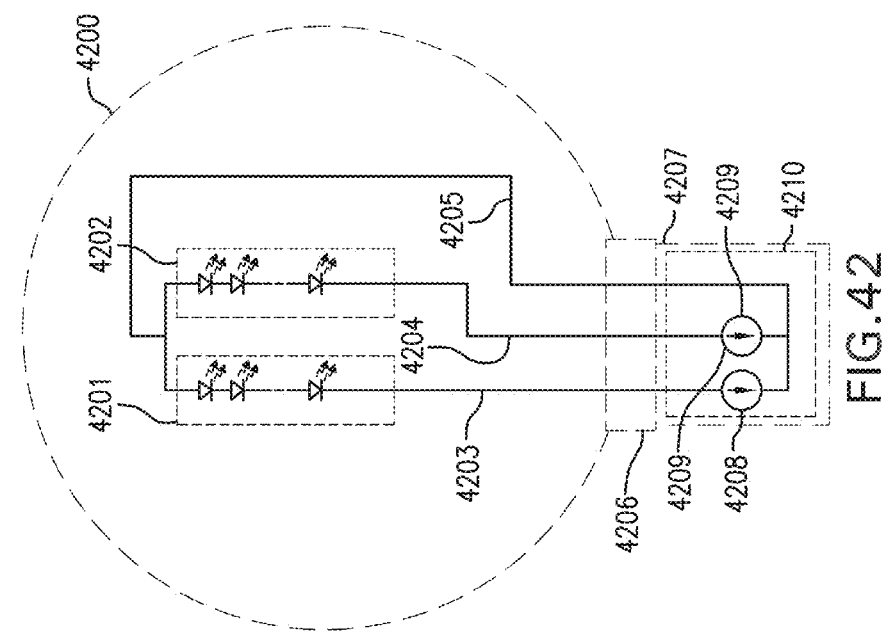

FIGS. 40-42 depict schematic, waveform and performance plot views to explain and illustrate exemplary methods to improve service life of lamps that include imperfectly matched parallel strings of LEDs.

High Lumen Filament lamps typically have multiple filaments running in parallel. This is problematic as small changes in forward voltage can cause one of the strings to disproportionally drain significantly more current. Consider FIG. 40, with an LED operating at for voltage $V_f=3.1V$ resulting in a current of 210 mA, a 3% change in forward voltage or $V_f=3.2V$ results in a dramatic 57% change in current to 330 mA.

This could result in a runaway effect as more current results in greater heating, greater heating results in lower forward voltage which in turn results in more current again. Even if it was possible to bin the LED filaments perfectly at the beginning of life, small geometric differences, bulb orientation, aging can cause differences in temperature which again causes one string to disproportionally source current.

Even tiny differences in forward voltage can have a dramatic effect on lifetime. For example, assume two LED strings having only a $DV_F=0.5\%$ which will result in 10% difference in current. Assume an average filament temperature of 100° C., a 10% difference in current will cause about a 10° C. temperature difference (10%·100° C.) or one filament running at 95 C while the other at 105° C. This 10° C. difference can result in a dramatic 2× lifetime difference. For example, one filament meeting energy star of 15,000 hours, while the other only survives to 7,500 hours. The lamp lifetime is limited by the weakest link to 7,500 hours. See FIG. 41 for exemplary lifetime data compared to LED junction temperature (Source: FIG. 5, Philips Technology White Paper "Understanding Power LED Lifetime analysis).

Accordingly, in some embodiments, the ability to equalize current between parallel strings is a key performance, cost and reliability driver.

FIG. 42 shows two LED parallel strings 4201 and 4202 inside a lamp 4200. 4201 and 4202 have a common electrical connection 4205 but on the other end 4201 is independently connected to 4203 and 4202 is independently connected to 4204. This results in at least three electrical connections that needs to be feedthrough 4206 into base 4207 and into driver 4210. At the high level, the driver 4210 contains a current regulator for each of the LED strings. String 4201 is powered by regulator 4208 while string 4202 is powered by 4209. In various implementations, the current regulator need not be perfectly regulating and can be simply a resistor. In some embodiments, the current regulator may be a full independent regulator. In other embodiments, the current regulator may use one or more semi-independent regulators.

Parallel/Series LED Segment Switching

Figure 43A:
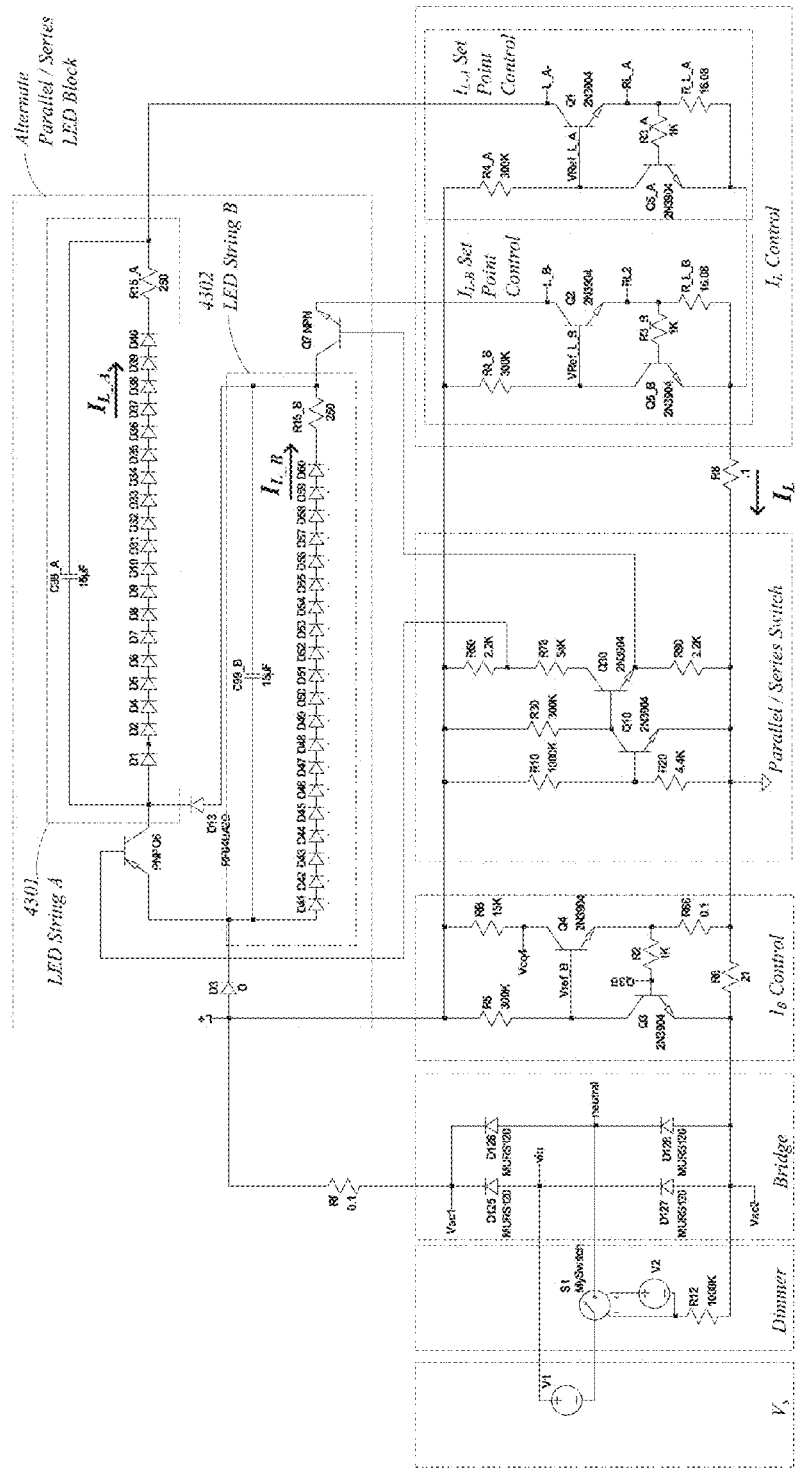

FIG. 43A shows an implementation where the LED Block of previous examples such as FIG. 29A are replaced with an alternate parallel/series LED block including at least 2 LED segments, 4301 LED A and 4302 LED B, transistor switches Q6, Q7 and diode D13. 4301 LED Segment A includes LEDs (D1 to D10, D31 to D40) with a total LED forward voltage $V_{L\_A}$ and optional capacitor C99_A and optional resistor R15_A. Optional capacitor C99_A and optional resistor R15_A serve a similar function as in FIG. 29B to reduce flicker. Segment 4302 LED String B includes LEDs (D41 to D60) with a total LED forward voltage $V_{L\_B}$ and optional capacitor C99_B and optional resistor R15_B. Optional capacitor C99_B and optional resistor R15_B serve a similar function as in FIG. 29B to reduce flicker. Generally, LED segments "A" and "B" have the same forward Voltage $V_{L\_A}=V_{L\_B}$. Note that discharge resistors across the capacitor C99_A and C99_B, used in a similar fashion to R100 as previously described FIG. 29, are optional and not shown in this and later examples for clarity of illustration.

The transistors and resistors in the Parallel/Series Switch Block are arranged to turn transistor Q6 and Q7 "ON" and "OFF" at specific level of the rectified input voltage $V_{AC}$ ($V_{AC1}$). The specific level at which the switching occurs is set by the ratio of R10 to R20.

Figure 44A:
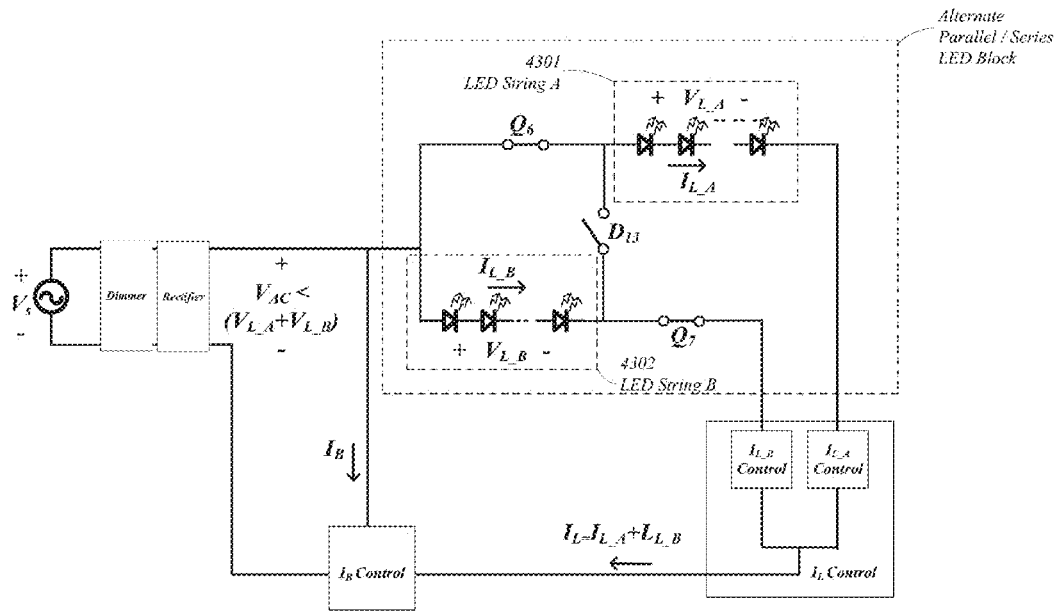
Figure 44B:
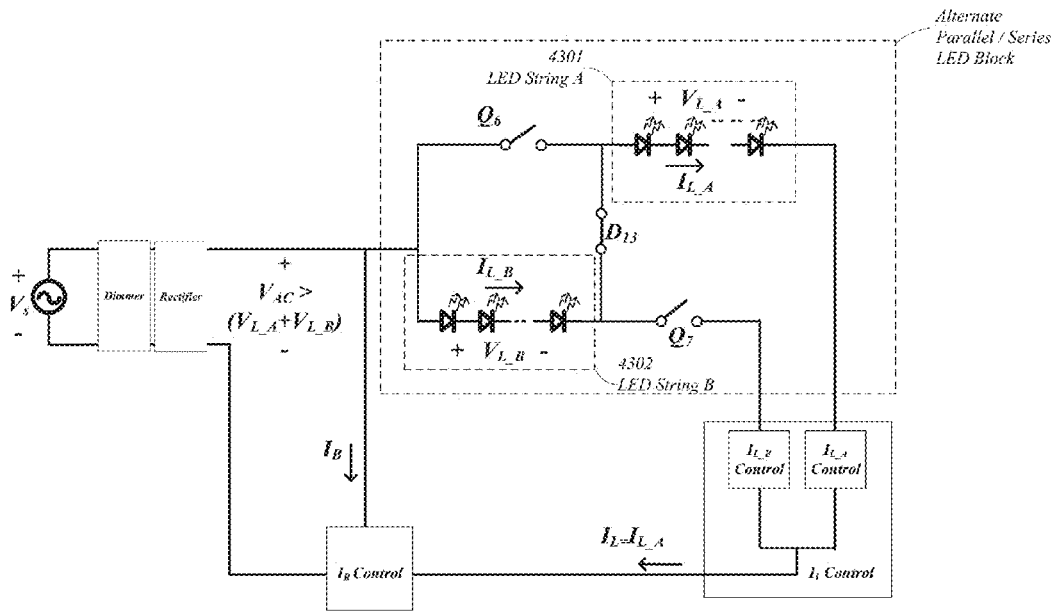

FIGS. 44A and 44B show a simplified version of FIG. 43A at various stages of switching. In FIG. 44A, transistor Q6 and Q7 are switched "ON" resulting in the LED strings 4301 and 4302 being arranged into a parallel configuration when $V_{AC}<(V_{L\_A}+V_{L\_B})$. In FIG. 44B, transistor Q6 and Q7 are switched "OFF" resulting in the LED strings, 4301 and 4302 being arranged into a series configuration when $V_{AC}>(V_{L\_A}+V_{L\_B})$.

In FIGS. 43A, 44A and 44B, the LED control current set point $I_L$ is regulated to a constant value and each segment has its own regulation where LED Segment "A" is controlled by $I_{L\_A}$ regulator and LED Segment "B" is controlled by $I_{L\_B}$ regulator and total regulated current is $I_L=I_{L\_A}+I_{L\_B}$. In one embodiment, where $I_{L\_A}=I_{L\_B}$, the total regulated current may be found:

$I_L=2 \cdot I_{L\_A}$ when $V_{AC}<(V_{L\_A}+V_{L\_B})$: Parallel Segments $I_L=I_{L\_A}$ when $V_{AC}>(V_{L\_A}+V_{L\_B})$: Series Segments.

Such an implementation has the advantage that the individual LED segment current is kept relatively constant regardless if the segments are in parallel or series configuration. This is unusual in that the total LED regulated or control current, $I_L$ is 2× higher when the LED are in parallel verses when the segment are in series. This is the opposite of maintaining good power factor where the total LED current $I_L$ is generally engineered to increase with larger input voltage $V_{AC}$ where as in this implementation, $I_L$ has an inverse relationship with input voltage $V_{AC}$, whereby $I_L$ increases as $V_{AC}$ decreases. By keeping the individual LED segment currents relatively constant, regardless whether the segments are in parallel or series configuration, the light output is also kept relatively constant—thereby reducing the level of flicker or light variation with line voltage.

When the $V_{AC}<V_{L\_A}$ or when the line voltage $V_{AC}$ is lower than a single segment, the LED regulator can no longer source current and the LEDs turn off. This increases the flicker index. To maintain the flow of LED current when $V_{AC}<V_{L\_A}$, optional capacitors, C99_A, C99_B and optional resistors R15_A and R15_B can be added. It is advantageous, but not required, to add the capacitors and resistor the individual LED segments as this makes the system more modular as well as not affecting the dimming performance. In this implementation, the overall LED current set point at the peak of the AC voltage waveform is a lower value than the LED set point in at least one portion when the AC voltage waveform is less than its peak.

Figure 43B:
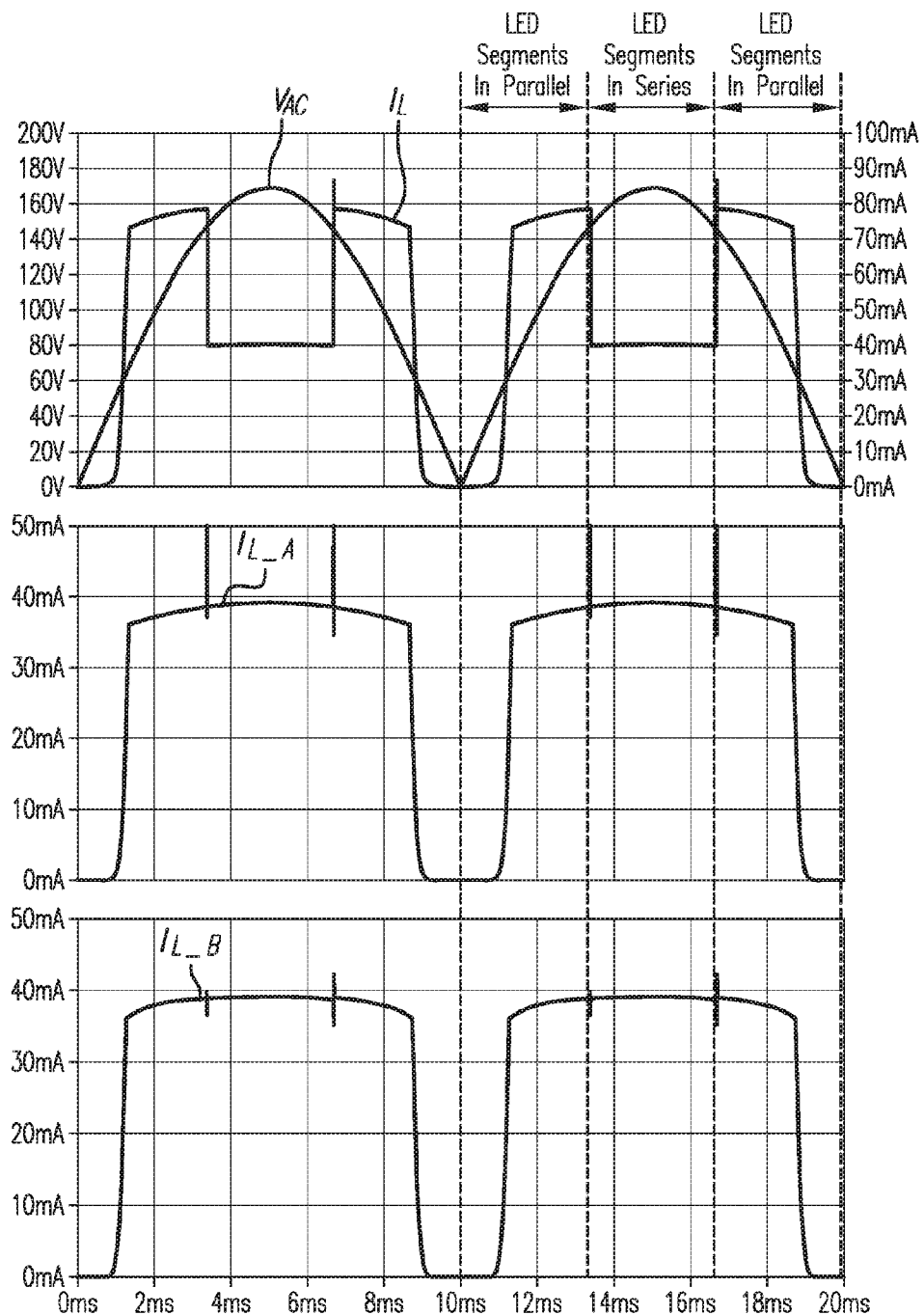

FIG. 43B show the current and voltage waveforms for circuit of 43A when the optional capacitor C99_A, C99_B are removed and the optional resistors R15_A, R15_B are shorted. The currents, $I_{L\_A}$ and $I_{L\_B}$ are substantially consistent when switched from series to parallel as long as $V_{AC}>V_{L\_A}$. However the total current $I_L$ current is doubled in the parallel configuration verses the series configuration. Again this implement provides for more even light output at the expense of power factor.

Figure 43C:
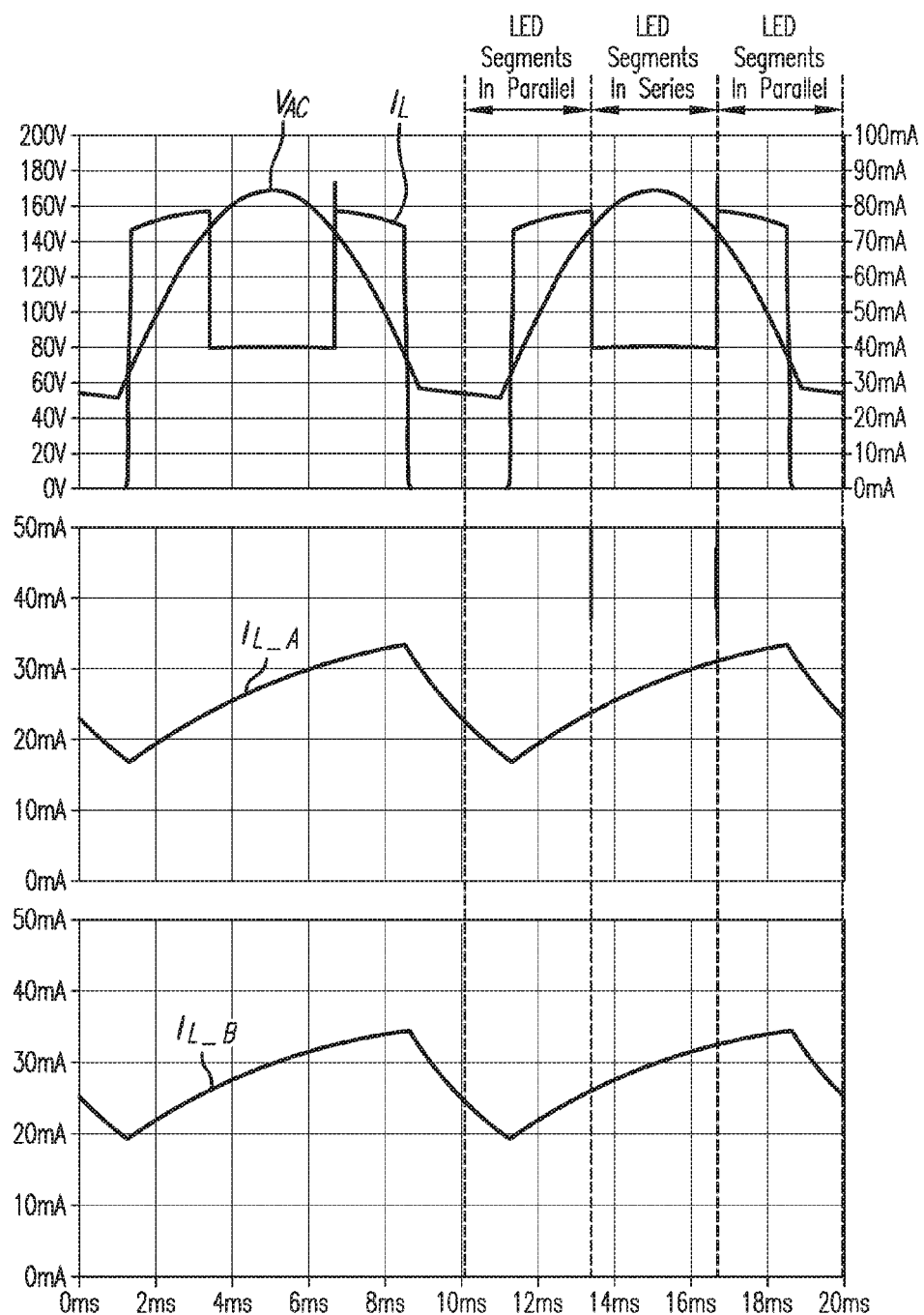

FIG. 43C show the current and voltage waveforms for circuit of 43A when the optional capacitor C99_A, C99_B are set to 15 uF and the optional resistors R15_A, R15_B are set to 250Ω. The individual LED segment currents, $I_{L\_A}$ and $I_{L\_B}$ are now smooth out with lower modulation even when $V_{AC}<V_{L\_A}$. This leads to a better flicker index. However the total current $I_L$ remains identical to FIG. 43B so in this particular implementation of capacitor and resistors, the external current draw to the circuit remains unchanged and dimming performance is unaffected.

Although the implementation in FIG. 43A the LED segments are regulated to a constant level, other embodiments are possible, they can be controlled most generally and arbitrarily such as a function of line voltage $V_{AC}$ or dimmer phase as described in previous sections and with the same advantages and features of the prior sections.

The bleeder current, $I_B$ control circuit, is also incorporated here to ensure there is a minimum hold up current $I_H$, for example when $V_{AC}<V_{L\_A}$, the region when LED current $I_L$ fall to zero. The control of the bleeder current may be a function of line voltage $V_{AC}$ and/or dimmer phase, as described in the prior sections and with the same advantages and features of the prior sections.

Although only two segments are shown, it is intended that this embodiment can be most generally expanded to multiple number of segments for example 4, 8, 16, 32, etc. Additional segments enables switching of LED segments at finer increment of line voltage. For example with 4 LED segments, A, B, C and D all with equal forward voltage $V_{LS}$ the segments can be switched in the following sequence.

$V_{AC}<2 \cdot V_{LS}$: A, B, C, D are all in parallel $2 \cdot V_{LS}<V_{AC}<4 \cdot V_{LS}$: (A, B in parallel) in series (C, D in parallel)

$4 \cdot V_{LS}<V_{AC}$: A, B, C, D all in series

LED COB Self-Regulated COB or Filament Module

Figure 45A:
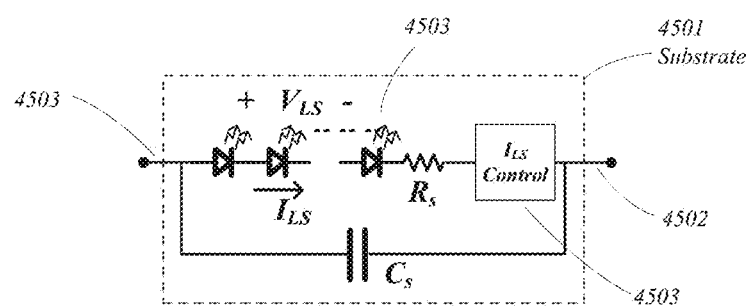

FIG. 45A shows a module composing of at least 2 individual LED dies 4503 connected in series, optional resistor $R_s$ in series with LED, optional capacitor $C_s$ in parallel across LED and resistor $R_s$, and a current limiting element 4503 controlling the LED current $I_L$ to a predetermined but not necessary fixed level. An optional discharge resistor, not shown can be put in parallel to capacitor $C_s$ in a similar fashion to R100 as previously described FIG. 29B. The current limiting element, 4503 could include a linear constant current regulator, resistor, transistor, IC, ASIC, microcontroller or other such devices. An example of current regulator with prefixed constant current is ON Semiconductor NSIC2030JB. ON Semiconductor NSIC2030JB is a packaged surface mount device (SMD). In a preferred embodiment, to save space, the internal silicon dies and/or other elements within the SMD package are used directly, not the package itself. In one preferred embodiment, the LEDs are bare dies directly bonded on the substrate 4501 and the current regulating element such in the format of a bare silicon chip or IC is also bonded to the same substrate 4501. There are electrical leads 4503, 4502 attached to the substrate 4501 to allow for electrical interface into the module. In some embodiments, at least one of components comprising of 4503, may be directly bonded to the electrical leads 4502, or 4503. The advantage of bonding 4503 on to the electrical leads as this can be the coolest section of the module as in the case of LED filament. Also by bonding 4503 on to the electrical leads, 4503 does not block the emission of light. The direct bonding of LED dies or silicon dies to the substrate 4501 is know is Chip on Board or COB. In one embodiment, the substrate 4501 is long linear and narrow such as that of a LED filament. For example the filament may have length of 15-60 mm with a width of 0.5 to 4 mm. The filament substrate 4501 can be made of materials such as sapphire, glass, metal or ceramic. The concepts, methods, materials, configurations, processes of incorporating bare LEDs, bare silicon dies and their coverage with phosphor are disclosed in U.S. Pat. No. 8,558,249 with reference to, for example, FIGS. 2-11, U.S. Pat. No. 9,136,257, FIG. 2-11, claims 1, 3, 6, 7, 10-19, and divisional U.S. patent application Ser. No. 14/054,282, the entire disclosures of each of which are fully incorporated herein by reference.

The current limiting element 4503, such as that of an IC or silicon chip in combination with resistors, or other electrical components, may have additional functionality. For example ON Semiconductor NSIC2030JB had the features of high temperature protection where the current is lowered at high temperatures. It also has surge protection which may eliminate the need for an external MOV. Another possible functionality is to regulate to an average current over a single line voltage cycle or half cycle rather than to the instantaneous current. It is advantageous to regulate to an average current over a half or full cycle as the variations in line voltage or dimmer phase variability and asymmetries are eliminated.

The incorporation of the current limiting or regulating element 4503 directly with the LED COB or LED Filament substrate 4501 is advantageous especially in the development of LED filament lamps in that: (1) each filament is self-regulated to a fixed power level so adding or removing filaments can be easily done without having to change an external driver setting; (2) the remaining driver is simplified as the LED regulation is done at least partially if not in whole in the filament itself; (3) the heat generated in the LED current regulation is distributed with the filaments; and, (4) simplifies the parallel/series implementation of FIG. 43. And (5) eliminates current hogging scenarios when multiple filament modules are put in parallel, the problem referenced by FIG. 40-42.

Figure 45B:
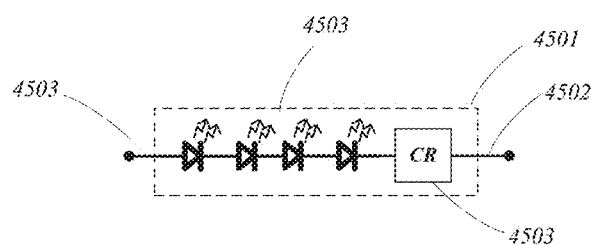
Figure 46A:
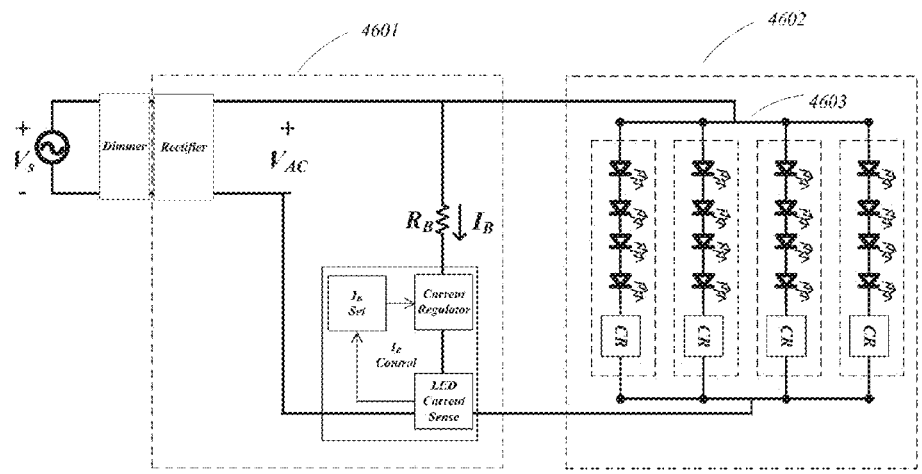
Figure 46B:
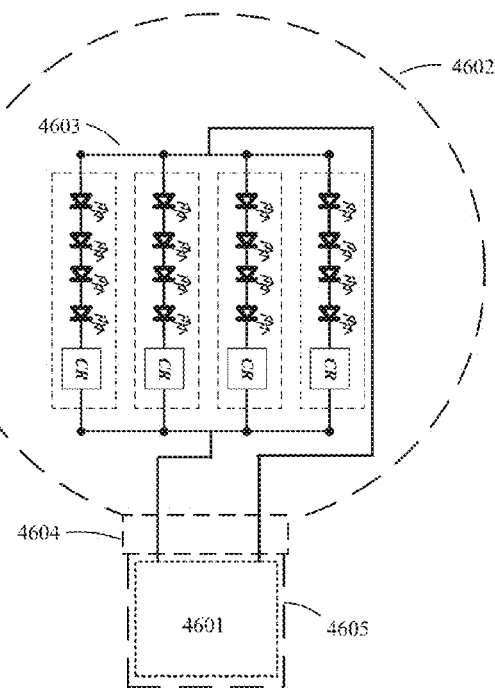

FIG. 46A and FIG. 46B show four LED regulated filament 4602 of FIG. 45B in parallel 4603, within the clear enclosure 4602. The remaining functionality of the driver 4601, containing for example the bridge, bleeder control circuit, and other components such fuse or surge protector are contained in the lamp base 4605. The electrical leads from the 4603 passes through a feed through 4604. In a further embodiment, 4602 is a standard clear glass bulb per shapes previously referenced, 4605 is a standard lamp base previously referenced and 4604 is a hermetic glass feedthrough previously described. Since the LED filaments are self-regulating, filaments can be added or subtracted without the need for adjusting driver portion in 4601. In addition, by locating some of the driver components in the glass bulb, there is additional room to in the lamp base, enabling more functionality or even smaller bases such as E10 or E11. Also by locating at least some of the heat generating regulating components into the filaments and out of the driver base, the need for thermal capability is reduced. This may eliminate the need for potting. In a further embodiment, there may be a master regulator that all the Filaments are connector to that modulates the total current in a similar manner and purpose as described for element 4714 in FIGS. 47A and 47B.

Figure 47A:
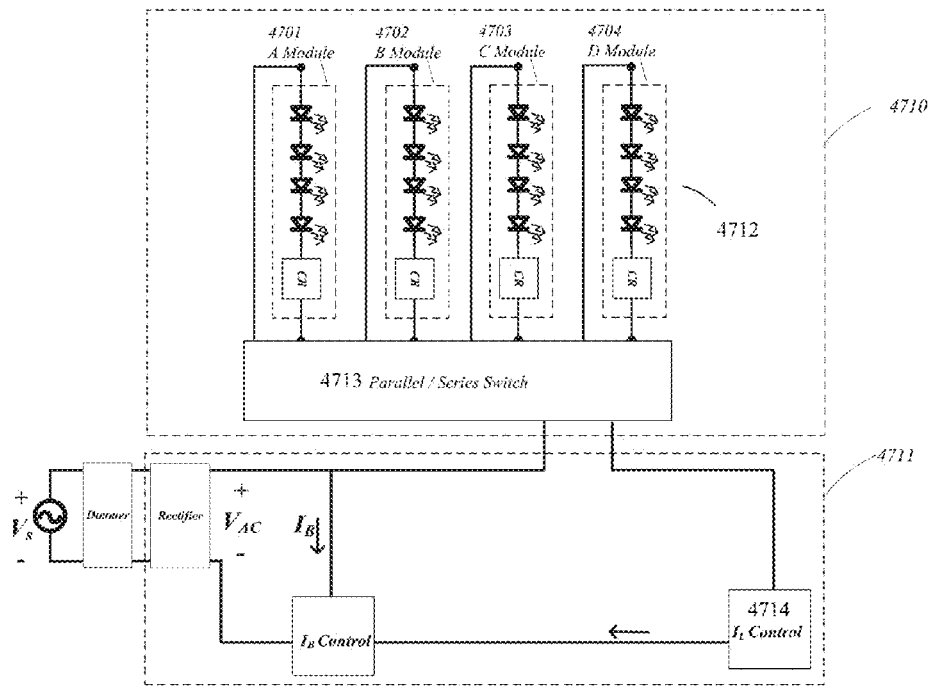
Figure 47B:
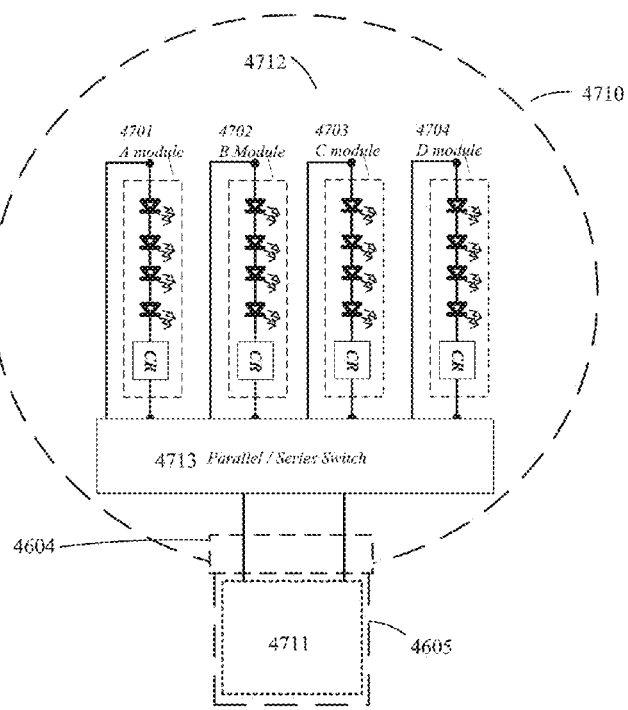

FIGS. 47A and 47B show 4712, four filament modules A, B, C and D of the type of FIG. 45B. The LED module 3712, are connected to 4713, a parallel series switching block that dynamically connects the filament modules in series or parallel depending on the input line voltage $V_{AC}$. The functionality of 4713 is similar to the Parallel/Series switch of FIG. 43 with the incorporation of switching elements such as Q6, Q7 D13 of FIG. 43. The remaining of the driver 4711 may optionally contain a rectifier, a fuse, a surge protector, a bleeder control circuit and an optional master LED current control circuit 4714. The current control elements, "CR" or 4503 in FIG. 45A on the filament modules generally regulate to a maximum constant current assuming there is sufficient voltage across the filament to cause this maximum current to flow. The current control element 4503 may not be able to sense phase or the line voltage thus it cannot regulate the individual filament current to these parameters. To overcome this problem, a master regulator 4714 is added. 4714 can sense dimmer phase, line voltage, switching stage of 4713 and modulate the total current $I_L$ accordingly. The total current from in the individual current regulator are forced or choked to the minimum level determined by the master regulator 4814.

FIG. 47B show one possible conceptual physical implantation of 47A into a lamp. Series/parallel switching of filaments requires a lot of wiring to the switching block 4713. In one embodiment, the LED filament modules, 4712 and the Parallel/Series switch block 4713 are all located in the Glass lamp bulb enclosure. By doing so, only 2 electrical leads needed to go are feed through 4604 into the driver element 4711 within the lamp base 4605.

In another embodiment where the is not too many switching series, parallel switching stages such as 2 segments, 4713 many also be located in the driver base 4711.

Although various embodiments have been described with reference to the Figures, other embodiments are possible. For example, some embodiments may advantageously improve performance (e.g., efficiency) for certain systems that require a relatively low level of power to be supplied during off-times of the phase-controlled supply. For example, occupancy sensors typically require a small amount of power from the supply to maintain sensor operation, regardless of LED dimming level. Some embodiments may provide sufficient power, especially at low dimming levels, to maintain operation for lighting control circuits, for example, without the need for complex or costly auxiliary power supplies that require additional components, installation, and packaging volume.

Some embodiments may be configured to reduce shimmer that may be visually perceptible to humans. Shimmer may be associated with an effective asymmetry between the periods of the positive half cycle and the negative half cycle. At 60 Hz line excitation, this asymmetry may yield an undesirable light intensity modulation. In some embodiments, the perceivable effect can be substantially mitigated by attenuating the LED current such that it falls to zero at a phase angle that is a predetermined phase before the phase-controlled device turns off. Examples of such operation are described, for example, at least with reference to FIG. 20A. In some examples the predetermined phase angle at which LED current falls to substantially zero (e.g., substantially no human perceptible light output) may be between about 1 degree and about 45 degrees, such as, for example, about any of about 2, 3, 4, 5, 7.5, 10, 12.5, 15, 17.5, 20, 22.5, 25, 27.5, 30, 32.5, 35, 37.5, 40, or 42.5 degrees. In various implementations, the light output may be substantially off before a systematic asymmetry, such as a systematic offset in positive half-cycle and negative half-cycle firing angles, may advantageously be substantially mitigated from the user perception perspective. In some implementations, the predetermined phase angle may be controllable based on user input set-point. In some examples, a light sensor associated with or integrated in the lamp may operate to provide feedback of light output modulation associated with such asymmetries that may fall within perceptible frequency ranges (e.g., less than about 200-300 Hz for humans, for example). According to predetermined thresholds, the predetermined phase angle may be adapted to the extent necessary to mitigate undesirable shimmer, for example. By dynamically mitigating LED current attenuation in this manner, the predetermined phase angle may be minimized to maintain maximum efficiency. For example, if the shimmer is perceived or measured to be within acceptable threshold limits, then the predetermined phase angle may be reduced, which may thereby improve efficiency and/or maximize light output, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

The invention claimed is:
1. An LED retrofit lamp comprising:
means for illuminating through an optically transmissive envelope;
a lamp base comprising metal and coupled to the illuminating means and defining input terminals for conducting an input current that flows between the terminals when the lamp base is in substantial direct thermal communication with, and electrically connected to, a socket that is connected to a triac dimmer module adapted to phase-cut an AC voltage waveform according to a controlled dimmer phase angle, wherein the dimmer module has a holding current requirement for current conduction, and wherein at least a portion of the lamp base defines a form factor that complies with ANSI C81.61-2009 standards for a form factor type selected from the group consisting of: E10, E11, E12, E14, E17, E26, E27, BA9S, B15D, B22, B22D, BA15D, BA15S, SC, GU10, and GU24;
a network of LEDs disposed in the illuminating means;
a first linear regulator configured in series with an LED network to control an LED current in the LED network, wherein the LED current flows between the input terminals;
a second linear regulator configured to regulate a bleeder current that flows between the input terminals and in parallel with the LED current to a bleeder current set point, wherein the bleeder current set point:
(i) equals a predetermined holding current set point minus the LED current when the LED current is less than the holding current set point, and,
(ii) is substantially zero when the LED current is greater than the holding current set point,
wherein the holding current set point satisfies the holding current requirement over at least a portion of the AC waveform; and,
an integral lamp driver module packaged into a space defined between an interior of the lamp base and an exterior of the illuminating means, the driver module comprising the first linear regulator and the second linear regulator,
wherein at least one of the first and second linear regulators are thermally coupled in substantial direct thermal communication with at least a portion of the lamp base.

2. The LED retrofit lamp of claim 1, wherein the illuminating means is selected from the group consisting of shape types: A, CA, C, B, G, S, T, F, ST, R, BR, PAR, and Prism.

3. The LED retrofit lamp of claim 1, wherein the second linear regulator comprises at least one resistor and a transistor, wherein the resistor is of sufficiently large resistance to result in at least 50% of the total heat power generated in the second linear regulator being dissipated across the resistor.

4. The LED retrofit lamp of claim 1, wherein at least a portion of the predetermined holding current set point is least 13 mA when the LED network is substantially OFF over at least a portion of the dimmer phase angles.

5. The LED retrofit lamp of claim 1, wherein the hold current set point is a predetermined function of phase and line voltage, and the LED current set point is a predetermined function of phase and line voltage.

6. The LED retrofit lamp of claim 1, wherein the LED current set point decreases in a substantially linear relationship as a function of dimmer phase angle over at least a portion of the dimmer phase angles.

7. The LED retrofit lamp of claim 6, wherein the LED current is set to less than 10% of its non-dimmed value when the dimmer phase angle is 115 degrees or less.

8. The LED retrofit lamp of claim 1, wherein the LED current set point is at least a predetermined function of the voltage level of the AC voltage waveform and is set to substantially zero over at least a portion when the voltage level of the AC voltage waveform is greater than the forward voltage of the LED network.

9. The LED retrofit lamp of claim 1, wherein the LED current set point is at least a predetermined function of the voltage level of the AC voltage waveform, and wherein the LED current set point at the peak of the AC voltage waveform is a lower value than the set point when the AC voltage waveform is less than its peak.

10. The LED retrofit lamp of claim 1, wherein the holding current set point is at least a predetermined function of a voltage level of the AC voltage waveform, wherein the holding current set point comprises a first amplitude at a first AC voltage level, and a second amplitude at a second AC voltage level, the second amplitude is greater than the first amplitude, the second AC voltage level is greater than the first AC voltage level, and the LED current turns on after the second AC voltage level.

11. The LED retrofit lamp of claim 1, wherein the holding current set point is at least a predetermined function of a dimmer phase angle, wherein the holding current set point comprises a first amplitude corresponding to an equivalent dimmer position near 0 degrees, and a second amplitude corresponding to an equivalent dimmer position greater than 40 degrees, wherein the second amplitude is greater than the first amplitude.

12. The LED retrofit lamp of claim 1, further comprising providing a reverse blocking diode and a capacitor branch, wherein the capacitor branch is arranged in parallel with the LED network such that a parallel combination of the capacitor branch and the LED network is in series with the reverse blocking diode and in series with the first linear regulator, wherein a capacitor in the capacitor branch discharges through the LED network to cause the LED network to emit a light output characterized by a percentage flicker less than 95%.

13. The LED retrofit lamp of claim 12, wherein at least the first and second linear regulators are located on a first PCB and wherein at least the capacitor is located on a second PCB separate from the first PCB.

14. The LED retrofit lamp of claim 12, wherein the LED network branch comprises a resistor of at least 30 Ohms in series with the LEDs of the LED network, wherein the LED network emits a light output characterized by a percentage flicker less than 95%.

15. The LED retrofit lamp of claim 1, wherein the driver module is assembled on at least one printed circuit board (PCB) disposed in a substantially horizontal orientation within the base.

16. The LED retrofit lamp of claim 14, wherein said first and second linear regulators are thermally coupled in substantially direct thermal communication with at least a portion of the lamp base further comprises:
   at least one of the first linear regulator and the second linear regulator are positioned on a proximal-facing side of the horizontally oriented PCB within 6 mm from a top-most inside surface of an electrical insulator separating the terminals of base.

17. The LED retrofit lamp of claim 1, wherein direct thermal communication is formed by a thermally conductive potting material in the lamp base, said potting material having a thermal conductivity of at least 0.3 W/mK, such that more than 50% of the heat generated from the driver is conducted to the socket through the potting material in the lamp base.

18. The LED retrofit lamp of claim 1, further comprising potting spurs distributed around the PCB, wherein the spurs are at least 0.3 mm long in a radial direction and substantially centers the PCB within the lamps base, wherein the spaces between the spurs allow a thermally conductive potting material to flow around the PCB.

19. The LED retrofit lamp of claim 1, wherein the network of LEDs comprises at least a first LED segment and a second LED segment connected in series, wherein the first LED segment turns on when the AC waveform is at a first voltage and is regulated by a first regulator to a predetermined first LED branch set point and the first regulator is connected between the first and second segment, the first and second LED segments are both turned on when the AC waveform is at a second voltage, the second voltage being higher than first voltage and also greater than the total forward voltage of the first and second LED segments when connected in series, and current to the second LED segment is regulated by a second regulator to a predetermined second LED branch set point.

20. The LED retrofit lamp of claim 1, wherein the network of LEDs comprises at least a first LED segment and a second LED segment, wherein the first LED segment and the second LED segment are connected in parallel by a switching module when the AC line voltage is below the total forward voltage of the two segment in series, the first LED segment and second LED segment are connected in series by the switching module when the AC line voltage is above the total forward voltage of the two segment in series, and the total regulated current from the network of LEDs is a non-constant value that is a function of the AC line voltage.

21. The LED retrofit lamp of claim 12, further comprising a resistor in parallel with the capacitor in the capacitor branch.

22. The LED retrofit lamp of claim 21, wherein the resistor value is between 250 KΩ and 10,000 KΩ.

* * * * *